United States Patent
Hakuta et al.

(10) Patent No.: US 10,866,348 B2
(45) Date of Patent: Dec. 15, 2020

(54) HEAT RAY-SHIELDING MATERIAL AND ARCHITECTURAL MEMBER, CAGE MEMBER, AND SIDE SURFACE WALL USING THE SAME

(71) Applicant: FUJIFILM Corporation, Tokyo (JP)

(72) Inventors: Shinya Hakuta, Ashigara-kami-gun (JP); Shogo Yamazoe, Ashigara-kami-gun (JP); Tadashi Kasamatsu, Ashigara-kami-gun (JP); Masayuki Naya, Ashigara-kami-gun (JP); Hideki Yasuda, Ashigara-kami-gun (JP); Ryo Matsuno, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 425 days.

(21) Appl. No.: 15/805,472

(22) Filed: Nov. 7, 2017

(65) Prior Publication Data
US 2018/0095209 A1    Apr. 5, 2018

Related U.S. Application Data

(63) Continuation of application No. PCT/JP2016/065910, filed on May 30, 2016.

(30) Foreign Application Priority Data

Jun. 22, 2015    (JP) .................................. 2015-124643
Apr. 28, 2016    (JP) .................................. 2016-090494

(51) Int. Cl.
*G02B 5/28*    (2006.01)
*B32B 3/12*    (2006.01)
(Continued)

(52) U.S. Cl.
CPC ................. *G02B 5/282* (2013.01); *B32B 3/12* (2013.01); *B32B 3/266* (2013.01); *B32B 7/02* (2013.01);
(Continued)

(58) Field of Classification Search
CPC .......... G02B 5/20; G02B 5/206; G02B 5/208; G02B 5/22; G02B 5/26; G02B 5/28;
(Continued)

(56) References Cited

U.S. PATENT DOCUMENTS

2002/0033661 A1 *    3/2002    Sugimachi ............. G02B 5/204
                                                                313/479
2002/0068177 A1    6/2002    Garnier et al.
(Continued)

FOREIGN PATENT DOCUMENTS

JP    48-57420 A    8/1973
JP    10-177390 A    6/1998
(Continued)

OTHER PUBLICATIONS

International Preliminary Report on Patentability (Form PCT/IPEA/409) issued in International Application No. PCT/JP2016/065910 dated Jun. 22, 2015, together with an English translation.
(Continued)

*Primary Examiner* — Stephone B Allen
*Assistant Examiner* — Adam W Booher
(74) *Attorney, Agent, or Firm* — Birch, Stewart, Kolasch & Birch, LLP

(57) ABSTRACT

Provided are a heat ray-shielding material having a frame body including a plurality of frames having a cell structure and a plurality of films attached to some or all of the plurality of frames in the frame body, in which at least some of the plurality of films shield near-infrared light, and cell sizes in the plurality of frames are larger than visible light optical
(Continued)

wavelengths, whereby the heat ray-shielding material is lightweight, capable of selectively shielding heat rays, that is, near-infrared rays, can be applied to a variety of uses, and can be independently used as movable members, easily removable members, and members having a collapsible structure, an architectural member, a cage member, and a side surface wall.

27 Claims, 19 Drawing Sheets

(51) Int. Cl.
| | |
|---|---|
| *E04B 1/86* | (2006.01) |
| *E06B 9/24* | (2006.01) |
| *B32B 7/02* | (2019.01) |
| *B32B 3/26* | (2006.01) |
| *G02B 1/11* | (2015.01) |
| *E06B 5/20* | (2006.01) |

(52) U.S. Cl.
CPC ............... *E04B 1/86* (2013.01); *E06B 9/24* (2013.01); *G02B 1/11* (2013.01); *B32B 2307/30* (2013.01); *B32B 2307/412* (2013.01); *E06B 5/20* (2013.01); *E06B 2009/2405* (2013.01); *E06B 2009/2417* (2013.01); *E06B 2009/2464* (2013.01)

(58) Field of Classification Search
CPC .. G02B 5/281; G02B 5/282; G02B 1/11–113; B32B 3/12; B32B 3/266; B32B 7/02; B32B 2307/30; B32B 2307/412; E04B 1/74; E04B 1/76; E04B 1/82; E04B 1/8227; E04B 1/84; E04B 1/8409; E04B 1/86; E04B 1/88; E04B 1/90; E04B 2001/7691; E04B 2001/8423; E04B 2001/8433; E04B 2001/8457; E04B 2001/8461; E06B 9/24; E06B 5/20; E06B 5/205; E06B 2009/2405; E06B 2009/2417; E06B 2009/2464; E01F 8/00
See application file for complete search history.

(56) References Cited

U.S. PATENT DOCUMENTS

| | | | |
|---|---|---|---|
| 2004/0238276 A1* | 12/2004 | Matias | B32B 7/02 |
| | | | 181/290 |
| 2007/0009741 A1* | 1/2007 | Boven | B32B 27/36 |
| | | | 428/412 |
| 2009/0133922 A1* | 5/2009 | Okazaki | H05K 9/0096 |
| | | | 174/389 |
| 2011/0013273 A1 | 1/2011 | Wilson et al. | |
| 2011/0111210 A1 | 5/2011 | Matsunami et al. | |
| 2011/0216414 A1 | 9/2011 | Suzuki et al. | |
| 2013/0071651 A1* | 3/2013 | Hakuta | B32B 17/1044 |
| | | | 428/333 |
| 2015/0168620 A1 | 6/2015 | Hakuta et al. | |
| 2017/0072472 A1* | 3/2017 | Isogai | B22F 9/24 |

FOREIGN PATENT DOCUMENTS

| | | |
|---|---|---|
| JP | 2004-196559 A | 7/2004 |
| JP | 2007-100394 A | 4/2007 |
| JP | 2008-291557 A | 12/2008 |
| JP | 2010-236837 A | 10/2010 |
| JP | 2011-118347 A | 6/2011 |
| JP | 2011-203716 A | 10/2011 |
| JP | 2013-36383 A | 2/2013 |
| JP | 2014-34486 A | 2/2014 |
| JP | 2014-46597 A | 3/2014 |
| JP | 2014-191224 A | 10/2014 |

OTHER PUBLICATIONS

International Search Report (Form PCT/ISA/210) issued in International Application No. PCT/JP2016/065910 dated Aug. 30, 2016, together with an English translation.
Written Opinion of the International Searching Authority (Form PCT/ISA/237) issued in International Application No. PCT/JP2016/065910 dated Aug. 30, 2016.
Japanese Office Action and English translation for corresponding Application No. 2017-524785, dated Jul. 10, 2018.
Japanese Notification of Reasons for Refusal for corresponding Japanese Application No. 2017-524785, dated Mar. 5, 2019, with English translation.

* cited by examiner

HEAT RAY-SHIELDING MATERIAL AND ARCHITECTURAL MEMBER, CAGE MEMBER, AND SIDE SURFACE WALL USING THE SAME

CROSS-REFERENCE TO RELATED APPLICATIONS

This application is a Continuation of PCT International Application No. PCT/JP2016/065910 filed on May 30, 2016, which claims priority under 35 U.S.C. § 119(a) to Japanese Patent Application No. 2015-124643 filed on Jun. 22, 2015 and Japanese Patent Application No. 2016-090494 filed on Apr. 28, 2016. Each of the above applications is hereby expressly incorporated by reference, in its entirety, into the present application.

BACKGROUND OF THE INVENTION

1. Field of the Invention

The present invention relates to a heat ray-shielding material and an architectural member, a cage member, and a side surface wall using the same and, in detail, relates to a heat ray-shielding material capable of selectively shielding heat rays including near-infrared rays, and preferably a heat ray-shielding material that is excellent in terms of visible light-transmitting properties, radio wave-transmitting properties, and/or soundproofing, and an architectural member, a cage member, and a side surface wall using the same.

2. Description of the Related Art

In recent years, as an energy-saving measure for carbon dioxide reduction, heat ray-shielding property-imparting materials for windows in cars, trains, architectural structures, and the like, observation windows in aquariums or pools, glass or acrylic resins for show windows and veranda fences have been developed. From the viewpoint of the heat ray-shielding property or the solar radiation-shielding property (solar radiation heat obtainment ratio), hear ray-reflective materials which do not reradiate light are more desirable than heat ray-absorbing materials which reradiate absorbed light indoors (approximately a third of the amount of absorbed solar radiation energy), and a variety of proposals have been made.

As the above-described heat ray-reflective heat ray-shielding property-imparting materials, heat ray-shielding materials that are attached to the surface of car glass or window glass in buildings, heat ray-shielding materials that are used as intermediate films for laminated glass, and the like have been proposed (refer to JP2011-118347A, JP2014-191224A, and JP2004-196559A).

For example, JP2011-118347A according to an application of the present applicant discloses a heat ray-shielding material having a metal particle-containing layer containing metal particles of silver or the like, in which 60% or more of the metal particles in terms of the number are substantially hexagonal or disc-like metal plate particles, and the principal flat surfaces of the metal plate particles are plane-oriented in a range of 0° to ±300 with respect to one surface of the metal particle-containing layer. It is disclosed that this heat ray-shielding material may be a heat ray-shielding material in which the metal particle-containing layer is directly formed on a glass substrate or a heat ray-shielding material in which the metal particle-containing layer is formed on a resin substrate of polyethylene terephthalate (PET), triacetyl cellulose (TAC), or the like.

JP2011-118347A describes that the above-described constitution enables the provision of a heat ray-shielding material that has high reflected wavelength selectivity and high reflection bandwidth selectivity and is excellent in terms of visible light-transmitting properties and radio wave-transmitting properties.

In addition, JP2014-191224A according to an application of the present applicant, similar to JP2011-118347A, discloses a heat ray-shielding material having a metal particle-containing layer containing metal particles of silver or the like, in which metal plate particles are included as the metal particles, the area coating ratio (percentage) represented by the ratio of the total of the areas of the orthographs of the metal particles to the area of the orthography of the metal particle-containing layer when the surface of the metal particle-containing layer is seen in the perpendicular direction is 30% or more, and the coefficient of variation of the circle-equivalent diameters of all of the metal particles is 22% or less, a laminated glass intermediate film including the heat ray-shielding material, and laminated glass for which the heat ray-shielding material is used.

JP2014-191224A describes that the above-described constitution enables the satisfaction of both a high visible light transmittance and a low entire solar radiation transmittance even in a case in which the area coating ratio of the metal particles is high.

In addition, JP2004-196559A discloses laminated glass having a plurality of glass sheet-like bodies and an intermediate film layer, in which the intermediate film layer for laminated glass has a constitution in which a sound-isolating film such as a PET film is sandwiched by two or more of intermediate films such as polyvinyl butyral (PVB) films having solar radiation-shielding performance or functional ultrafine particle-imparting PVB films, the total of the thicknesses of the laminated glass sheets is 5 mm or more and 8 mm or less, and the laminated glass has solar radiation-shielding performance, sound-isolating performance, and impact resistance performance.

JP2004-196559A describes that the above-described constitution enables the obtainment of lightweight laminated glass having solar radiation-shielding properties, sound-isolating properties, and impact resistance performance.

SUMMARY OF THE INVENTION

Meanwhile, in all of the techniques disclosed by JP2011-118347A, JP2014-191224A, and JP2004-196559A, the heat ray-shielding material or the laminated glass are used in a state of a thin film in which metal particles are applied onto a film to which no support was attached, or, as supports, large-sized continuous structures such as glass sheets are used. Therefore, in the case of being used in a state of a thin film, there is a problem in that, even when a frame is attached to the outer circumference, in large areas, the strength is extremely weak, and the heat ray-shielding material or the laminated glass has a strength as weak as that of simple thin films. On the other hand, in a case in which a support such as a glass sheet is used, the heat ray-shielding material or the laminated glass can be supported, but there is a problem in that the heat ray-shielding material or the laminated glass is heavy and the handling thereof is difficult.

As described above, heat-shielding films in the heat ray-shielding materials and the like of the related art disclosed by JP2011-118347A, JP2014-191224A, and JP2004-196559A were formed in a thin film shape with an assumption of a form in which the heat-shielding film was formed or attached directly on a transparent member such as glass or an acrylic resin which functioned as a support or inserted between transparent members. This was because the heat-shielding films were preferably formed on a film using roll-to-roll techniques from the viewpoint of productivity, and, as a supposition of usages, the heat-shielding film was frequently used for window portions in vehicles, architectural structures, and the like, and a form in which the heat-shielding film was placed on a glass surface or inserted into glass as an intermediate film was supposed.

However, the above-described heat-shielding films in the heat ray-shielding materials of the related art are used in a state of being directly formed on, attached to, or inserted into transparent members in order to provide heat-shielding performance to the transparent members such as glass or acrylic resins for windows of architectural structures, and thus, in a case in which, depending on time, seasons, or usage, not heat shielding but solar radiation (irradiation with sunlight) becomes necessary in transparent members such as windows, there has been a problem in that it is necessary to open window glass to which the heat-shielding film is attached or remove window glass to which the heat-shielding film is attached and attach window glass to which the heat-shielding film is not attached.

In architectural structures, generally, curtains, blinds, screens, shutters, and the like are used together with window glass in order to cope with solar radiation changes attributed to time, seasons, or the like, but almost all of them fully shield solar radiation including visible light or heat rays. Articles importing solar radiation light behave like lace curtains, but do not allow external landscapes to be clearly visible. Like the heat-shielding films in the heat ray-shielding material and the like of the related art disclosed by JP2011-118347A, JP2014-191224A, and JP2004-196559A, curtains, blinds, screens, shutters, and the like shield heat rays, but are not capable of transmitting visible light so as to make external landscapes to be clearly visible through slight scattering of visible light and transmitting radio waves.

However, the heat-shielding films in the heat ray-shielding material and the like of the related art disclosed by JP2011-118347A, JP2014-191224A, and JP2004-196559A are formed in a thin film shape and are not capable of standing for themselves, and thus have an assumption of being used in a state of being directly formed on, attached to, or inserted into transparent members such as glass or acrylic resins, and thus there is a problem in that the heat ray-shielding material and the like cannot be used instead of curtains, blinds, screens, shutters, or the like.

Particularly, among heat-shielding films such as heat ray-shielding materials, highly functional heat-shielding films that particularly transmit visible light, shield near-infrared light, and slightly scatter visible light are assumed to be used a broad range of uses such as blinds, screens, and pet cases in addition to window members due to the satisfaction of both transparency or the heat-shielding property. In this case, from the viewpoint of ease of handling, there is a demand for structures that are as lightweight as possible as long as the functions are not impaired. In a case in which lightweight structures are produced by decreasing the thickness of a glass sheet or an acryl sheet to which the highly functional heat-shielding film is attached, there is a problem in that the physical strength of the glass sheet or the acryl sheet decreases and the structures cannot be used for blinds, screens, or pet cases. In a case in which the area of the glass sheet or the acryl sheet is increased while maintaining the physical strength, the glass sheet or the acryl sheet becomes extremely heavy, it becomes difficult to handle the glass sheet or the acryl sheet, and thus the uses of the structures are limited, and there is a problem in that the structures can be used only for window members.

In addition, in the case of screens or pet cases, there is a demand for a mechanism allowing air exchange, and thus there is a problem in that thick glass sheets or acryl sheets are not easily used from the viewpoint of the degree of difficulty or costs of processing in terms of the air exchange.

An object of the present invention is to solve the above-described problems of the related art and provide a heat ray-shielding material which is lightweight and is capable of selectively shielding heat rays, that is, near-infrared rays, preferably, furthermore, is transparent and lightweight, is capable of shielding heat rays (near-infrared rays) while also adjusting external visibility, can be applied to a variety of uses, and can be independently used as movable members, easily removable members, and members having a collapsible structure, and an architectural member, a cage member, and a side surface wall for which the heat ray-shielding material is used.

In order to achieve the above-described object, the present inventors repeated intensive studies regarding heat ray-shielding materials, consequently found out that the heat-shielding films such as heat ray-shielding materials of the related art have an assumption of being directly formed on, attached to, or inserted in glass sheets or acryl sheets; however, in a case in which the area of the glass sheets or the acryl sheets is increased while maintaining the physical strength, the glass sheets or the acryl sheets becomes extremely heavy, and thus it is necessary to increase the strength so as to prevent thin heat-shielding films from becoming heavy in any structures; in a state in which the outer circumference of a large-area heat-shielding film is fixed to a frame body instead of using the glass sheets or the acryl sheets, the strength becomes extremely weak; desirable performance for windows, curtains, blinds, screens, and the like that are located between indoor places and outdoor places has a broad spectrum from the adjustment of light through the adjustment of heat, wind, and sound, and thus, in a case in which a thin film-shaped heat-shielding film is fixed to a number of frames in a cell structure, for example, a lattice-shaped frame, it is possible to improve the strength of a film-frame structure, transmit sunlight while shielding the heat of sunlight entering from the outside and thus allow external appearance to be clearly seen, adjust sound, that is, soundproof sound, and furthermore, allow wind to pass through by opening opening holes in films, and completed the present invention.

That is, a heat ray-shielding material of the present invention has a frame body including a plurality of frames having a cell structure and a plurality of films attached to some or all of the plurality of frames in the frame body, in which at least some of the plurality of films shields near-infrared light, and cell sizes in the plurality of frames are larger than visible light optical wavelengths.

Here, at least some of the plurality of films preferably selectively shield near-infrared light and transmit visible light, preferably anti-reflection of visible light, and are preferably transparent to visible light.

In addition, at least some of the plurality of frames are preferably transparent to visible light.

In addition, it is preferable that at least some of the plurality of films have at least a metal particle-containing layer containing a plurality of metal particles, the metal particle-containing layer includes at least metal plate particles as the metal particles and functions so as to shield light having a first optical wavelength including wavelengths of the near-infrared light due to a localized surface plasmon effect of the metal particles, and an average size of the plurality of metal particles is a size that is smaller than the first optical wavelength.

In addition, it is preferable that 60% or more of the total number of the plurality of metal particles is the metal plate particles in which a ratio of a diameter of the metal particle to a thickness is 3 or more, principal flat surfaces of the metal plate particles are plane-oriented in a range of 0° to 30° with respect to a surface of the metal particle-containing layer, and, in the metal particle-containing layer, the plurality of metal particles is disposed without forming conduction paths.

In addition, the metal particles preferably include silver.

In addition, 60% or more of the total number of the metal particles preferably have a basic wavelength of the localized surface plasmon in a range of 780 nm to 2,500 nm.

In addition, it is preferable that at least some of the plurality of films have a base material serving as a base having a first refractive index, a metal particle-containing layer containing a plurality of metal particles, and a dielectric layer having a second refractive index, the base material, the metal particle-containing layer, and the dielectric layer constitute a laminate structure in which the base material, the metal particle-containing layer, and the dielectric layer are sequentially laminated in this order, a thickness of the dielectric layer is a thickness at which reflected light on a surface of the dielectric layer in a case in which an incidence light enters the laminate structure from a surface side of the dielectric layer interferes with reflected light from an interface between the dielectric layer and the metal particle-containing layer and thus vanishes, and thus the dielectric layer has an optical function of preventing reflection of incidence light having a second incidence light wavelength.

In addition, regarding the thickness of the dielectric layer, an optical path length is preferably equal to or smaller than ¼ of the second incidence light wavelength.

In addition, the heat ray-shielding material preferably further comprises a high-refractive index layer having a third refractive index that is higher than the first refractive index between the base material and the metal particle-containing layer.

In addition, the second incidence light wavelength is preferably 380 nm to 780 nm.

In addition, the heat ray-shielding material is preferably radio wave-transmissible.

In addition, heat ray-shielding material preferably further comprises one or more opening holes.

In addition, at least some of the plurality of films preferably have one or more opening holes.

In addition, a structure made up of the plurality of frames and the plurality of films preferably soundproofs sound of 5 dB or more at a first frequency in a range of 10 to 100,000 Hz.

In addition, the plurality of films are fixed to only one side of the frame body, and a structure made up of the plurality of frames and the plurality of films soundproofs sound of 5 dB or more at a first frequency in a range of 10 to 100,000 Hz.

In addition, the plurality of films are constituted of a single film, the single film is fixed to only one side of the frame body and attached to some or all of the plurality of frames in the frame body, and a structure made up of the plurality of frames and the plurality of films soundproofs sound of 5 dB or more at a first frequency in a range of 10 to 100,000 Hz.

In addition, it is preferable that at least some of the plurality of films have a base material serving as the base having the first refractive index, a metal particle-containing layer containing the plurality of metal particles, and a dielectric layer having the second refractive index, the base material, the metal particle-containing layer, and the dielectric layer constitute the laminate structure in which the base material, the metal particle-containing layer, and the dielectric layer are sequentially laminated in this order, the metal particle-containing layer includes at least metal plate particles as the metal particles and functions so as to shield light having the first optical wavelength $\lambda 1$ including the wavelengths of the near-infrared light due to the localized surface plasmon effect of the metal particles, the thickness of the dielectric layer is the thickness at which reflected light on the surface of the dielectric layer in a case in which an incidence light enters the laminate structure from the surface side of the dielectric layer interferes with reflected light on the interface between the dielectric layer and the metal particle-containing layer and thus vanishes, and thus the dielectric layer prevents reflection of incidence light having the second incidence light wavelength $\lambda 2$, when an average cell size of the plurality of frames is represented by R, an average size of the plurality of metal particles is represented by d1, the first optical wavelength is represented by $\lambda 1$, the second incidence light wavelength is represented by $\lambda 2$, and an acoustic wavelength of a resonance frequency of the structure made up of the plurality of frames and the plurality of films is represented by $\lambda 3$, the heat ray-shielding material has a scale relationship represented by Inequality Expression (1) and has, as optical functions, a function of shielding light around $\lambda 1$ and a function of preventing reflection around $\lambda 2$.

$$d1 < \lambda 2 < \lambda 1 < R < \lambda 3 \tag{1}$$

In addition, it is preferable that at least some of the plurality of films have one or more opening holes, a structure made up of the plurality of frames, the plurality of films, and one or more of the opening holes has a peak frequency indicating a maximum value of soundproofing on a lower frequency side of the resonance frequency, and when an acoustic wavelength of the peak frequency is represented by $\lambda 4$, the heat ray-shielding material has a scale relationship represented by Inequality Expression (2), has, as optical functions, the function of shielding light around $\lambda 1$ and the function of preventing reflection around $\lambda 2$, and has, as an acoustic function, a function of shielding sound on a low frequency side around $\lambda 4$.

$$d1 < \lambda 2 < \lambda 1 < R < \lambda 3 < \lambda 4 \tag{2}$$

In addition, in order to achieve the above-described object, in an architectural member of the present invention, the above-described heat ray-shielding material is used as a movable member or a removable member.

Here, in an architectural structure for which the architectural member is used or a space, it is preferable that the plurality of films is disposed outside, and the frame body is disposed inside.

In addition, the architectural member is preferably a window member for which the heat ray-shielding material is used as a transparent portion of an external window.

In addition, the architectural member is preferably a screen member for which the heat ray-shielding material is used as a transparent portion of a screen.

In addition, the architectural member is preferably a blind, a curtain, or a divider for which the heat ray-shielding material is used as a structure in which the frame body is collapsible.

In addition, in order to achieve the above-described object, a cage member of the present invention is a cage member having a cuboid shape, in which at least one surface of the cuboid is formed using the above-described heat ray-shielding material.

In addition, in order to achieve the above-described object, a side surface wall of the present invention is a side surface wall installed on a side surface of a road or a railroad, in which the above-described heat ray-shielding material is used for at least some of the side surface wall.

According to the present invention, the heat ray-shielding material is lightweight, is capable of selectively shielding heat rays, that is, near-infrared rays, and can be independently used as movable members, easily removable members, and members having a collapsible structure.

In addition, according to the present invention, in a case in which the films are transparent, in addition to the above-described effects, the heat ray-shielding material is transparent and lightweight and is capable of shielding heat rays (near-infrared rays) while also adjusting external visibility.

In addition, according to the present invention, in addition to the respective effects described above, it is possible to shield audio in the low frequency side and the high frequency side of the audible range and thus soundproof sound.

In addition, according to the present invention, in a case in which the films have the opening holes, in addition to the respective effects, furthermore, it is possible to provide a heat ray-shielding material which is capable of allowing wind to pass through, that is, is air-permeable, and furthermore, it is possible to particularly strongly shield sound having a specific frequency on the low frequency side and soundproof sound.

In addition, according to the present invention, it is possible to provide an architectural member, a cage member, and a side surface wall for which a heat ray-shielding material exhibiting the respective effects described above is used.

DESCRIPTION OF THE PREFERRED EMBODIMENTS

Hereinafter, a heat ray-shielding material according to the present invention will be described in detail with reference to a preferred embodiment illustrated in the accompanying drawings.

Figure 1:
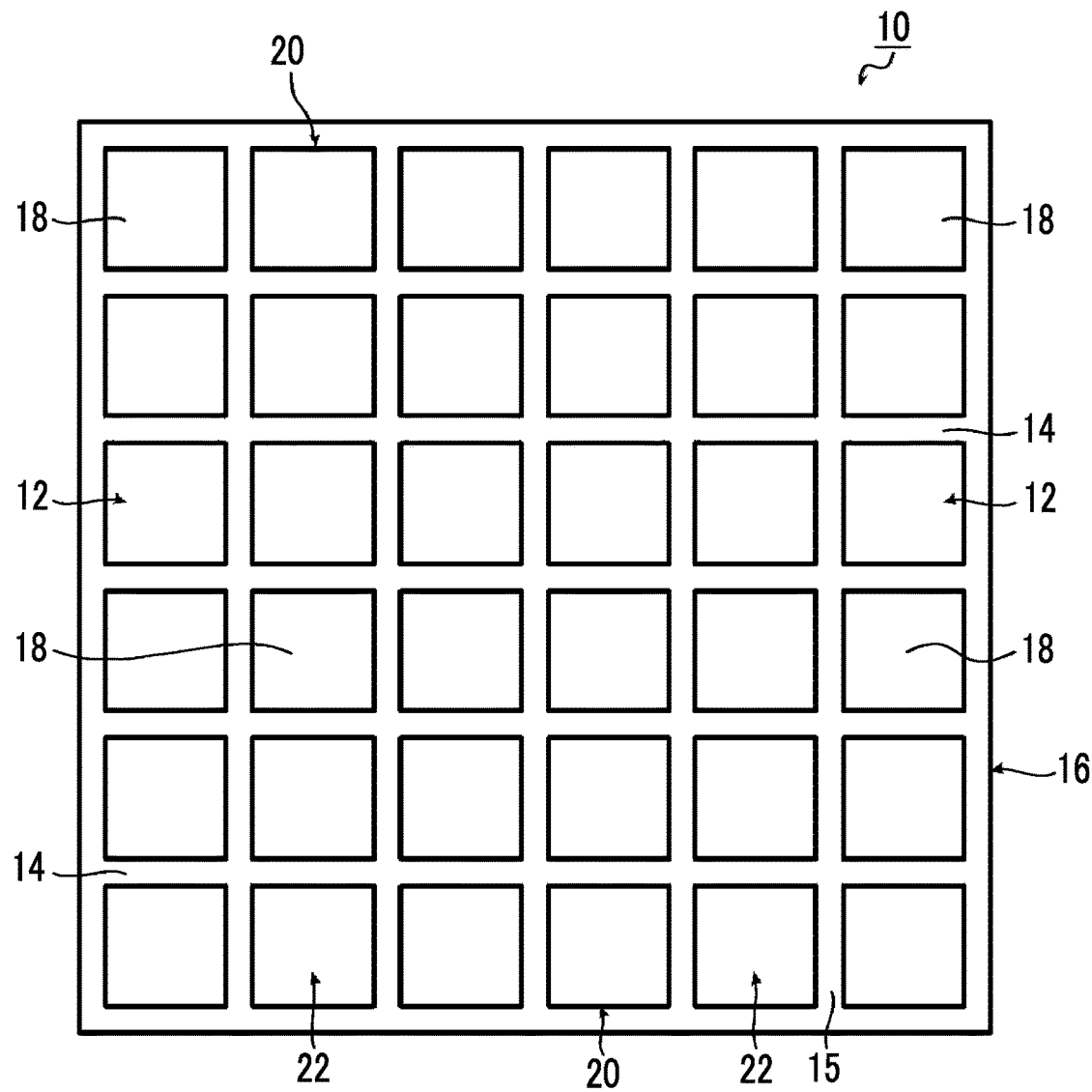
FIG. 1 is a plan view schematically illustrating an example of a heat ray-shielding material according to an embodiment of the present invention.
Figure 2:
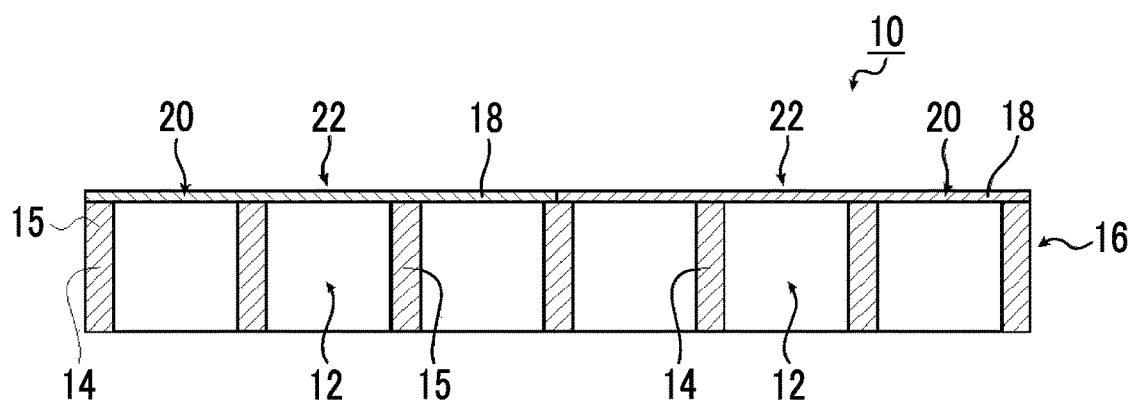
FIG. 2 is a schematic cross-sectional view of the heat ray-shielding material illustrated in FIG. 1 in a direction of a II-II line.

FIG. 1 is a plan view schematically illustrating an example of a heat ray-shielding material according to an embodiment of the present invention, and FIG. 2 is a schematic cross-sectional view of the heat ray-shielding material illustrated in FIG. 1 in a direction of a II-II line.

(Heat Ray-Shielding Material)

A heat ray-shielding material 10 of the present invention illustrated in FIG. 1 and FIG. 2 has a frame body 16 forming a plurality of, in the illustrated example, 36 frames 14 which respectively have an opening 12 and have a two-dimensionally disposed cell structure and a sheet-like film body 20 forming a plurality of, in the illustrated example, 36 films 18 which are respectively fixed to the corresponding frames 14 so as to cover the openings 12 of the respective frames 14.

In the heat ray-shielding material 10 of the present embodiment, one frame 14 and the film 18 fixed to the frame 14 constitute one shielding cell 22. Therefore, the heat ray-shielding material 10 has a plurality of, in the illustrated example, 36 shielding cells 22 that are disposed in two dimensions.

In the illustrated example, the sheet-like film body 20 is fixed and attached to the entire frame body 16, whereby 36 films 18 are fixed and attached to all of 36 frames 14 respectively, but the present invention is not limited thereto, and a plurality of films 18 may be fixed to only some of a plurality of frames 14.

(Frame)

The frame 14 is an element which is formed so as to be surrounded in a circular shape by a frame material 15 that is a thick plate-like member, has the opening 12 therein, and is intended to fix and support the film 18 so as to cover the opening 12 on at least one side and is an element which imparts a necessary strength to the shielding cell 22 formed of the film 18 fixed to the frame 14. Therefore, the frame 14 has higher stiffness than the film 18 and, specifically, needs to be high in terms of both the mass and stiffness per unit area.

The shape of the frame 14 is preferably a continuously closed shape in which the frame is capable of fixing the film 18 so as to be capable of suppressing the entire outer circumference of the film 18, but the present invention is not limited thereto, and the shape may be a partially-cut and discontinuous shape as long as the frame 14 is capable of supporting the film 18 fixed thereto and imparting a necessary strength to the shielding cell 22. That is, since the role of the frame 14 is to fix and support the film 18, even in the case of including small cuts or slightly including non-adhered portions, the frame 14 exhibits the effect.

In addition, the shape of the opening 12 formed by the frame 14 is a square shape in the example illustrated in FIG. 1; however, in the present invention, the shape is not particularly limited and may be a polygonal shape such as a different quadrilateral shape such as a rectangle shape, a rhombus shape, or a parallelogram shape, a triangle shape such as an equilateral triangle shape, an isosceles triangle shape, or a right triangle shape, or an equilateral polygonal shape such as an equilateral pentagon shape or an equilateral hexagon shape, a circular shape, an elliptical shape, or the like and may be an irregular shape. Meanwhile, end portions on both sides of the opening 12 of the frame 14 are both not closed but opened to the outside. The film 18 is fixed to at least one end portion of the opened opening 12 of the frame 14 so as to cover the opening 12.

In addition, the cell size (hereinafter, simply referred to as the size) of the frame 14 refers to the size on the plan view and can be defined as the size of the opening 12. However, in the case of an equilateral polygonal shape such as the square shape illustrated in FIG. 1 or a circle, the size can be defined as the distance between sides facing each other with the center therebetween or the circle-equivalent diameter, and, in the case of a polygonal shape, an elliptical shape, or an irregular shape, the size can be defined as the circle-equivalent diameter. In the present invention, the circle-equivalent diameter and radius refer to the diameter and radius of a converted circle having the same area, respectively.

Meanwhile, in the heat ray-shielding material 10 of the present invention, all of the frames 14 may have a constant size, but there may be frames having a different size (including frames having a different shape), and, in this case, the average size of the frames 14 may be used as the size of the frame 14.

The size of the frame 14 is not particularly limited and may be set depending on the use of the heat ray-shielding material 10 of the present invention, that is, articles in which the heat ray-shielding material 10 is applied to shield heat rays, that is, shield heat, for example, window members that are used for external windows of double-pane windows, architectural members having a movable structure, a removable structure, or a collapsible structure such as mosquito screen members, blind curtains, and dividers, cage members that house animals, side surface walls that are installed on the side surfaces of roads or railroads, and the like.

In addition, the average size of the frames 14 needs to be larger than at least the visible light optical wavelengths (380 nm to 780 nm) in order to transmit visible light.

For example, the size of the frame 14 is preferably 0.5 mm to 200 mm, more preferably 1 mm to 100 mm, and most preferably 2 mm to 30 mm.

Meanwhile, the size of the frame 14 may be expressed as the average size in a case in which the respective frames 14 have different sizes.

In addition, the width and thickness of the frame 14 are also not particularly limited as long as the frame is capable of fixing the film so as to reliably suppress the film 18 and is capable of reliably supporting the film 18 and can be set depending on, for example, the size of the frame 14.

For example, in a case in which the size of the frame 14 is 0.5 mm to 50 mm, the width of the frame 14 is preferably 0.5 mm to 20 mm, more preferably 0.7 mm to 10 mm, and most preferably 1 mm to 5 mm.

In a case in which the ratio of the width of the frame 14 to the size of the frame 14 becomes too high, the area ratio of the portions of the frames 14 to the entire heat ray-shielding material becomes high, and there is a concern that, as a device, the heat ray-shielding material 10 may become heavy. On the other hand, in a case in which the ratio becomes too low, it becomes difficult to strongly fix films to the frame 14 portions using an adhesive or the like.

In addition, in a case in which the size of the frame 14 is more than 50 mm and 200 mm or less, the width of the frame 14 is preferably 1 mm to 100 mm, more preferably 3 mm to 50 mm, and most preferably 5 mm to 20 mm.

In addition, the thickness of the frame 14 is preferably 0.5 mm to 200 mm, more preferably 0.7 mm to 100 mm, and most preferably 1 mm to 50 mm.

Meanwhile, in a case in which the respective frames 14 have different widths and thicknesses, the width and thickness of the frame 14 are preferably expressed as the average width and the average thickness, respectively.

Meanwhile, in the present invention, the plurality of, that is, two or more frames 14 is preferably constituted of the frame body 16 disposed so as to be connected in two dimensions, preferably, a single frame body 16.

Here, regarding the number of the frames 14 in the heat ray-shielding material 10 of the present invention, that is, in the illustrated example, the number of the frames 14 constituting the frame body 16 is 36; however, in the present invention, the number is not particularly limited and may be set depending on the above-described uses (applied articles) of the heat ray-shielding material 10 of the present invention. In a case in which the above-described size of the frame 14 is set depending on the above-described uses (applied articles), the number of the frames 14 may be set depending on the size of the frame 14.

For example, the number of the frames 14, that is, the number of the shielding cells 22 is preferably 1 to 100,000, more preferably 2 to 50,000, and most preferably 4 to 10,000.

The material of the frame 14, that is, the material of the frame body 16 is not particularly limited as long as the frame is capable of supporting the film 18, has an appropriate strength in the case of being applied to the above-described uses, and has resistance to heat-shielding environments and can be selected depending on heat-shielding uses (heat-shielding applied articles) and heat-shielding environments thereof. However, in the above-described uses, at least some of the plurality of frames 14 in the frame body 16, that is, all or some of the frames 14 are preferably transparent to visible light so as to be capable of transmitting visible light. Examples of the material of the frame 14 include resin materials such as acrylic resins, polymethyl methacrylate, polycarbonate, polyamide-imide, polyacrylate, polyether imide, polyacetal, polyetheretherketone, polyphenylene sulfide, polysulfone, polyethylene terephthalate, polybutylene terephthalate, polyimide, and triacetyl cellulose, and the like. Meanwhile, in a case in which the material does not need to be transparent, as the material of the frame 14, it is also possible to use metallic materials such as aluminum, titanium, magnesium, tungsten, iron, steel, chromium, chrome-molybdenum, Nichrome-molybdenum, and alloys thereof, carbon fiber reinforced plastics (CFRP), carbon fibers, glass fiber reinforced plastics (GFRP), and the like.

In addition, a plurality of kinds of the above-described materials for the frame 14 may be used in combination.

(Film)

The film 18 is an element which is fixed so as to be suppressed to the frame 14 so as to cover the opening 12 in the frame 14 and is an element which has a function of reflecting and thus shielding the energy of external heat rays (near-infrared rays). Meanwhile, the film 18 may be a film that absorbs and thus shield the energy of heat rays. Meanwhile, the film 18 is preferably impermeable to the air.

Meanwhile, in the present invention, heat rays refer to near-infrared rays or near-infrared light (780 nm to 2,500 nm) which account for approximately 50% of the sunlight energy.

In the present invention, at least some of the plurality of films 18 attached to the plurality of frames 14 in the frame body 16 have a function of reflecting or absorbing and thus shielding the energy of external heat rays.

Meanwhile, the film 18 is an element that needs to be attached to the frames 14 and have a predetermined strength, is fixed so as to be reliably suppressed to the frame 14, and needs to reflect or absorb the energy of near-infrared light and thus shield heat rays. Therefore, the film 18 is preferably made of a flexible and elastic material.

Meanwhile, it can be said that the shape of the film 18 is the shape of the opening 12 in the frame 14 and the size of the film 18 is the size of the frame 14, in more detail, the size of the opening 12 in the frame 14.

Meanwhile, in the following description of the functions of the film 18, an example in which the films 18 are attached to all of the plurality of frames 14 in the frame body 16 and all of the films have the same function, but the present invention is not limited thereto, and it is needless to say that the film 18 may be attached to some of the plurality of frames 14 and all or some of the plurality of films 18 attached to some of the plurality of frames 14 may have the same function.

The film 18 preferably has a function of selectively shielding near-infrared light and transmitting visible light, preferably has a function of preventing the reflection of visible light, and is preferably transparent to visible light.

Here, the thickness of the film 18 is not particularly limited as long as the film can be fixed to the frame 14 and thus have a predetermined strength, but is preferably thick in order to further increase the strength. For example, in the present invention, the thickness of the film 18 can be set depending on the size of the frame 14, that is, the size of the film.

For example, in a case in which the size of the frame 14 is 0.5 mm to 50 mm, the thickness of the film 18 is preferably 0.005 mm (5 μm) to 5 mm, more preferably 0.007 mm (7 μm) to 2 mm, and most preferably 0.01 mm (10 μm) to 1 mm.

In addition, in a case in which the size of the frame 14 is more than 50 mm and 200 mm or less, the thickness of the film 18 is preferably 0.01 mm (10 μm) to 20 mm, more preferably 0.02 mm (20 μm) to 10 mm, and most preferably 0.05 mm (50 μm) to 5 mm.

Meanwhile, in a case in which one film 18 has a different thickness or the respective films 18 have different thicknesses, the thickness of the film 18 is preferably expressed as the average thickness.

The material of the film 18 is not particularly limited as long as, in the case of being formed to a film-like material or a foil-like material, the film 18 has an appropriate strength in the case of being applied to the above-described uses, has resistance to heat-shielding environments of applied articles, and is capable of reflecting or absorbing and thus shielding the energy of near-infrared light. Well-known heat ray-shielding materials or heat-shielding films of the related art can be used, and appropriate materials can be selected from the above-described materials or films depending on the uses, heat-shielding environments, and the like thereof. For example, as the material of the film 18, it is possible to use polyvinyl butyral (PVB) having heat-shielding performance, but it is also possible to use materials obtained by adding fine metal particles of silver or the like or fine conductive particles of a conductive antimony-containing tin oxide (ATO) or the like to a resin material.

Examples of the above-described resin materials include resin materials that can be formed to a film-like material such as polyvinyl butyral (PVB), polyethylene terephthalate (PET), polyimide, polymethyl methacrylate, polycarbonate, acrylic (PMMA), polyamide-imide, polyarylate, polyetherimide, polyacetal, polyetheretherketone, polyphenylene sulfide, polysulfone, polyethylene terephthalate, polybutylene terephthalate, polyimide, triacetyl cellulose (TAC), polyvinylidene chloride, low-density polyethylene, high-density polyethylene, aromatic polyamide, silicone resins, ethylene ethyl acrylate, vinyl acetate copolymers, polyethylene, chlorinated polyethylene, polyvinyl chloride, polymethyl pentene, and polybutene.

Meanwhile, examples of the material of the film 18 which does not need a function such as transparency or radio wave-transmitting properties include materials, structures, and the like capable of forming a thin structure such as metallic material that can be formed to a foil-like material such as aluminum, chromium, titanium, stainless steel, nickel, tin, niobium, tantalum, molybdenum, zirconium, gold, silver, platinum, palladium, iron, copper, and permalloy, paper, other materials that form a fibrous film such as cellulose, non-woven fabrics, films including nanosize fibers, porous materials such as thinly-processed urethane or THINSULATE, and carbon materials processed to a thin film structure.

The films 18 may be fixed to the plurality of frames 14 in the frame body 16 of the heat ray-shielding material 10 respectively and thus constitute the sheet-like film body 20 as a whole, or, conversely, the respective films 18 covering the respective frames 14 may be formed of one sheet-like film body 20 that is fixed so as to cover all of the frames 14. That is, the plurality of films 18 may be constituted of one sheet-like film body 20 that covers the plurality of frames 14. Alternatively, as an intermediate form, it is also possible to fix a sheet-like film body to some of the frames 14 so as to cover some of the plurality of frames 14 and thus form the films 18 covering the respective frames 14 and constitute the sheet-like film body 20 covering all of the plurality of frames 14 (all of the frames 14) using several sheet-like film bodies described above.

In addition, the film 18 is fixed to the frame 14 so as to cover an opening on at least one side of the opening 12 in the frame 14. That is, the film 18 may be fixed to the frame 14 so as to cover an opening 12 on one side or the other side or openings on both sides in the frame 14.

Here, all of the films 18 may be provided on the same side of the openings 12 in the plurality of frames 14 in the heat ray-shielding material 10, or it is also possible to provide some of the films 18 on one side of some of the openings 12 in the plurality of frames 14 and provide the remaining films 18 on the other side of the remaining openings 12 in the plurality of frames 14, and furthermore, the films provided on one side, on the other side, and on both sides of the openings 12 in the frames 14 may be present in a mixed form.

The method for fixing the films 18 to the frames 14 is not particularly limited, any methods may be used as long as the films 18 can be reliably and strongly fixed to the frames 14, and examples thereof include a method in which an adhesive is used, a method in which a physical fixing tool is used, and the like.

In the method in which an adhesive is used, the adhesive is applied onto the surfaces surrounding the openings 12 in the frames 14, the films 18 are placed thereon, and the films 18 are fixed to the frames 14 using the adhesive. The adhesive is not particularly limited, a variety of adhesives can be used, and examples thereof include epoxy-based adhesives (ARALDITE (manufactured by Nichiban Co., Ltd.) and the like), cyanoacrylate-based adhesives (ARON ALPHA (registered trademark) (manufactured by Toagose Co., Ltd.) and the like), acrylic adhesives, and the like. Particularly, as the adhesive, a variety of adhesives can be selected depending on the material of the frames and the material of the films. For example, as specific examples, in a case in which an acrylic resin is used for the frames 14 and, as the films 18, a triacetylcellulose (TAC) film is used to produce a transparent base material, as the adhesive, an epoxy/modified silicone resin-based adhesive EP001 manufactured by Cemedine Co., Ltd. can be used, and, in a case in which aluminum which is a metallic material is used for the frames 14, and silicone rubber is used for the films 18, the films can be adhered to the frames using a super X series manufactured by Cemedine Co., Ltd.

Examples of the method in which a physical fixing tool is used include a method in which the films 18 disposed so as to cover the openings 12 in the frames 14 are inserted between the frames 14 and a fixing member such as a rod and the fixing member is fixed to the frames 14 using a fixing tool such as screws.

Next, the specific constitution of a heat-shielding film having a variety of functions which is preferably used as the films in the heat ray-shielding material of the present invention will be described.

Figure 3:
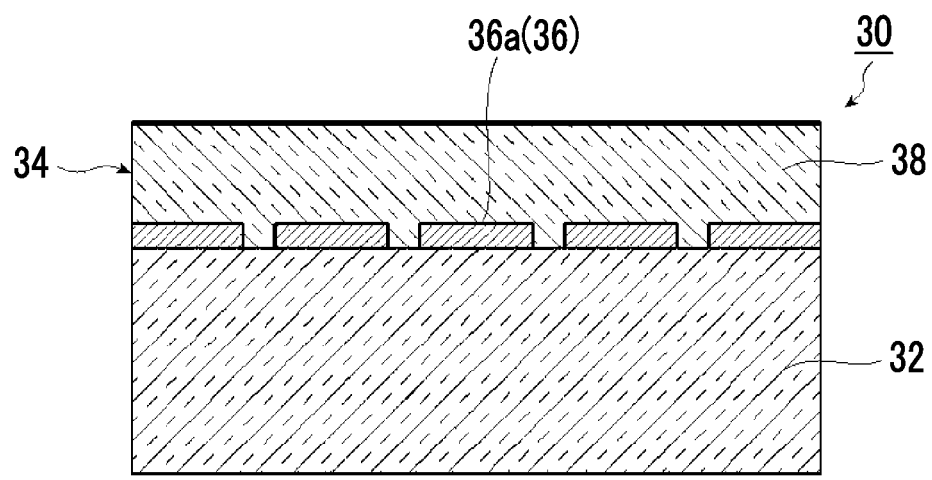
FIG. 3 is a schematic cross-sectional view of an example of a heat-shielding film of a first embodiment that is used as a film of the heat ray-shielding material illustrated in FIG. 1.

FIG. 3 is a schematic cross-sectional view of an example of a heat-shielding film of a first embodiment which is preferably used as the films in the heat ray-shielding material illustrated in FIG. 1.

(Heat-Shielding Film)

A heat-shielding film 30 illustrated in FIG. 3 is an element that is preferably used as the films 18 in the present invention, is an element which has a high reflected wavelength selectivity and a high reflection bandwidth selectivity and is excellent in terms of visible light-transmitting properties and radio wave-transmitting properties, and has is a base material 32 and a metal particle-containing layer 34 which is formed on the base material 32 and contains fine metal particles 36.

(Base Material)

The base material 32 is not particularly limited as long as the base material is an optically transparent substrate and can be appropriately selected depending on the purpose, and examples thereof include base materials having a visible light transmittance of 70% or more and preferably 80% or more and base materials having a high transmittance in the near-infrared range.

The material of the base material 32 is not particularly limited and can be appropriately selected depending on the purpose, and examples thereof include the above-described resin materials and the like for the films, and preferred examples thereof include resin materials such as polyethylene terephthalate (PET) and triacetyl cellulose (TAC).

(Metal Particle-Containing Layer)

The metal particle-containing layer 34 is a layer containing a plurality of metal particles 36 in a binder 38. The metal particle-containing layer 34 is not particularly limited as long as the layer contains at least one kind of metal particles 36 and can be appropriately selected depending on the purpose.

The metal particle-containing layer 34 includes at least metal plate particles 36a as the metal particles 36 and functions so as to shield light having a predetermined first optical wavelength ($\lambda$1) including the wavelengths of near-infrared light through the localized surface plasmon effect of the metal particles 36.

(Metal Particles)

The metal particles 36 are not particularly limited as long as the metal particles include the flat particles 36a of metal (hereinafter, also referred to as "metal plate particles") and can be appropriately selected depending on the purpose, and examples thereof include, in addition to the metal plate particles, particulate particles, cuboid-shaped particles, hexahedron-shaped particles, octahedron-shaped particles, rod-shaped particles, and the like.

The presence form of the metal particles 36 in the metal particle-containing layer 34 is not particularly limited as long as the metal particles are eccentrically located in a substantially horizontal manner with respect to the interface between the metal particle-containing layer 34 and the base material 32 and can be appropriately selected depending on the purpose, and examples thereof include a form in which the base material 32 and the metal particles 36 are in substantial contact with each other, a form in which the base material 32 and the metal particles 36 are disposed a constant distance away from each other in the depth direction of the heat-shielding film 30.

Meanwhile, the interface between the metal particle-containing layer 34 and the base material 32 refers to a surface on which one surface of the metal particle-containing layer 34 and the surface of the base material 32 are in contact with each other and is a flat surface similar to both surfaces.

The sizes of the metal particles 36 are not particularly limited and can be appropriately selected depending on the purpose, and the metal particles may have an average particle diameter of, for example, 500 nm or less.

The material of the metal particles 36 is not particularly limited, can be appropriately selected depending on the purpose, is preferably, for example, silver, gold, aluminum, copper, rhodium, nickel, platinum, indium tin oxide (ITO), titanium, an alloy thereof, or the like from the viewpoint of the high reflectivity of heat rays (near-infrared rays), and, among these, is most preferably silver.

The distribution state of the metal particles 36 is not particularly limited as long as a plurality of the fine metal particles does not form conduction paths, but is preferably a form in which 10% or more of the metal particles are disposed in an isolated manner and the remaining metal particles are distributed in a state of being in contact with adjacent particles and thus being partially connected to each other since it is possible to obtain a sufficient reflection prevention effect, more preferably a form in which 50% or more of the metal particles 36 are isolated and the remaining metal particles (less than 50%) are distributed in a state of being in contact with adjacent particles and thus being partially connected to each other, and most preferably a form in which the metal particles 36 are all (100%) isolated from one another in the plane direction. When less than 10% of the plurality of metal particles 36 is isolated and the remaining metal particles (90% or more) are distributed in a state of being in contact with adjacent particles and thus being partially connected to each other, fine metal particles are connected to one another from an end to the other end of an image and thus form conduction paths. In a case in which conduction paths are formed as described above, the absorbance of the metal particles of wavelengths in the visible light range increases, and the reflectivity also increases. Therefore, a state in which no conduction paths are formed by at least the metal particles is preferred.

Meanwhile, regarding whether or not conduction paths are formed, in a case in which the metal particles are continuously connected to one another from the left end to the right end of a 2.5 $\mu$m×2.5 $\mu$m region observed using SEM, conduction paths are determined to be formed, and, in a case in which the fine metal particles are separated from one another in the middle, conduction paths are determined to be not formed.

Meanwhile, in a case in which the distribution state of the metal particles 36 is a state in which no conduction paths are formed by the metal particles, it is also possible to transmit radio waves, and thus the heat-shielding film 30 also has radio wave-transmitting properties. Meanwhile, it is needless to say that the radio wave-transmitting properties become superior as the fraction of the fine metal particles which do not form any conduction paths and are disposed in an isolated manner increases.

(Metal Plate Particles)

Figure 4A:
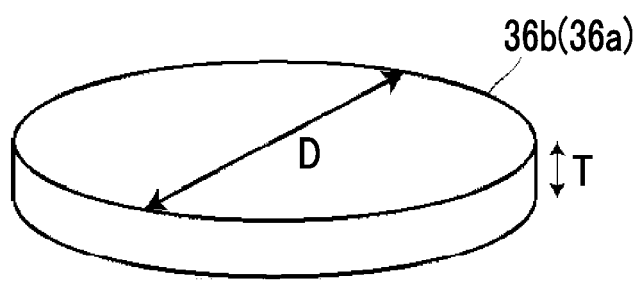
FIG. 4A is a schematic perspective view illustrating an example of a shape of a flat particle included in the heat-shielding film illustrated in FIG. 3 and illustrates a flat particle having a substantially disc shape.
Figure 4B:
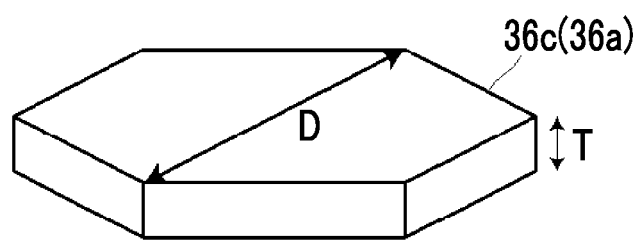
FIG. 4B is a schematic perspective view illustrating another example of the shape of the flat particle included in the heat-shielding film illustrated in FIG. 3 and illustrates a flat particle having a substantially hexagonal shape.

The metal plate particles 36a are not particularly limited as long as the particles are made of two principal flat surfaces (refer to FIG. 4A and FIG. 4B) and can be appropriately selected depending on the purpose, and examples thereof include substantially hexagonal particles, substantially disc-shaped particles, substantially triangular particles, and the like. Among these, polygonal particles in which the shape of the principal flat surface is hexagonal or higher or circular particles are preferred from the viewpoint of the high visible light transmittance, and, for example, metal plate particles 36b having a substantially disc shape as illustrated in FIG. 4A and metal plate particles 36c having a substantially hexagonal shape as illustrated in FIG. 4B are particularly preferred.

The substantially disc shape refers to a shape in which the number of sides having a length that is 50% or more of the average circle-equivalent diameter of the metal plate particles 36a, which will be described below, is zero per metal flat particle 36a. The metal flat particle having the substantially disc shape is not particularly limited as long as, in a case in which the metal flat particle is observed from above the principal flat surface using a transmission electron microscope (TEM), there are no corners and the shape is round and can be appropriately selected depending on the purpose.

The substantially hexagonal shape refers to a shape in which the number of sides having a length that is 20% or more of the average circle-equivalent diameter of the metal plate particles 36a, which will be described below, is six per metal flat particle 36a. Meanwhile, what has described above is also true for other polygonal shapes. The metal flat particle 36a having the substantially hexagonal shape is not particularly limited as long as, in a case in which the metal flat particle is observed from above the principal flat surface using a transmission electron microscope (TEM), the shape is a substantially hexagonal shape, can be appropriately selected depending on the purpose, may be a metal flat particle in which the corners of the hexagonal shape are sharp or a metal flat particle in which the corners of the hexagonal shape are smooth, but is preferably a metal flat particle in which the corners are smooth since it is possible to facilitate the absorption in the visible light range. The degree of the smoothness of the angles is not particularly limited and can be appropriately selected depending on the purpose.

Among the metal particles 36 present in the metal particle-containing layer 34, the fraction of the number of the metal plate particles 36a having the substantially hexagonal shape or the substantially disc shape in the total number of the metal particles is preferably 60% or more, more preferably 65% or more, and still more preferably 70% or more. In a case in which the fraction of the number of the metal plate particles 36a is less than 60%, there are cases in which the visible light transmittance decreases.

[Plane Orientation]

In the heat-shielding film 30, the principal flat surfaces of the metal plate particles 36a are preferably plane-oriented in a predetermined range with respect to one surface (the interface with the base material 32) of the metal particle-containing layer 34.

The presence state of the metal plate particles 36a is not particularly limited and can be appropriately selected depending on the purpose, but the metal plate particles 36a are preferably segregated on one surface of the metal particle-containing layer 34 and are more preferably arranged on a substrate as illustrated in FIG. 3.

The plane orientation is not particularly limited as long as the principal flat surfaces (the surfaces determining a circle-equivalent diameter D: refer to FIG. 4A and FIG. 4B) of the metal plate particles 36a and one surface (the interface with the base material 32) of the metal particle-containing layer 34 are substantially parallel to each other in a predetermined range and can be appropriately selected depending on the purpose. The angle (±θ) of the plane orientation is preferably 0° to ±30°, more preferably 0° to ±20°, and particularly preferably 0° to 10°.

Figure 5A:
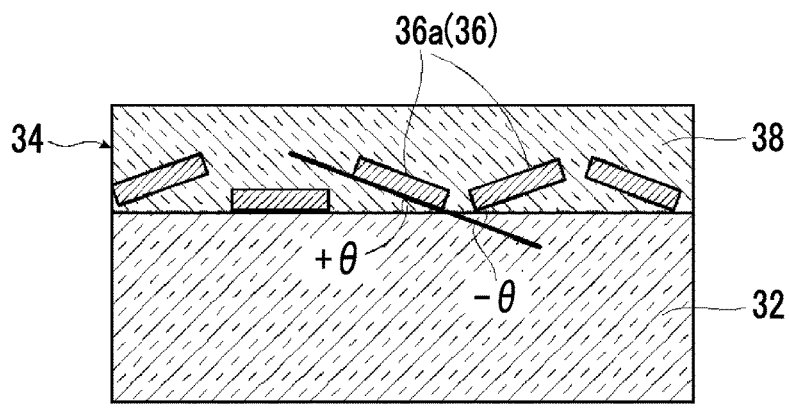
FIG. 5A is a schematic cross-sectional view illustrating a presence state of a metal particle-containing layer including metal plate particles in the heat-shielding film of the present invention and illustrates a view describing an angle (θ) formed between a flat surface of a substrate and a flat surface of the flat particle.
Figure 5B:
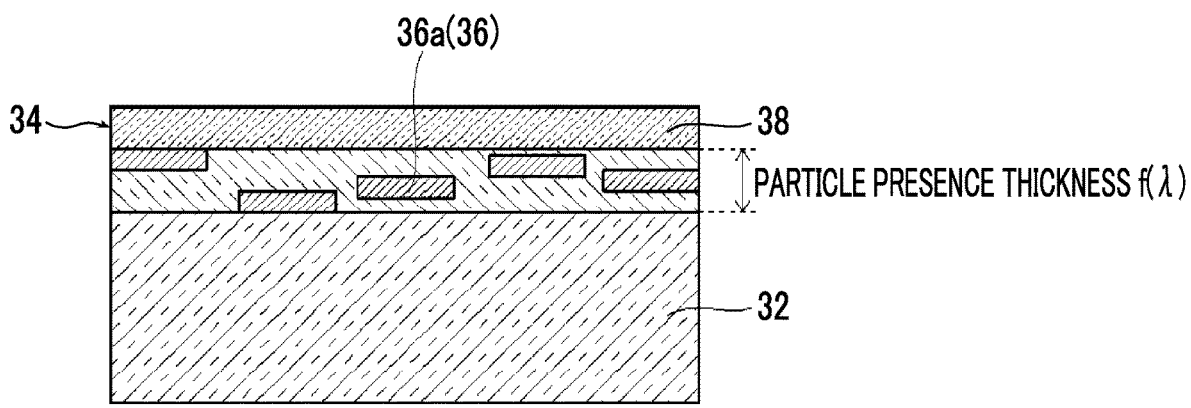
FIG. 5B is a schematic cross-sectional view illustrating a presence state of the metal particle-containing layer including the metal plate particles in the heat-shielding film of the present invention and is a view illustrating a presence region of the metal particle-containing layer in a depth direction of a heat-shielding film 30.

Here, FIG. 3 illustrates the most ideal presence state of the metal plate particles 36a in the metal particle-containing layer 34 in the heat-shielding film 30. FIG. 5A and FIG. 5B are schematic cross-sectional views illustrating the presence states of the metal plate particles 36a in the metal particle-containing layer 34 in the heat-shielding film. FIG. 5A is a view describing the angle (±θ) formed between the flat surface of the base material 32 and the flat surface of the metal flat particle 36a. FIG. 5B illustrates the presence region of the metal particle-containing layer 34 in the depth direction of the heat-shielding film 30.

In FIG. 5A, the angle (±θ) formed between the surface of the base material 32 and the principal flat surface of the metal flat particle 36a or an extended line of the principal flat surface corresponds to the predetermined range in the plane orientation. That is, the plane orientation refers to a state in which the inclination angle (±θ) illustrated in FIG. 5A is small in a case in which the cross section of the heat-shielding film 30 is observed, and particularly, FIG. 3 illustrates a state in which the surface of the base material 32 and the principal flat surface of the metal flat particle 36a are in contact with each other, that is, a state in which 0 is 0°. In a case in which the cross section of the heat-shielding film 30 is observed, the metal plate particles 36a are more preferably oriented in a state in which the inclination angle (±θ) illustrated in FIG. 5A is small. In a case in which the angle of the plane orientation of the principal flat surface of the metal plate particles 36a with respect to the surface of the base material 32, that is, 0 in FIG. 5A exceeds ±30°, there is a concern that the reflectivity of the heat-shielding film 30 of predetermined wavelengths (for example, the near-infrared range from the long wavelength side of the visible light range) may decrease, the absorption of visible light may increase, or haze may increase.

In addition, the percentage of the number of the metal plate particles 36a in which the angle θ is plane-oriented in a range of 0° to ±30° is preferably 50% or more, more preferably 70% or more, and still more preferably 90% or more of all of the metal plate particles.

[Evaluation of Plane Orientation]

The evaluation of whether or not the principal flat surfaces of the metal plate particles 36a are plane-orientated with respect to one surface (the interface with the base material 32) of the metal particle-containing layer 34 is not particularly limited, can be appropriately selected depending on the purpose, and may be, for example, a method in which an appropriate sectional segment is produced, and the metal particle-containing layer 34 or the base material 32 and the metal plate particles 36a are observed in the segment, thereby evaluating the plane orientation. Specific examples thereof include a method in which a sectional sample or a sectional segment sample of the heat-shielding film 30 is produced from the heat-shielding film 30 using a microtome or a focused ion beam (FIB) and the plane orientation is evaluated from an image obtained by observing the sample using a variety of microscopes (for example, field emission scanning electron microscope (FE-SEM) or the like) and the like.

In a case in which the binder 38 coating the metal plate particles 36a is swollen by water in the heat-shielding film 30, the sectional sample or the sectional segment sample may be produced by cutting a specimen in a state of being frozen by liquid nitrogen using a diamond cutter mounted in a microtome. In addition, in a case in which the binder 38 coating the metal plate particles 36a is not swollen by water in the heat-shielding film 30, the sectional sample or the sectional segment sample may be produced.

The observation of the sectional sample or the sectional segment sample produced as described above is not particularly limited as long as it is possible to confirm in the sample whether or not the principal flat surfaces of the metal plate particles 36a are plane-oriented with respect to one surface (the interface with the base material 32) of the metal particle-containing layer 34 and can be appropriately selected depending on the purpose, and examples thereof include observations in which FE-SEM, TEM, an optical microscope, or the like is used. In the case of the sectional sample, evaluation may be carried out using FE-SEM, and, in the case of the sectional segment sample, observation may be carried out using TEM. In a case in which observation is carried out using FE-SEM, FE-SEM preferably has a space resolution that is high enough to clearly determine the shapes and inclination angles (±θ in FIG. 5A) of the metal plate particles.

[Average Particle Diameter (Average Circle-Equivalent Diameter) and Coefficient of Variation of Particle Size Distribution Thereof]

The circle-equivalent diameter which serves as the particle diameter is expressed by the diameter of a circle having the same area as the projected area of each particle. The projected area of each particle can be obtained using a well-known method in which the area is measured on an electron microscopic (TEM) image and the magnification ratio is amended.

The average particle diameter (average circle-equivalent diameter) of the metal plate particles 36a is not particularly limited, can be appropriately selected depending on the purpose, and is preferably 70 nm to 500 nm and more preferably 100 nm to 400 nm. In a case in which the average particle diameter (average circle-equivalent diameter) is less than 70 nm, a greater contribution is made by absorption by the metal plate particles than reflection, and thus there are cases in which a sufficient heat ray-reflecting power cannot be obtained, and, in a case in which the average particle diameter exceeds 500 nm, haze (scattering) intensifies, and there are cases in which the transparency of the substrate is impaired.

Here, the average particle diameter (average circle-equivalent diameter) refers to the average value of the principal flat surface diameters (maximum lengths) of 200 flat particles that are arbitrarily selected from an image obtained by observing the particles using TEM. That is, the average particle diameter (average circle-equivalent diameter) can be obtained by calculating the arithmetic average from a particle diameter distribution (particle size distribution) obtained from the statistics of the circle-equivalent diameters D of 200 metal plate particles.

The metal particle-containing layer may contain two or more kinds of metal particles having different average particle diameters (average circle-equivalent diameters), and, in this case, the metal particle-containing layer may have two or more peaks of the average particle diameter (average circle-equivalent diameter) of the metal particles, that is, two average particle diameters (average circle-equivalent diameters).

In the heat-shielding film 30, the coefficient of variation in the particle size distribution of the metal plate particles 36a is preferably 30% or less and more preferably 10% or less. In a case in which the coefficient of variation exceeds 30%, there are cases in which the reflected wavelength range of heat rays in the heat-shielding film becomes broad.

Here, the coefficient of variation in the particle size distribution of the metal plate particles can be obtained as, for example, a value (%) obtained by dividing the standard deviation of the particle size distribution by the above-described average particle diameter (average circle-equivalent diameter). That is, the coefficient of variation is a value (%) obtained by plotting the distribution range of the particle diameters of 200 metal plate particles that are used in the computation of the above-described average value, obtaining the standard deviation of the particle size distribution, and dividing the standard deviation by the average value (average particle diameter (average circle-equivalent diameter)) of the above-described principal flat surface diameters (maximum lengths).

The sizes of the metal plate particles 36a are not particularly limited and can be appropriately selected depending on the purpose, and the average particle diameter is preferably 10 to 500 nm, more preferably 20 to 300 nm, and still more preferably 50 to 200 nm.

[Thickness and Aspect Ratio of Metal Plate Particles]

In the heat-shielding film that is used in the present invention, the thicknesses T of the metal plate particles 36a are not particularly limited, but are preferably 20 nm or less, more preferably 2 to 15 nm, and particularly preferably 4 to 12 nm.

The particle thickness T corresponds to the distance between the principal flat surfaces of the metal flat particle and is, for example, as illustrated in FIG. 4A and FIG. 4B. The particle thickness T can be measured using an atomic force microscope (AFM) or a transmission electron microscope (TEM).

The method for measuring the average particle thickness using AFM is not particularly limited and can be appropriately selected depending on the purpose, and examples thereof include a method in which a particle dispersion liquid containing the metal plate particles is added dropwise and dried on a glass substrate and the thickness of one particle is measured.

Examples of the method for measuring the average particle thickness using TEM include a method in which a particle dispersion liquid containing the metal plate particles is added dropwise and dried on a silicon substrate, then, a coating treatment is carried out by means of carbon deposition or metal deposition, a section segment is produced through a focused ion beam (FIB) process, and the cross section is observed using TEM, thereby measuring the thicknesses of the particles.

In the present invention, the ratio D/T (aspect ratio) of the diameter D (average particle diameter or average circle-equivalent diameter) of the metal flat particle 36a to the average thickness T is not particularly limited and can be appropriately selected depending on the purpose. From the viewpoint of the absorption of visible light and a decrease in haze and the viewpoint of an increase in the reflectivity in the near-infrared range from the long wavelength side of the visible light range, the aspect ratio is preferably 3 or more, more preferably 3 to 80, still more preferably 4 to 60, and even still more preferably 5 to 40. In a case in which the aspect ratio is 3 or more, the absorption of visible light can be suppressed, and, in a case in which the aspect ratio is less than 60, haze in the visible light range can also be suppressed. In a case in which the aspect ratio is less than 3, the reflected wavelength becomes smaller than 500 nm, and, in a case in which the aspect ratio exceeds 80, the reflected wavelength becomes longer than 2,000 nm, and there are cases in which sufficient heat ray-reflecting power cannot be obtained.

Figure 6:
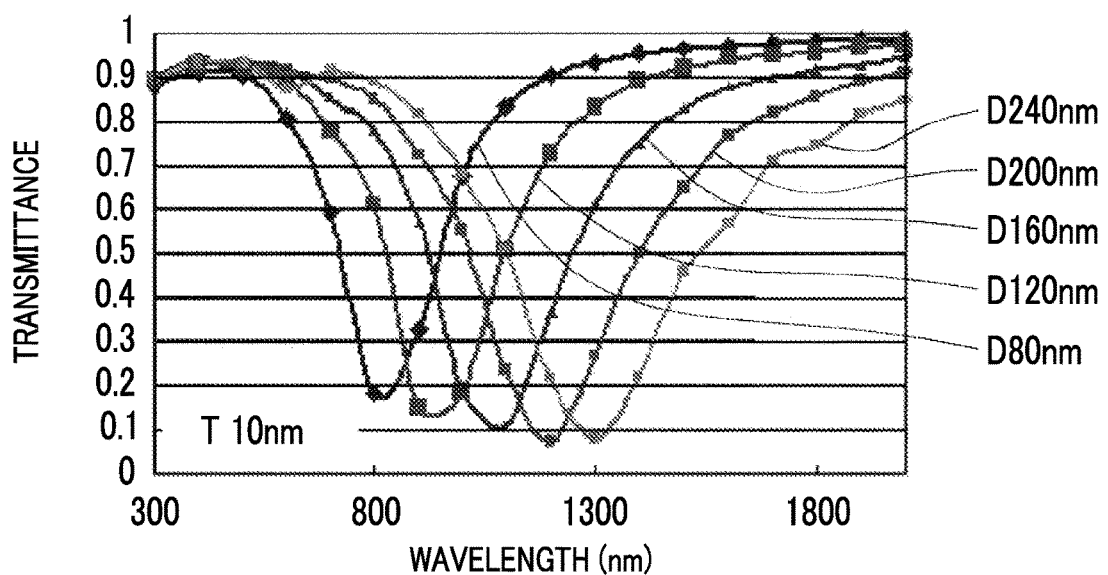
FIG. 6 is a graph illustrating simulation of wavelength reliance of transmittances of individual aspects of the metal plate particles.

FIG. 6 illustrates the simulation results of the wavelength reliance of transmittance in a case in which the aspect ratio of circular metal plate particles changes. Studies were made regarding circular metal plate particles 36b having a thickness T set to 10 nm and a diameter D changed to 80 nm, 120 nm, 160 nm, 200 nm, and 240 nm respectively. As illustrated in FIG. 6, as the aspect ratio increases, the absorption peak (the bottom of the transmittance) shifts toward the long wavelength side, and, as the aspect ratio decreases, the absorption peak shifts toward the short wavelength side. In a case in which the aspect ratio becomes less than 3, the absorption peak comes close to the visible light range, and, at an aspect ratio of 1, the absorption peak is in the visible light range. In a case in which the aspect ratio is 3 or more as described above, it is possible to improve the transmittance of visible light, which is preferable. Particularly, the aspect ratio is more preferably 5 or more.

[Presence Range of Metal Plate Particles]

In the heat-shielding film 30 illustrated in FIG. 3, when the plasmon resonance wavelength (the absorption peak wavelength in FIG. 6) of metal constituting the metal plate particles 36a in the metal particle-containing layer 34 is represented by λ as illustrated in FIG. 5B, and the refractive index of the medium in the metal particle-containing layer 34 is represented by n, the metal particle-containing layer 34 is preferably present in a range of (λ/n)/4 in the depth direction from the horizontal surface of the heat-shielding film 30. In a case in which the metal particle-containing layer is outside this range, due to the phases of reflected waves in interfacial air interfaces of silver layers present on the upper side and the lower side of the heat-shielding film 30, the effect of causing the amplitudes of the reflected waves to constructively interfere with each other weakens, and there are cases in which haze characteristics, visible light transmittance, and heat ray maximum reflectivity decrease.

The plasmon resonance wavelength λ of metal constituting the metal plate particles 36a in the metal particle-containing layer 34 is not particularly limited and can be appropriately selected depending on the purpose, but is preferably 400 nm to 2,500 nm from the viewpoint of imparting heat ray-reflecting performance and, furthermore, more preferably 700 nm to 2,500 nm from the viewpoint of imparting visible light transmittance.

(Binder)

The binder (medium) 38 in the metal particle-containing layer 34 is not particularly limited and can be appropriately selected depending on the purpose, but preferably includes a polymer and more preferably includes a transparent polymer. Examples of the polymer include polyvinyl acetal resins, polyvinyl alcohol resins, polyvinyl butyral resins, polyacrylate resins, polymethyl methacrylate resins, polycarbonate resins, polyvinyl chloride resins, (saturated) polyester resins, polyurethane resins, macromolecules such as natural macromolecules such as gelatin and cellulose, inorganic substances such as silicon dioxide and aluminum oxide, and the like. Among these, the principal polymer is preferably a polyvinyl alcohol resin, a polyvinyl butyral resin, a polyvinyl chloride resin, a (saturated) polyester resin, or a polyurethane resin and more preferably a polyester resin and a polyurethane resin.

Among polyester resins, saturated polyester resins are more particularly preferred since the resins do not include any double bonds and are thus not capable of imparting excellent weather fastness. In addition, saturated polyester resins more preferably include a hydroxyl group or a carboxyl group in a molecular terminal since high hardness, durability, and heat resistance can be obtained when the resins are cured with a water-soluble and water-dispersive curing agent.

As the polymer, commercially procurable polymers can also be preferably used, and examples thereof include PLAS COAT Z-687 which is a water-soluble polyester resin manufactured by Goo Chemical Co., Ltd. and the like.

In addition, in the present specification, the principal polymer in the metal particle-containing layer refers to a polymer component accounting for 50% by mass or more of the polymer in the metal particle-containing layer.

The content of the polyester resin and the polyurethane resin with respect to the fine metal particles in the metal particle-containing layer is preferably 1% to 10,000% by mass, more preferably 10% to 1,000% by mass, and particularly preferably 20% to 500% by mass.

The refractive index n of the binder 38 is preferably 1.4 to 1.7.

[Area Ratio of Metal Plate Particles]

The area ratio [(B/A)×100] which is the fraction of the total value B of the areas of the metal plate particles 36a in the area A (the entire projected area A of the metal particle-containing layer 34 when seen in a perpendicular direction to the metal particle-containing layer 34) of the base material 32 when the heat-shielding film 30 is seen from the above is preferably 15% or more and more preferably 20% or more and less than 70%. In a case in which the area ratio is less than 15%, the maximum reflectivity of heat rays decreases, and there are cases in which the heat-shielding effect cannot be sufficiently obtained. In a case in which the area ratio is less than 70%, conduction paths are not formed, and it is possible to suppress a decrease in the transmittance by suppressing the absorption and reflection of visible light.

Here, the area ratio can be measured by, for example, processing an image obtained by observing the heat-shielding film 30 substrate from the above using SEM or an atomic force microscope (AFM).

[Average Inter-Particle Distance of Metal Plate Particles]

The average inter-particle distance between the metal plate particles adjacent to each other in the horizontal direction in the metal particle-containing layer is preferably ¹⁄₁₀ or more of the average particle diameter of the metal plate particles from the viewpoint of visible light transmittance and the maximum reflectivity of heat rays.

In a case in which the average inter-particle distance between the metal plate particles in the horizontal direction is less than ¹⁄₁₀ of the average particle diameter of the metal plate particles, the maximum reflectivity of heat rays decreases. In addition, the average inter-particle distance in the horizontal direction is preferably not uniform (random) from the viewpoint of visible light transmittance. In a case in which the average inter-particle distance is not random, that is, uniform, the absorption of visible light occurs, and there are cases in which the transmittance decreases.

Here, the average inter-particle distance between the metal plate particles in the horizontal direction refers to the average value of inter-particle distances between two particles adjacent to each other. In addition, the average inter-particle distance being random means that "when the two-dimensional autocorrelation of the brightness value in the binarization of a SEM image including 100 or more metal plate particles is taken, a meaningful maximum value is present only at the original point".

[Distance Between Adjacent Metal Particle-Containing Layers]

In the heat-shielding film 30 of the present embodiment, the metal plate particles 36a are disposed in a form of the metal particle-containing layer 34 including the metal plate particles 36a as illustrated in FIG. 3, FIG. 5A, FIG. 5B, and FIG. 7.

Figure 7:
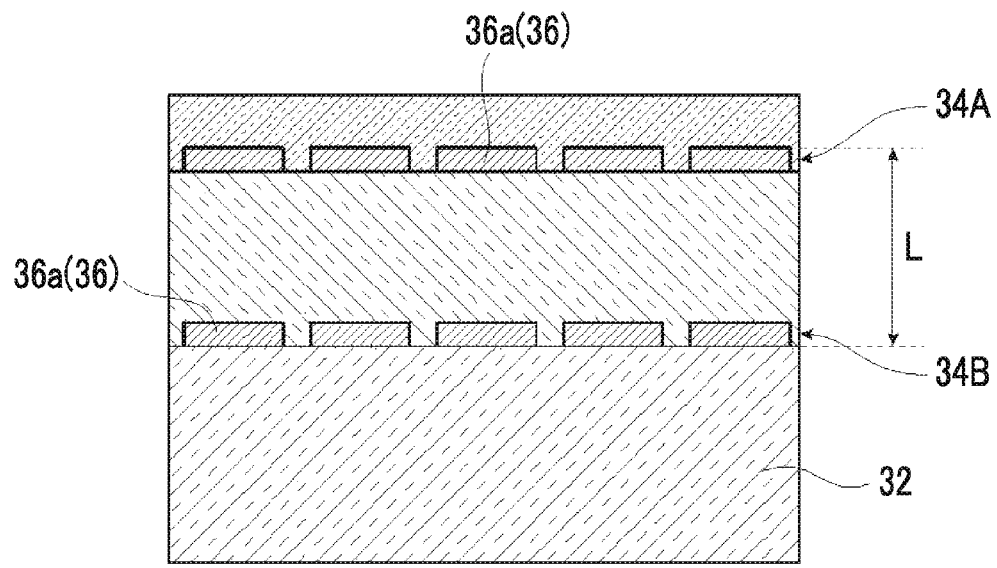
FIG. 7 is a schematic cross-sectional view illustrating a heat-shielding film having a plurality of metal particle-containing layers.

The metal particle-containing layer 34 may be constituted as a single layer as illustrated in FIG. 3, FIG. 5A, and FIG. 5B or may be constituted as a plurality of metal particle-containing layers as illustrated in FIG. 7. In a case in which the metal particle-containing layer is constituted as a plurality of metal particle-containing layers as illustrated in FIG. 4, it becomes possible to appropriately impart heat-shielding performance to wavelength ranges in which heat-shielding performance needs to be imparted.

In a case in which a plurality of metal particle-containing layers are laminated together, the distance between adjacent metal particle-containing layers is preferably 15 µm or more from the viewpoint of suppressing multiple scattering.

Here, the distance L between adjacent metal particle-containing layers refers to the distance between a metal particle-containing layer 34A and a metal particle-containing layer 34B in FIG. 7.

In a case in which the distance between adjacent metal particle-containing layers is less than 15 µm, the pitch width of the interference peak of the metal plate particles becomes larger than 1/10 of the resonance peak half width (approximately 300 nm to 400 nm) of the metal particle-containing layer including the metal plate particles, and there is an influence on the reflection spectrum, which is not preferable.

Here, the distance between adjacent metal particle-containing layers can be measured from, for example, an image obtained by observing a cross-sectional specimen of the heat-shielding film 30 using SEM.

[Method for Synthesizing Metal Plate Particles]

The method for synthesizing the metal plate particles is not particularly limited as long as the metal plate particles can be synthesized to a substantially hexagonal shape or a substantially disc shape and can be appropriately selected depending on the purpose, and examples thereof include liquid phase methods such as a chemical reduction method, a photochemical reduction method, and an electrochemical reduction method and the like.

Among these, liquid phase methods such as a chemical reduction method and a photochemical reduction method are particularly preferred from the viewpoint of shape and size controllability. Substantially hexagonal or substantially disc-like metal plate particles may be obtained by, for example, after the synthesis of hexagonal or triangular metal plate particles, carrying out an etching treatment using a dissolution species that dissolves silver such as nitric acid or sodium sulfite or an aging treatment by means of heating so as to smooth the corners of the hexagonal or triangular metal plate particles.

As another method for synthesizing the metal plate particles, it is also possible to fix seed crystals to the surface of a transparent substrate such as a film or a glass substrate in advance and then crystallize and grow metal particles (for example, Ag) in a flat shape.

In the heat-shielding film of the present embodiment, an additional treatment may be carried out on the metal plate particles in order to impart desired characteristics. The additional treatment is not particularly limited and can be appropriately selected depending on the purpose, and examples thereof include the formation of a high-refractive index shell layer, the addition of a variety of additives such as a dispersant and an antioxidant, and the like.

[Formation of High-Refractive Index Shell Layer]

The metal plate particles may be coated with a high-refractive index material having high transparency in the visible light range in order to further enhance transparency in the visible light range.

The high-refractive index material is not particularly limited and can be appropriately selected depending on the purpose, and examples thereof include $TiO_x$, $BaTiO_3$, ZnO, $SnO_2$, $ZrO_2$, $NbO_x$, and the like.

The coating method is not particularly limited, can be appropriately selected depending on the purpose, and may be a method in which, as reported in, for example, Langmuir, 2000, Vol. 16, pp. 2731 to 2735, a $TiO_x$ layer is formed on the surfaces of the metal plate particles of silver by hydrolyzing tetrabuthoxytitanium.

In addition, in a case in which it is difficult to directly form a high-refractive index metal oxide layer shell on the metal plate particles, it is also possible to synthesize metal plate particles as described above, then, appropriately form a shell layer of $SiO_2$ or a polymer, and furthermore, form a metal oxide layer on the shell layer. In a case in which $TiO_x$ is used as the material of the high-refractive index metal oxide layer, there is a concern that a matrix that disperses the metal plate particles may be deteriorated due to the photocatalytic activity of $TiO_x$, and thus it is also possible to form a $TiO_x$ layer on the metal plate particles according to the purpose and then appropriately form a $SiO_2$ layer.

[Addition of Various Additives]

In the heat-shielding film of the present embodiment, the metal plate particles may adsorb an antioxidant such as mercaptotetrazole or ascorbic acid in order to prevent the oxidation of the metal, such as silver, constituting the metal plate particles. In addition, for the purpose of preventing oxidation, an oxidation sacrificial layer of Ni or the like may be formed on the surfaces of the metal plate particles. In addition, for the purpose of shielding oxygen, the metal plate particles may be coated with a metal oxide film of $SiO_2$ or the like.

To the metal plate particles, for the purpose of imparting dispersibility, a dispersant such as a low-molecular-weight dispersant including a N element, a S element, and a P element, for example, a quaternary ammonium salt, an amine, or a high-molecular-weight dispersant may be added.

[Method for Manufacturing Heat-Shielding Film]

The method for manufacturing the heat-shielding film of the present embodiment is not particularly limited and can be appropriately selected depending on the purpose, and examples thereof include methods in which, on the substrate, a dispersion liquid having the metal plate particles is applied using a dip coater, a die coater, a slit coater, a bar coater, or a gravure coater, or the like or is plane-oriented using a method such as an LB film method, a self-assembly method, or spray coating.

In addition, in order to enhance the adsorption property or plane orientation property of the metal plate particles on the surface of the substrate, the heat-shielding film may be manufactured using a method in which the plane is oriented using electrostatic interaction. Specifically, in a case in which the surfaces of the metal plate particles are negatively charged (for example, a state in which the metal plate particles are dispersed in a negatively-charging medium such as citric acid), the heat-shielding film may be manufactured using a method in which the plane is oriented by positively charging the surface of the substrate (for example, modifying the surface of the substrate with an amino group or the like) and electrostatically enhancing the plane orientation property. In addition, in a case in which the surfaces of the metal plate particles are hydrophilic, it is also possible to form a hydrophobic sea-island structure on the surface of the substrate using a blocked copolymer, a micro contact stamp method, or the like and control the plane orientation property and the inter-particle distances between the metal plate particles using hydrophilic and hydrophobic interactions.

Meanwhile, in order to accelerate the plane orientation, the metal plate particles may be caused to pass through crimping rollers such as calender rollers or laminating rollers after being coated.

(Other Members)

(Protective Layer)

The heat-shielding film 30 of the present embodiment preferably has a protective layer in order to improve the adhesiveness to the substrate or mechanically protect the heat-shielding film.

The protective layer is not particularly limited, can be appropriately selected depending on the purpose, and contains, for example, a binder, a surfactant, and a viscosity adjuster and further contains other components as necessary.

The binder in the protective layer is not particularly limited, can be appropriately selected depending on the purpose, and preferably has high visible light transparency or high solar radiation transparency, and examples thereof include acrylic resins, polyvinyl butyral, polyvinyl alcohol, and the like. Meanwhile, in a case in which the binder absorbs heat rays, the reflection effect of the metal plate particles weakens, and thus, in a case in which an interlayer is formed between a heat ray source and the metal plate particles, it is preferable to select a material that does not absorb rays having wavelengths in a range of 780 nm to 1,500 nm or decrease the thickness of the protective layer.

The solar radiation reflectivity of the heat-shielding film of the present embodiment preferably has the maximum value in a range of 600 nm to 2,000 nm (preferably 700 nm to 1,600 nm) since it is possible to increase the efficiency of the heat ray reflectivity.

The visible light transmittance of the heat-shielding film of the present embodiment is preferably 60% or more. In a case in which the visible light transmittance is less than 60%, there are cases in which the heat-shielding film does not allow the outside to be visible in the case of being used as glass for cars or glass for buildings.

The haze of the heat-shielding film of the present embodiment is preferably 20% or less. In a case in which the haze exceeds 20%, there are cases in which the heat-shielding film does not allow the outside to be visible and is not preferable in terms of safety in the case of being used as glass for cars or glass for buildings.

The heat-shielding film of the present embodiment has high reflected wavelength selectivity and high reflection bandwidth selectivity and is capable of exhibiting excellent performance in terms of visible light-transmitting properties and radio wave-transmitting properties.

Next, the specific constitution of a heat-shielding film of a second embodiment which is preferably used as the film in the heat ray-shielding material of the present invention will be described.

Figure 8:
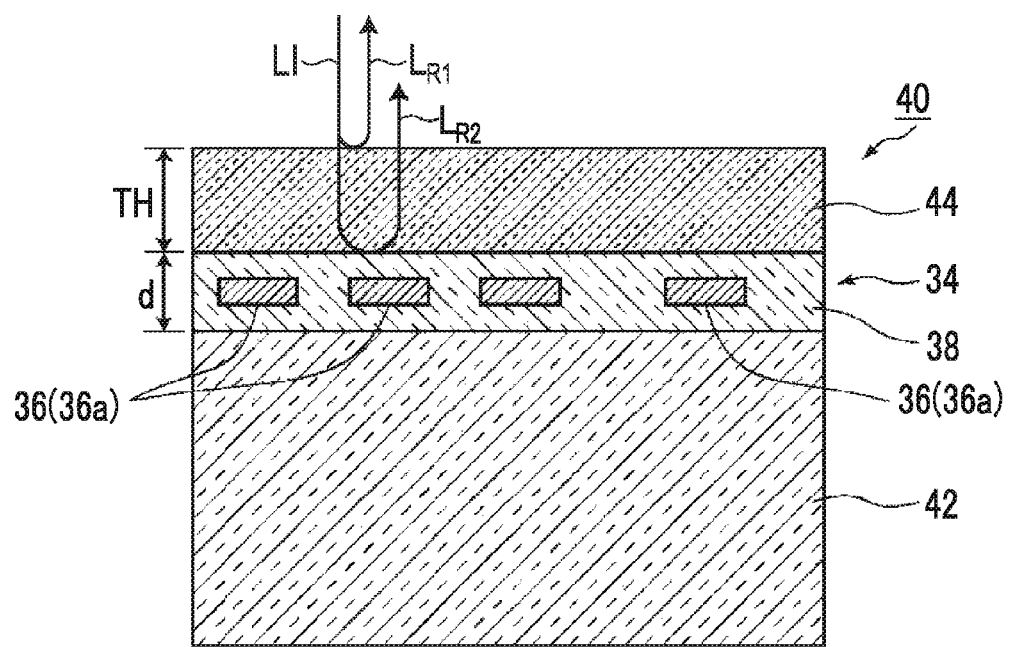
FIG. 8 is a schematic cross-sectional view of an example of a heat-shielding film of a second embodiment that is used as the film of the heat ray-shielding material illustrated in FIG. 1.

FIG. 8 is a schematic cross-sectional view of an example of the heat-shielding film of the second embodiment which is preferably used as the films in the heat ray-shielding material illustrated in FIG. 1.

(Heat-Shielding Film)

A heat-shielding film 40 illustrated in FIG. 8 is an element that is preferably used as the films 18 in the present invention, is an element capable of providing a high reflection prevention effect in a wider bandwidth width without causing a decrease in the transmittance, particularly, the visible light transmittance, and has a laminate structure in which a transparent base material 42 having a first refractive index n1 that is higher than the refractive index n0 of a medium, the metal particle-containing layer 34 containing the plurality of fine metal particles 36, and a dielectric layer 44 having a second refractive index n2 that is higher than the refractive index n0 of the medium.

Meanwhile, the heat-shielding film 40 illustrated in FIG. 8 is significantly different from the heat-shielding film 30 illustrated in FIG. 3 in terms of the dielectric layer 44 laminated on the metal particle-containing layer 34, but the transparent base material 42 and the base material 32 are similar to each other, and the constitutions of the metal particle-containing layers 34 are substantially the same as each other so as to have the same reference number, and thus, in the following description, the common portions will not be described, and different portions will be mainly described.

In the heat-shielding film 40 of the present embodiment, similar to the heat-shielding film 30 illustrated in FIG. 3, 60% or more of the total number of the plurality of metal particles 36 in the metal particle-containing layer 34 are metal plate particles having a ratio of the diameter to the thickness (aspect ratio) of 3 or more, the principal flat surfaces of the metal plate particles are plane-oriented in a range of 00 to 300 with respect to the surface of the metal particle-containing layer 34, and, in the metal particle-containing layer 34, the plurality of metal particles 36 is disposed without forming conduction paths.

In addition, the thickness TH of the dielectric layer 44 is a thickness at which reflected light LR1 on the surface of the dielectric layer in a case in which an incidence light enters the laminate structure from the surface side of the dielectric layer 44 interferes with reflected light LR2 on the interface between the dielectric layer 44 and the metal particle-containing layer 34 and thus vanishes.

The predetermined medium refers to a medium that fills the space in which the heat-shielding film is used, may be, basically, a medium other than the air (n0=1), for example, water (n0=1.33), varies depending on the use of the heat-shielding film, and is not limited by any means. Therefore, the refractive indexes of the respective layers are appropriately set depending on uses (mediums in spaces in which the heat-shielding film is used).

An incidence light having a predetermined wavelength refers to light having a wavelength at which reflection needs to be prevented, and the wavelength can be arbitrarily set depending on the purpose, but is set to, for example, 380 nm to 780 nm that is the wavelength range of visible light that is visible to human eyes.

In addition, for the reflection prevention effect, the wavelength range in which the reflectivity is 0.5% or less is preferably in a range of 100 nm or more.

Individual elements of an optical member of the present invention will be described in more detail.

(Transparent Base Material)

The transparent base material 42 is not particularly limited as long as the transparent base material has a first refractive index n1 that is higher than the refractive index n0 of the predetermined medium and is optically transparent to the incidence light having the predetermined wavelength and can be appropriately selected depending on the purpose. In the following description, the incidence light having the predetermined wavelength refers to visible light. Examples of the transparent base material include transparent base materials having a visible light transmittance of 70% or more and preferably 80% or more, transparent base materials having a high transmittance in the near-infrared range, and the like.

The first refractive index n1 simply needs to be higher than the refractive index n0 of the predetermined medium; however, as the refractive index difference increases, light incident on the transparent base material is more significantly reflected, and the necessity of preventing reflection intensifies, and thus the refractive index difference is preferably 12% or more and particularly 20% or more of the refractive index of the predetermined medium. Particularly, in a case in which the predetermined medium is the air and n0=1, the refractive index difference increases, and thus the present invention is more effective.

The transparent base material 42 is not particularly limited in terms of the shape, structure, size, material, and the like and can be appropriately selected depending on the purpose.

Examples of the shape include a film shape, a flat shape, and the like, the structure may be a single layer structure or a laminate structure, and the size may be specified depending on the use.

Examples of the material of the transparent base material 42 include films made of glass, a polyolefin-based resin such as polyethylene, polypropylene, poly 4-methylpentene-1, or polybutene-1; a polyester-based resin such as polyethylene terephthalate or polyethylene naphthalate; a polycarbonate-based resin, a polyvinyl chloride-based resin, a polyphenylene sulfide-based resin, a polyether sulfone-based resin, a polyethylene sulfide-based resin, a polyphenylene ether-based resin, a styrene-based resin, an acrylic resin, a polyamide-based resin, a polyimide-based resin, and a cellulose-based resin such as cellulose acetate, and laminated films thereof. Among these, a triacetylcellulose (TAC) film and a polyethylene terephthalate (PET) film are preferred.

When the transparent base material 42 has a flat shape or a film shape, the thickness is not particularly limited and can be appropriately selected depending on the intended use of reflection prevention. In a case in which the transparent base material has a film shape, generally, the thickness is approximately 10 μm to 500 μm. The thickness of the transparent base material 42 is preferably 10 μm to 100 μm, more preferably 20 to 75 μm, and particularly preferably 35 to 75 μm. In a case in which the thickness of the transparent base material 42 is sufficiently thick, there is a tendency that adhesion troubles are not easily caused. In addition, in a case in which the thickness of the transparent base material 42 is sufficiently thin, in the case of being attached to architectural materials or window glass of cars as an antireflection film, there is a tendency that the transparent base material is not too strong as a material and is easily worked. Furthermore, in a case in which the thickness of the transparent base material 42 is sufficiently thin, there is a tendency that the visible light transmittance increases and the raw material cost can be suppressed.

(Metal Particle-Containing Layer)

In the heat-shielding film 40 of the present embodiment as well, similar to the heat-shielding film 30 illustrated in FIG. 3, the metal particle-containing layer 34 is a layer in which the plurality of metal particles 36 is included in the binder 38, has the same basic constitution, and is only different in terms of preferred forms of the function or properties, and thus only the differences will be described.

[Average Particle Diameter (Average Circle-Equivalent Diameter) and Coefficient of Variation]

In the heat-shielding film 40 of the present embodiment, not only heat ray-shielding performance but also reflection prevention performance are prioritized, and thus the coefficient of variation in the particle size distribution of the metal plate particles is preferably 35% or less, more preferably 30% or less, and particularly preferably 20% or less. The coefficient of variation is preferably 35% or less since the absorption of visible light decreases in reflection prevention structures.

In addition, the sizes of the metal plate particles are not particularly limited and can be appropriately selected depending on the purpose, and the average particle diameter is preferably 10 to 500 nm, more preferably 20 to 300 nm, and still more preferably 50 to 200 nm.

[Thickness of Metal Particle-Containing Layer and Presence Range of Metal Particles]

Figure 9:
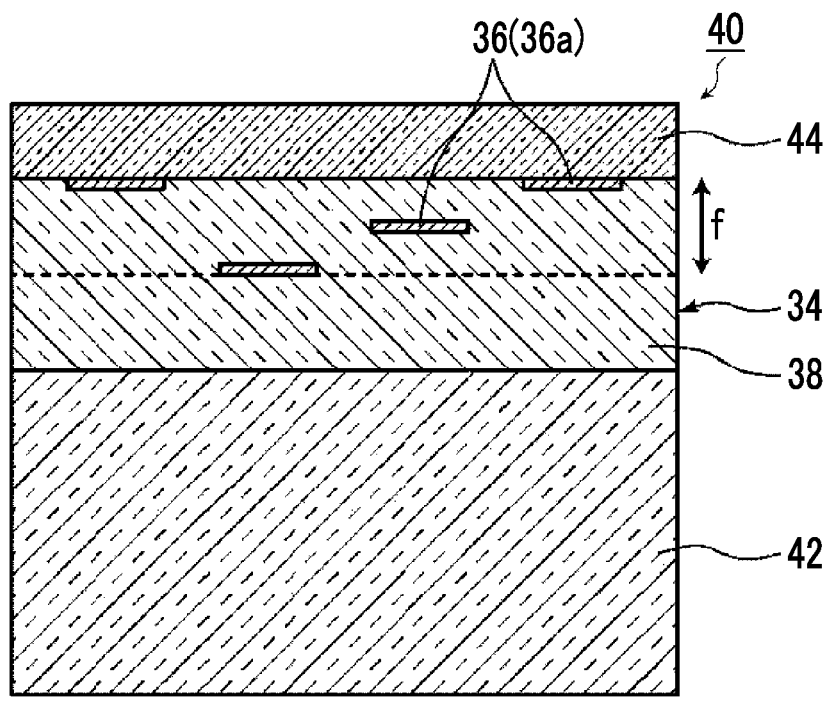
FIG. 9 is a schematic cross-sectional view illustrating a presence state of a metal particle-containing layer including metal plate particles in the heat-shielding film of the second embodiment illustrated in FIG. 8 and is a view illustrating a presence region of the metal plate particles in the metal particle-containing layer in a depth direction of a reflection prevention structure.
Figure 10:
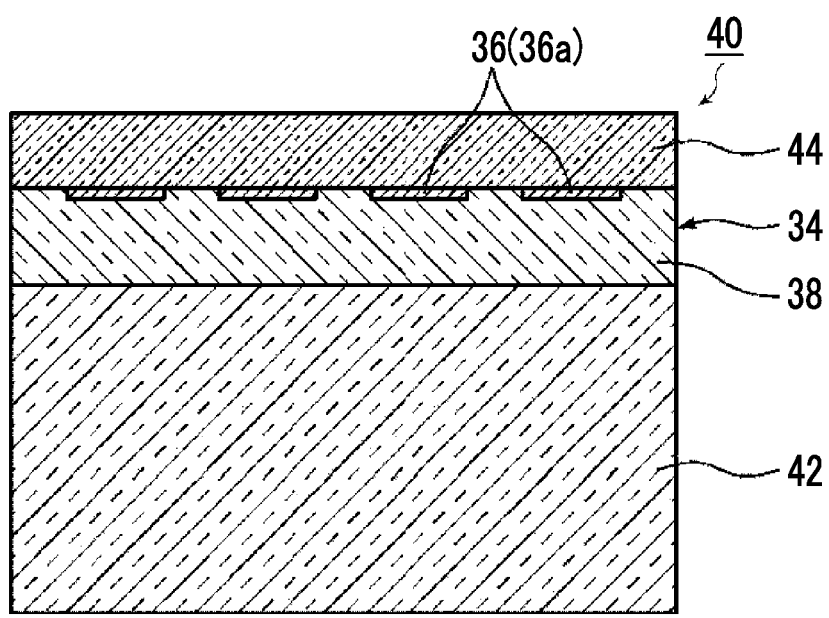
FIG. 10 is a schematic cross-sectional view illustrating another example of the presence state of the metal particle-containing layer including the metal plate particles in the heat-shielding film of the second embodiment illustrated in FIG. 8.

FIG. 9 and FIG. 10 are schematic cross-sectional views illustrating the presence state of the metal particles 36 in the metal particle-containing layer 34 in the heat-shielding film 40 of the present embodiment.

In the heat-shielding film 40 of the present embodiment, as the coated film thickness d decreases, the angular range of the plane orientation of the metal plate particles 36a is more likely to come close to zero degrees, and it is possible to decrease the absorption of visible light, and thus the coated film thickness d of the metal particle-containing layer 34 is preferably 100 nm or less, more preferably 3 to 50 nm, and particularly preferably 5 to 40 nm.

In a case in which the coated film thickness d of the metal particle-containing layer 34 satisfies d>D/2 with respect to the average circle-equivalent diameter D of the metal plate particles, 80% or more of the metal plate particles in terms of the number are preferably present in a range of d/2 from the surface of the metal particle-containing layer 34 and more preferably present in a range of d/3, and 60% or more of the metal plate particles 36a in terms of the number are still more preferably exposed on one surface of the metal particle-containing layer 34. The metal plate particles 36a being present in a range of d/2 from the surface of the metal particle-containing layer 34 means that at least some of the metal plate particles 36a are included in a range of d/2 from the surface of the metal particle-containing layer 34.

FIG. 9 is a schematic view illustrating a case in which the thickness d of the metal particle-containing layer 34 satisfies d>D/2 and, particularly, a view illustrating that 80% or more of the metal plate particles 36a are included in a range of f and f<d/2 is satisfied.

In addition, the metal plate particles 36a being exposed on one surface of the metal particle-containing layer 34 means that some of the surfaces of the metal plate particles 36a are located in the interface with the dielectric layer 44. FIG. 9 is a view illustrating a case in which the surfaces of the metal plate particles 36a coincide with the interface with the dielectric layer 44.

Here, the presence distribution of the metal plate particles in the metal particle-containing layer 34 can be measured from, for example, an image obtained by observing a cross section of the heat-shielding film using SEM.

In the heat-shielding film 40 of the present embodiment, the coated film thickness d of the metal particle-containing layer 34 preferably satisfies d<D/2, more preferably satisfies d<D/4, and still more preferably satisfies d<D/8 with respect to the average circle-equivalent diameter D of the metal plate particles 36a. As the coated thickness of the metal particle-containing layer 34 decreases, the angular range of the plane orientation of the metal plate particles 36a is more likely to come close to zero degrees, and it is possible to decrease the absorption of visible light, which is preferable.

The plasmon resonance wavelength k of the metal plate particles 36a in the metal particle-containing layer 34 is not particularly limited as long as the plasmon resonance wavelength is longer than the wavelength at which reflection needs to be prevented, can be appropriately selected depending on the purpose, and is preferably 700 nm to 2,500 nm in order to shield heat rays as described above.

[Area Ratio of Metal Particles]

In the heat-shielding film 40 of the present embodiment, the area ratio [(B/A)×100] which is the fraction of the total value B of the areas of the metal particles in the area A of the base material when the heat-shielding film 40 is seen from the above is preferably 5% or more and more preferably 10% or more and less than 70%. In a case in which the area ratio is 5% or more, a sufficient reflection prevention effect can be obtained. In a case in which the area ratio is less than 70%, conduction paths are not formed, and it is possible to suppress a decrease in the visible light transmittance.

In order to have a low reflectivity in a wide wavelength range, the area ratio is preferably set to an optimal value depending on the thickness T of the metal flat particle 36a and the refractive index n2 of the dielectric layer. A study will be made regarding a case in which the metal particles 36 are all the metal plate particles 36a and the predetermined medium is the air (n0=1). For example, when the thickness of the metal flat particle 36a is 4 nm and the refractive index of the dielectric layer 44 is 1.4, the area ratio is preferably 40% or more and less than 70% and more preferably 50% or more and less than 65%. In addition, for example, in a case in which the thickness of the metal flat particle 36a is 8 nm and the refractive index of the dielectric layer 44 is 1.4, the area ratio is preferably 5% or more and less than 40% and more preferably 6% or more and less than 30%. In addition, for example, in a case in which the thickness of the metal flat particle 36a is 18 nm and the refractive index of the dielectric layer 44 is 1.4, the area ratio is preferably 5% or more and less than 30% and more preferably 5% or more and less than 25%.

[Array of Metal Plate Particles]

The array of the metal plate particles 36a in the metal particle-containing layer 34 is preferably uniform. The array being uniform, mentioned herein, means that, in a case in which the distance from each particle to the closest particle (the distance between particles closest to each other) is digitalized by the distance between the centers of particles, the coefficient of variation of the distance between particles closest to each other of each particle is small. The coefficient of variation (=the standard deviation/the average value) of the distance between particles closest to each other is preferably small and is preferably 30% or less, more preferably 20% or less, still more preferably 10% or less, and ideally 0%. In a case in which the coefficient of variation of the distance between particles closest to each other is large, the uneven distribution of the metal plate particles or the agglomeration among particles is caused in the metal particle-containing layer 34, and there is a tendency that the haze deteriorates, which is not preferable. The distance between particles closest to each other can be measured by observing the coated surface of the metal particle-containing layer using SEM or the like.

In addition, the boundary between the metal particle-containing layer 34 and the dielectric layer 44 can be, similarly, observed and determined using SEM or the like, and the thickness d of the metal particle-containing layer 34 can be determined. Meanwhile, even in a case in which the dielectric layer 44 is formed on the metal particle-containing layer 34 using the same kind of polymer as the polymer that is included in the metal particle-containing layer 34 as the binder 38, generally, the boundary with the metal particle-containing layer 34 can be determined from an image obtained by SEM observation, and the thickness d of the metal particle-containing layer 34 can be determined. Meanwhile, in a case in which the boundary is not clear, the surface of metal flat particle located farthest from the substrate is considered as the boundary. Meanwhile, in the heat-shielding film 40 of the present embodiment, the same polymer as that in the heat-shielding film 30 illustrated in FIG. 3 can be used as the polymer, but a polyester resin and a polyurethane resin are more preferred since it is easy to make 80% or more of the metal plate particles in terms of the number present in a range of d/2 from the surface of the metal particle-containing layer.

(Dielectric Layer)

The thickness TH of the dielectric layer 44 is a thickness at which reflected light LR1 in the dielectric layer 44 of an incidence light from the surface of the dielectric layer 44 interferes with reflected light LR2 in the metal particle-containing layer 34 of the incidence light LI and thus vanishes. Here, the fact that "reflected light LR1 interferes with reflected light LR2 in the metal particle-containing layer 34 of the incidence light LI and thus vanishes" means that the reflected light LR1 and the reflected light LR2 interfere with each other and thus, as a whole, the amount of reflected light decreases and does not always refer to a case in which reflected light vanishes completely.

The thickness TH of the dielectric layer 44 is preferably 400 nm or less, and the thickness TH of the dielectric layer is more preferably a thickness of an optical path length $\lambda 2/4$ or less when a predetermined wavelength (second incidence light wavelength) is represented by $\lambda 2$.

In principle, the thickness TH of the dielectric layer 44 is optimally the optical path length $\lambda 2/8$, but the optimal value changes in a range of approximately $\lambda 2/16$ to $\lambda 2/4$ depending on the conditions of the metal particle-containing layer 34 and thus may be appropriately set depending on the layer constitution.

The constituent material of the dielectric layer 44 is not particularly limited as long as the material has the second refractive index that is larger than the refractive index of the predetermined medium. For example, the constituent material contains a binder, a matting agent, an ultraviolet absorbent, an antistatic agent, and a surfactant and, as necessary, further contains other components. The binder is not particularly limited and can be appropriately selected depending on the purpose, and examples thereof include thermosetting or photocurable resins such as acrylic resins, silicone-based resins, melamine-based resins, urethane-based resins, alkyd-based resins, and flurororesins and the like.

(Other Layers and Components)

The heat-shielding film of the present embodiment may include layers other than the respective layers described above.

(Infrared-Absorbing Compound-Containing Layer)

The heat-shielding film of the present embodiment may have an infrared-absorbing compound-containing layer which contains a compound absorbing light in the infrared range in order to shield heat rays. Hereinafter, layers containing a compound that absorbs light in the infrared range will also be referred to as infrared-absorbing compound-containing layers. Meanwhile, the infrared-absorbing compound-containing layer may play a role of other functional layers.

(Pressure Sensitive Adhesive Layer)

The heat-shielding film of the present embodiment preferably has a pressure sensitive adhesive layer (hereinafter, also referred to as pressure sensitive adhesion layer). The pressure sensitive adhesion layer may include an ultraviolet absorbent.

Materials that can be used to form the pressure sensitive adhesion layer are not particularly limited and can be appropriately selected depending on the purpose, and examples thereof include polyvinyl butyral (PVB) resins, acrylic resins, styrene/acrylic resins, urethane resins, polyester resins, silicone resins, and the like. One kind of these materials may be used singly or two or more kinds of the materials may be jointly used. The pressure sensitive adhesion layer made of the above-described material can be formed by means of coating or lamination.

Furthermore, to the pressure sensitive adhesion layer, an antistatic agent, a lubricant, a blocking preventive agent, and the like may be added. The thickness of the pressure sensitive adhesion layer is preferably 0.1 µm to 10 µm.

(Hardcoat Layer)

In order to impart scratch resistance, the heat-shielding film also preferably includes a hardcoat layer having a hardcoating property. The hardcoat layer may include metal oxide particles or an ultraviolet absorbent.

The hardcoat layer is not particularly limited, the kind and the forming method of the hardcoat layer can be appropriately selected depending on the purpose, and examples thereof include thermosetting or photocurable resins such as acrylic resins, silicone-based resins, melamine-based resins, urethane-based resins, alkyd-based resins, and flurororesins and the like. The thickness of the hardcoat layer is not particularly limited, can be appropriately selected depending on the purpose, and is preferably 1 µm to 50 µm.

(Backcoat Layer)

Meanwhile, the heat-shielding film of the present embodiment may also have a backcoat layer on the surface of the transparent base material 42 on a side opposite to the metal particle-containing layer 34. The backcoat layer is not particularly limited, can be appropriately selected depending on the purpose, and may be a layer including a compound that absorbs light in the infrared range or a metal oxide particle-containing layer described below.

(Ultraviolet Absorbent)

The heat-shielding film of the present embodiment preferably has a layer in which an ultraviolet absorbent is included.

The layer containing an ultraviolet absorbent can be appropriately selected depending on the purpose and may be a pressure sensitive adhesion layer or a layer between the pressure sensitive adhesion layer and the metal particle-containing layer. In any cases, the ultraviolet absorbent is preferably added to a layer disposed in the metal particle-containing layer on a side which is irradiated with sunlight.

(Metal Oxide Particles)

The heat-shielding film of the present embodiment may contain at least one kind of metal oxide particles in order to shield heat rays.

The material of the metal oxide particles is not particularly limited and can be appropriately selected depending on the purpose, and examples thereof include tin-doped indium oxide (hereinafter, referred to as "ITO"), antimony-doped tin oxide (hereinafter, referred to as "ATO"), zinc oxide, zinc antimonate, titanium oxide, indium oxide, tin oxide, antimony oxide, glass ceramic, lanthanum hexaboride ($LaB_6$), cesium tungsten oxide ($Cs_{0.33}WO_3$, hereinafter, referred to as "CWO"), and the like. Among these, ITO, ATO, CWO, and lanthanum haxaboride ($LaB_6$) are more preferred since the heat ray-absorbing capability is excellent, and reflection prevention structures having wide heat ray absorption performance can be manufactured when combined with the metal plate particles, and ITO is particularly preferred since 90% or more of infrared rays of 1,200 nm or more is shielded, and the visible light transmittance is 90% or more.

The volume average particle diameter of the primary particles of the metal oxide particles is preferably 0.1 µm or less since the visible light transmittance is not decreased.

The shapes of the metal oxide particles are not particularly limited and can be appropriately selected depending on the purpose, and examples thereof include a spherical shape, a needle shape, a plate shape, and the like.

[Method for Forming Metal Particle-Containing Layer]

The method for forming the metal particle-containing layer 34 is not particularly limited. Examples thereof include methods in which, on the surface of the transparent base material 42, a dispersion liquid having the metal plate particles 36a (metal flat particle dispersion liquid) is applied using a dip coater, a die coater, a slit coater, a bar coater, a gravure coater, or the like and methods in which the metal flat particle dispersion liquid is plane-oriented using a method such as an LB film method, a self-assembly method, or spray coating.

Meanwhile, in order to accelerate the plane orientation, the metal plate particles 36a may be caused to pass through crimping rollers such as calender rollers or laminating rollers after being coated.

[Method for Forming Dielectric Layer]

The dielectric layer 44 is preferably formed by means of coating. The coating method at this time is not particularly limited, well-known methods can be used, and examples thereof include methods in which a dispersion liquid containing an ultraviolet absorbent is applied using a dip coater, a die coater, a slit coater, a bar coater, a gravure coater, or the like.

[Method for Forming Hardcoat Layer]

The hardcoat layer is preferably formed by means of coating. The coating method at this time is not particularly limited, well-known methods can be used, and examples thereof include methods in which a dispersion liquid containing an ultraviolet absorbent is applied using a dip coater, a die coater, a slit coater, a bar coater, a gravure coater, or the like.

[Method for Forming Pressure Sensitive Adhesion Layer]

The pressure sensitive adhesion layer is preferably formed by means of coating. For example, the pressure sensitive adhesive layer can be laminated on the surface of an underlayer such as the base material, the metal particle-containing layer, or the ultraviolet-absorbing layer. The coating method at this time is not particularly limited, and well-known methods can be used.

The pressure sensitive adhesive layer can be laminated in a state of being dried by producing a film obtained by applying and drying a pressure sensitive adhesive on a peeling film in advance and laminating a pressure sensitive adhesive surface of the film and the surface of the heat-shielding film of the present embodiment together. The lamination method at this time is not particularly limited, and well-known methods can be used.

Figure 11:
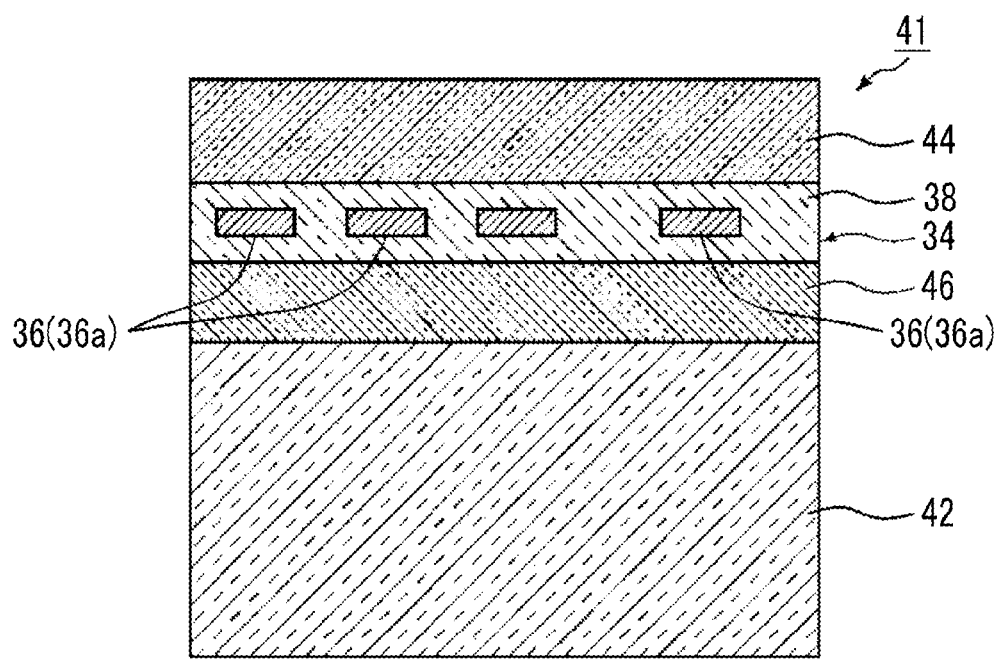
FIG. 11 is a schematic cross-sectional view of another example of the heat-shielding film of the second embodiment that is used as the film of the heat ray-shielding material illustrated in FIG. 1.

FIG. 11 is a schematic cross-sectional view of another example of the heat-shielding film of the second embodiment that is used as the films in the heat ray-shielding material illustrated in FIG. 1.

A heat-shielding film 41 of the present embodiment is different from the heat-shielding film 40 of the first embodiment in terms of a high-refractive index layer 46 which is included between the transparent base material 42 and the metal particle-containing layer 34 and has the refractive index n2 that is higher than the refractive index n1 of the transparent base material 42. Other constituent elements are the same as those in the first embodiment, and the same element has the same reference sign and will not be described.

The inclusion of the high-refractive index layer 46 having the refractive index n2 that is higher than the refractive index n1 of the transparent base material 42 enables the further enhancement of the reflection prevention effect.

(High-Refractive Index Layer)

The refractive index of the high-refractive index layer 46 is preferably 1.55 or more and particularly 1.6 or more.

The constituent material of the high-refractive index layer 46 is not particularly limited as long as the refractive index is higher than 1.55. For example, the constituent material contains a binder, fine metal oxide particles, a matting agent, and a surfactant and, as necessary, further contains other components. The binder is not particularly limited and can be appropriately selected depending on the purpose, and examples thereof include thermosetting or photocurable resins such as acrylic resins, silicone-based resins, melamine-based resins, urethane-based resins, alkyd-based resins, and flurororesins and the like.

The material of the fine metal oxide particles is not particularly limited as long as fine metal particles having a refractive index that is higher than the refractive index of the binder are used and can be appropriately selected depending on the purpose, and examples thereof include tin-doped indium oxide (ITO), zinc oxide, titanium oxide, zirconium oxide, and the like.

The heat-shielding films 40 and 41 of the present embodiment illustrated in FIG. 8 and FIG. 11 include the metal particle-containing layer 34 and the dielectric layer 44, and the high-refractive index layer 46 only on one surface (one-side surface) of the transparent base material 42, but the present invention is not limited and may include at least one layer of the metal particle-containing layer 34, the dielectric layer 44, and the high-refractive index layer 46 on the other surface.

In the heat-shielding film of the present embodiment constituted as described above, the metal particle-containing layer acts as a refractive index-adjusting layer, and low reflectivity can be achieved. In addition, in the heat-shielding film of the present embodiment, the absorbance of the metal particle-containing layer of visible light becomes extremely smaller than that of the metal particle-containing layer including spherical metal particles, and extremely high transmittances can be obtained.

As described above, in resin sheets or resin films made of a well-known resin material having heat-shielding performance of the related art, the heat-shielding film 30 illustrated in FIG. 3, the heat-shielding films 40 and 41 illustrated in FIG. 8 and FIG. 11, the films 18 are fixed to the plurality of (16) frames 14 in the frame body as illustrated in FIG. 1 using an adhesive or the like, whereby the heat ray-shielding material 10 of the present invention having the plurality of shielding cells 22 can be produced.

The plurality of shielding cells 22 in the above-described heat ray-shielding material 10 of the present invention has a frame-film structure in which the frame 14 and the film 18 are combined together and thus has high stiffness, the frames 14 having a heavy mass have low stiffness, fix the lightweight films 18, and thus serve as nodes, and thus it is possible to generate film vibration in the films 18. That is, in the shielding cells 22, the films 18 are fixed to the frames 14 so as to act as the nodes of film vibration. Therefore, the plurality of shielding cells 22 in the heat ray-shielding material 10 of the present invention is capable of functioning as soundproof cells. In order for the shielding cells 22 to function as soundproof cells in the heat ray-shielding material 10 of the present invention, it is needless to say that the frames 14 and the films 18 essentially need to have physical properties such as shape, dimensions, and strength which are suitable for soundproof cells.

Hereinafter, the acoustic performance of the heat ray-shielding material 10 of the present invention, that is, the function as soundproof cells and soundproof characteristics of the plurality of shielding cells 22 will be described.

The film 18 is an element that is fixed so as to be suppressed to the frame 14 so as to cover the opening 12 in the frame 14 and is an element that film-vibrates in response to external sound waves and thus absorbs or reflects the energy of the sound waves so as to soundproof sound. Therefore, the film 18 is preferably impermeable to the air.

Meanwhile, the film 18 needs to film-vibrate using the frame 14 as a node and thus needs to be fixed so as to be reliably suppressed to the frame 14, serve as a loop of film vibration, and absorb and reflect the energy of sound waves so as to soundproof sound.

Therefore, the film 18 is preferably made of an elastic material having flexibility.

Meanwhile, in the present invention, "soundproofing" refers to, as acoustic characteristics, both "sound isolation" and "sound absorption", and particularly "sound isolation", and "sound isolation" refers to "shielding sound", that is, "not transmitting sound", thus, both "reflecting" sound (reflection of audio) and "absorbing" sound (absorption of audio). (refer to Daijirin ($3^{rd}$ edition) by Sanseido Publishing Co., Ltd. and webpages of Acoustic Materials Association of Japan; http://www.onzai.or.jp/question/soundproof.html and http://www.onzai.or.jp/pdf/new/gijutsu201312_3.pdf).

Hereinafter, basically, "reflection" and "absorption" will not be differentiated from each other and will both be referred to as "sound isolation" and "shielding", and, when differentiated from each other, both will be referred to as "reflection" and "absorption".

Figure 16:
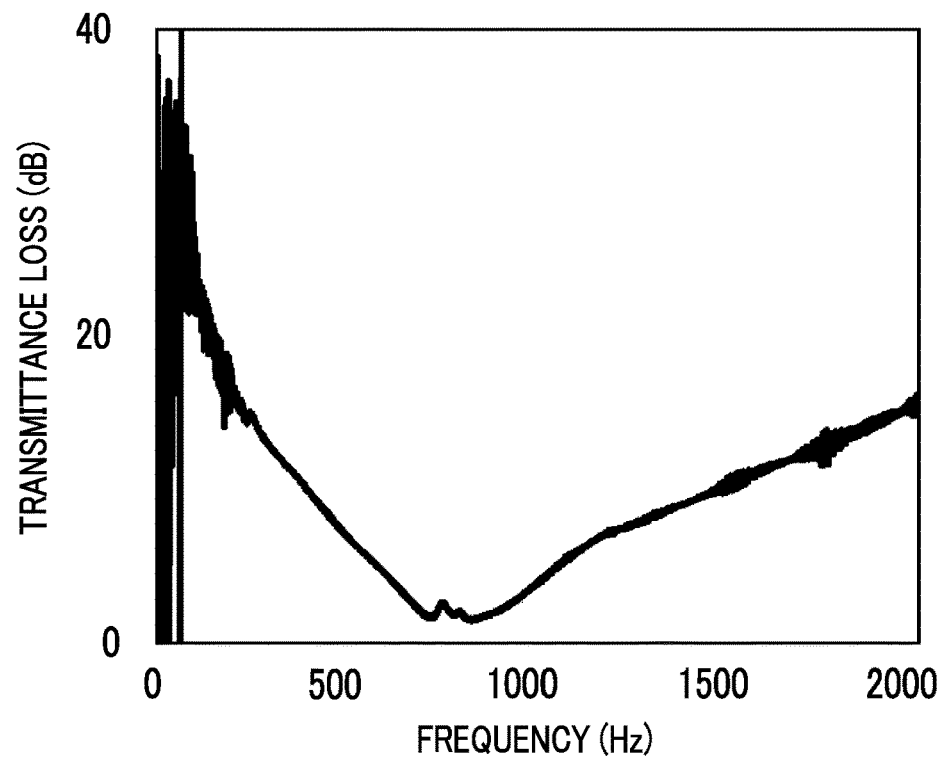
FIG. 16 is a graph illustrating sound isolation characteristics of the heat ray-shielding material of Example 1 of the present invention.

Here, in the shielding cell 22 illustrated in FIG. 1, as illustrated in FIG. 16 which illustrates the results of Example 1 described below, the film 18 fixed to the frame 14 film-vibrates at a frequency of the lowest-order intrinsic vibration mode (intrinsic vibration frequency), and thus the shielding cell 22 which is the frame-film structure in which the frame 14 and the film 18 are combined together has a first resonance frequency at which the transmission loss is minimized, for example, zero decibel as the intrinsic vibration frequency. That is, in the present invention, at the first intrinsic vibration frequency of the film 18, sound is transmitted.

Meanwhile, the first resonance frequency of the film 18 fixed so as to be suppressed to the frame 14, that is, in the structure made up of the frame 14 and the film 18 is a frequency at which sound waves most rattle film vibration due to a resonance phenomenon and can be said as a resonance frequency of the intrinsic vibration mode at which sound waves are significantly transmitted.

From the fact that the transmission loss increases on both sides (the low frequency side and the high frequency side) of the first resonance frequency as illustrated in FIG. 16, it is found that the shielding cell 22 has an effect of soundproofing, that is, sound isolation made up of the reflection of sound and the absorption of sound on both sides (the low frequency side and the high frequency side) of the first resonance frequency.

Figure 17:
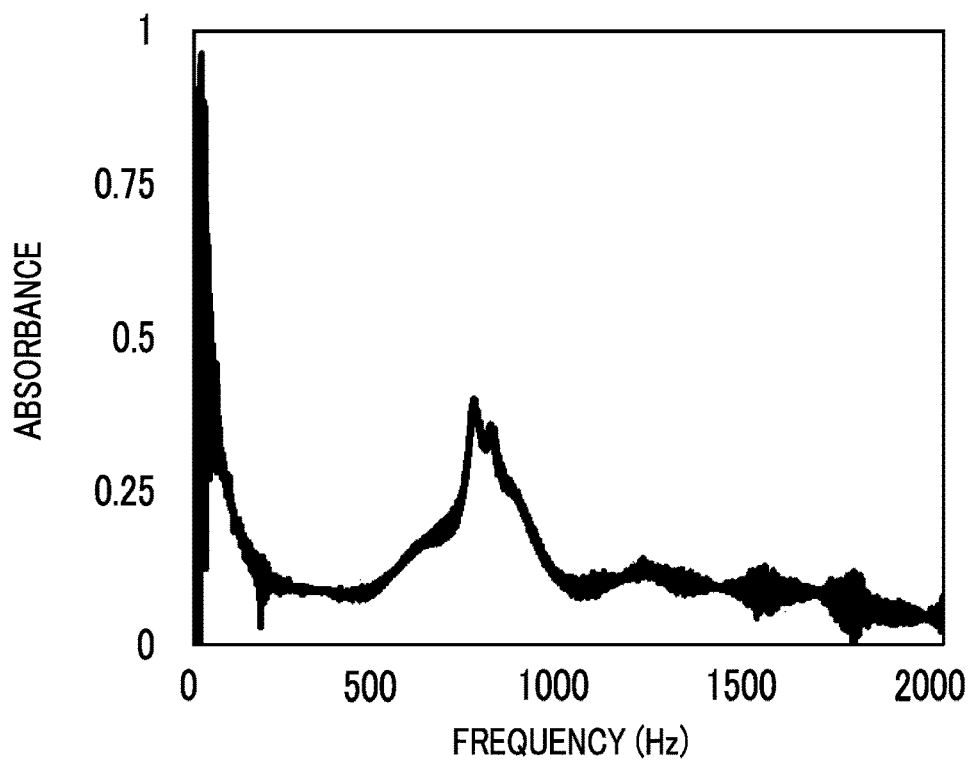
FIG. 17 is a graph illustrating absorption characteristics of sound of the heat ray-shielding material of Example 1 of the present invention.

Meanwhile, in the shielding cell 22, as illustrated in FIG. 17 which illustrates the results of the same Example 1 described below, the maximum of absorbance attributed to the first resonance frequency appears even in this case.

The principle of the soundproofing of the soundproof structure made of the frame-film structure of the shielding cell 22 in the heat ray-shielding material 10 of the present invention having the above-described characteristics can be considered as described below.

First, as described above, the frame-film structure of the shielding cell 22 of the heat ray-shielding material 10 of the present invention has the first resonance frequency that is a frequency at which the film surface is resonantly vibrated and sound waves are significantly transmitted. The first resonance frequency is determined by effective solidness such as the thickness of the above-described film, the kind (Young's modulus and physical properties such as density) of the film, and/or the sizes of the frame (the sizes of the opening and the film), and resonance points are present at higher frequencies as the structure is more solid.

In a stiffness rule region which is a frequency region that is equal to or lower than the first resonance frequency of the above-described frame-film structure, a spring equation according to which the fixation portion in the frame pulls the film is dominant, the phases of sound waves passing through the film at this time are delayed, for example, delayed 90 degrees, and the frame-film structure is capable of behaving like a capacitor. On the other hand, in a mass rule region which is a frequency region that is equal to or higher than the first resonance frequency, a motion equation attributed to the weight of the film becomes dominant, the phases of sound waves passing through the film at this time advances, for example, advances 90 degrees, and the frame-film structure is capable of behaving like an inductance. That is, the frame-film structure can be considered as a connection of a capacitor (condenser) and an inductance (coil).

In the above-described manner, the shielding cells 22 in the heat ray-shielding material 10 of the present invention function as soundproof cells having a soundproof structure made of the frame-film structure and are capable of selectively exhibiting an sound isolation effect in predetermined frequency bandwidths on both sides (the low frequency side and the high frequency side) of the first resonance frequency.

Meanwhile, FIG. 16 is a graph illustrating the measurement results of the sound isolation characteristics of the heat ray-shielding material 10 illustrated in FIG. 1 which are expressed by the transmission loss with respect to frequencies. FIG. 16 illustrates a transmission loss when a 3 mm×2 mm acrylic material is used as the frames 14 and the frame 14 is provided with a size of 20 mm×20 mm and a square shape and a 120 m-thick TAC film having the metal particle-containing layers 34 formed on both surfaces is used for the films 18. In FIG. 16, for example, the first resonance frequency of the shielding cell 22 is approximately 800 Hz in an audible region at which the transmission loss is minimized (almost zero decibel), and thus sound can be selectively isolated in predetermined frequency bandwidths on both sides (the low frequency side and the high frequency side) of the first resonance frequency, respectively.

Therefore, sound can be selectively isolated in desired predetermined frequency bandwidths by appropriately selecting the combination of the frames 14 and the films 18.

Therefore, the first resonance frequency of the frame-film structure of the shielding cell 22 in the heat ray-shielding material 10 of the present invention is preferably 10 Hz to 100,000 Hz which corresponds to a human sound wave sensible range, more preferably 20 Hz to 20,000 Hz which is a human sound wave sensible range, still more preferably 40 Hz to 16,000 Hz, and most preferably 100 Hz to 12,000 Hz.

Here, in the heat ray-shielding material 10 of the present embodiment, the first resonance frequency of the shielding cell 22 having the structure made up of the frame 14 and the film 18 can be specified by the geometric form of the frames 14 in the plurality of shielding cells 22, for example, the shapes and dimensions (sizes) of the frames 14 and the stiffness of the films 18 in the plurality of shielding cells 22, for example, the physical properties of the films such as thickness and flexibility.

Meanwhile, as the parameter characterizing the first intrinsic vibration mode of the films 18, in the case of the films 18 of the same kind of material, the ratio of the square of the size (a) of the frame 14 to the thickness (t) of the film 18, for example, the ratio of the size of one side in the case of a square $[a^2/t]$ can be used, and, in a case in which the ratios $[a^2/t]$ are equal to each other, for example, a case in which (t, a)'s are (50 m, 7.5 mm) and (200 m, 15 mm), the first intrinsic vibration modes become the same frequency, that is, the same first resonance frequency. That is, in a case in which the ratio $[a^2/t]$ is set to a constant value, the scaling law is satisfied, and appropriate sizes can be selected.

In addition, the Young's modulus of the film 18 is not particularly limited as long as, even in the case of being different on both sides, the film 18 is elastic enough to film-vibrate in order to absorb or reflect the energy of sound waves so as to soundproof sound, but is preferably high in order to have the intrinsic vibration mode on the high frequency side. For example, in the present invention, the Young's modulus of the film 18 can be set depending on the size of the frame 14, that is, the size of the film 18.

For example, the Young's modulus of the film 18 is preferably 1,000 Pa to 3,000 GPa, more preferably 10,000 Pa to 2,000 GPa, and most preferably 1 MPa to 1,000 GPa.

In addition, the density of the film 18 is also not particularly limited as long as, even in the case of being different on both sides, the film is capable of film-vibrating in order to absorb or reflect the energy of sound waves so as to soundproof sound, but is, for example, preferably 10 $kg/m^3$ to 30,000 $kg/m^3$, more preferably 100 $kg/m^3$ to 20,000 $kg/m^3$, and most preferably 500 $kg/m^3$ to 10,000 $kg/m^3$.

The material of the film 18 in a case in which the soundproofing effect is obtained is not particularly limited as long the above-described film materials have a suitable strength in the case of being applied to soundproof subjects and have resistance to the soundproof environments of the soundproof subjects, and the film 18 is capable of film-vibrating in order to absorb or reflect the energy of sound waves so as to soundproof sound and can be selected depending on soundproof subjects and soundproof environments thereof.

Figure 12:
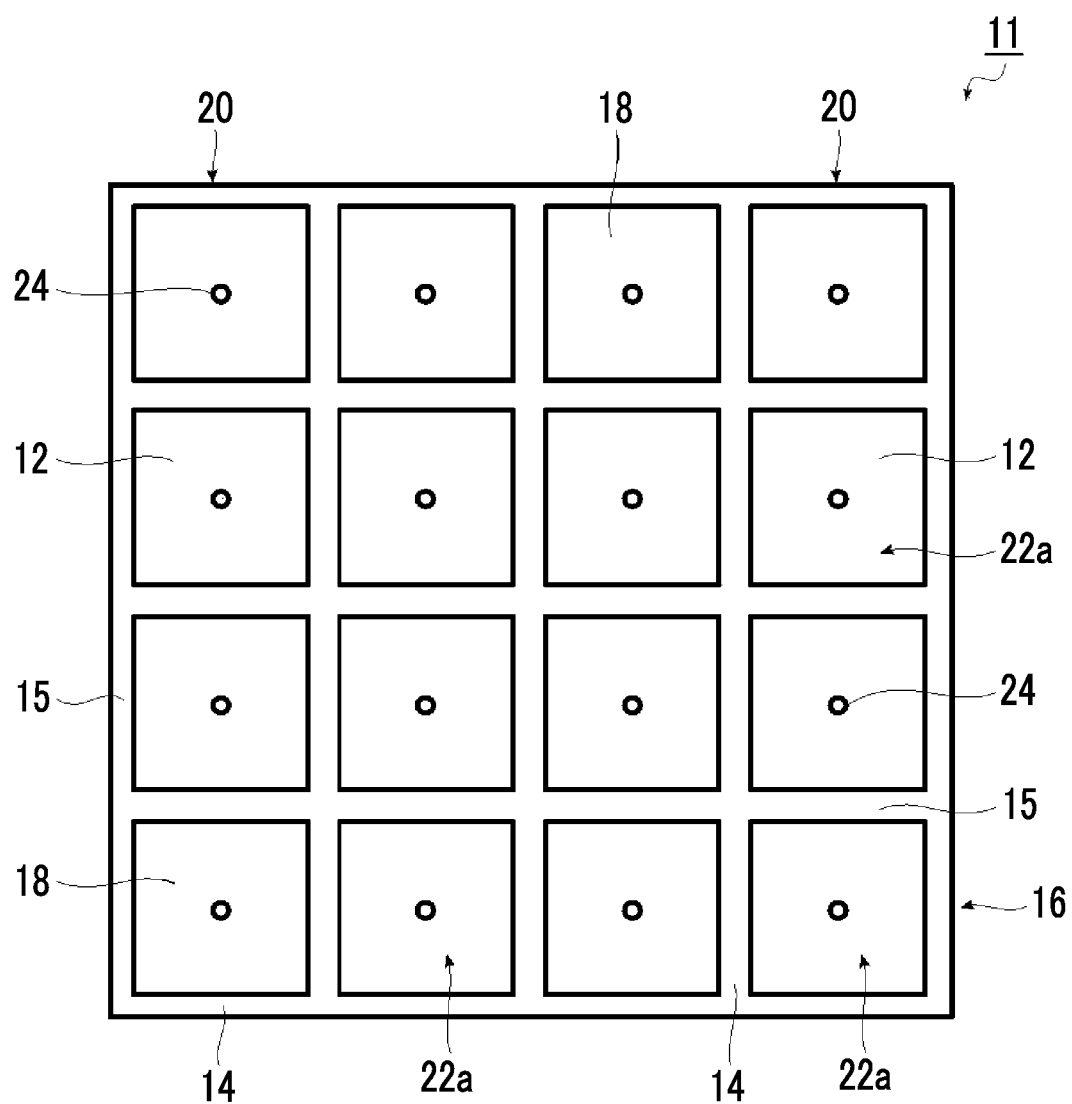
FIG. 12 is a plan view schematically illustrating an example of a heat ray-shielding material according to another embodiment of the present invention.

In the above-described example illustrated in FIG. 1, the film 18 is attached to the frame 14 so as to seal the opening 12 in the frame 14, but the present invention is not limited thereto, and, as in a heat ray-shielding material 11 of an embodiment illustrated in FIG. 12, one or more opening holes 24 may be punched in the film 18.

Figure 20:
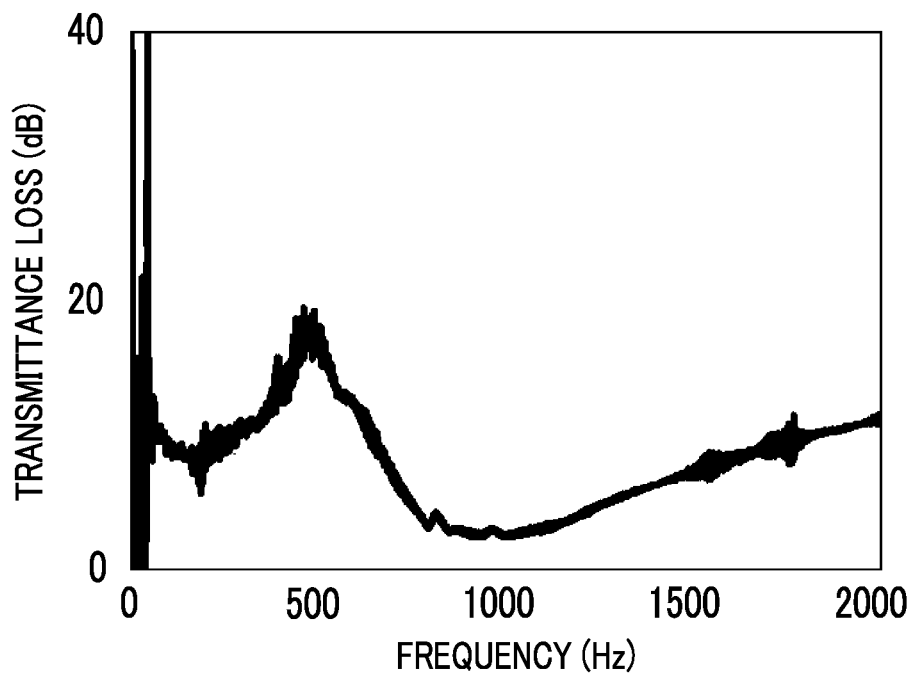
FIG. 20 is a graph illustrating sound isolation characteristics of the heat ray-shielding material of Example 2 of the present invention.

Here, in the present invention, as illustrated in FIG. 20, even in the heat ray-shielding material 11 of the present embodiment made up of shielding cells 22a illustrated in FIG. 12, similar to the heat ray-shielding material 10 illustrated in FIG. 1, the first resonance frequency that relies on the frame-film structure made of the combination of the frame 14 and the film 18 in the shielding cell 22a appears regardless of the presence and absence of the opening hole 24.

However, in the heat ray-shielding material 11 of the present embodiment, the peak of the transmission loss at which shielding forms a peak (is maximized) appears on the lower frequency side of the first resonance frequency due to the opening holes 24, and the frequency at which this shielding (transmission loss) forms a peak (is maximized) becomes the shielding peak frequency.

The principle of the soundproofing of the soundproof structure made of the frame-film-hole structure of the shielding cell 22a in the heat ray-shielding material 11 of the present embodiment having the above-described characteristics can be considered as described below.

First, similar to the frame-film structure of the shielding cell 22 of the heat ray-shielding material 10 illustrated in FIG. 1, the frame-film-hole structure of the shielding cell 22a of the heat ray-shielding material 11 of the present embodiment has a first resonance frequency attributed to the frame-film structure, and, in a stiffness rule region which is a frequency region that is equal to or lower than the first resonance frequency, the phases of sound waves passing through the film and the opening hole are delayed, for example, delayed 90 degrees due to the frame-film-hole structure, and the frame-film-hole structure behaves like a capacitor, and, on the other hand, in a mass rule region which is a frequency region that is equal to or higher than the first resonance frequency, the phases of sound waves passing through the film advances, for example, advances 90 degrees due to the frame-film structure, and the frame-film-hole structure is capable of behaving like an inductance.

Here, sound waves are also a wave phenomenon, and thus the amplitudes of waves constructively or destructively interfere with each other. Phase-delayed waves transmitted through the frame-film-hole structure showing a stiffness rule (the shielding cell 22a that functions as a soundproof cell) and phase-advanced waves transmitted through the frame-film structure showing a mass rule (the shielding cell 22a) are out of phase with each other and thus have a destructive interference relationship. Therefore, in a frequency region sandwiched by the first resonance frequencies of the frame-film structure (the shielding cell 22a), a destructive interference relationship is established, and, particularly, at a frequency at which the amplitudes of sound waves transmitted through the respective frame-film structures are equal to each other, the waves have the same amplitude but are out of phase with each other, and extremely significant shielding occurs.

That is, strong acoustic sound isolation is realized in a specific frequency range by simply punching the opening hole 24 in the frame-film structure (the shielding cell 22a).

This is the principle of the soundproofing of the soundproof structure by the frame-film-hole structure in the heat ray-shielding material 11 of the present embodiment of the present invention.

As described above, in the heat ray-shielding material 11 of the present embodiment, the opening hole 24 is provided in the shielding cell 22a, and thus a new shielding peak attributed to the opening hole 24 appears on the lower frequency side of the first resonance frequency on the low frequency side as illustrated in FIG. 20. In addition, particularly, an increase in the absorption of sound by the presence of the opening hole 24 is observed on the lower frequency side of the peak of the shielding which is generated by the penetrating opening hole 24.

Therefore, since shielding (transmission loss) forms a peak (is maximized) at the shielding peak frequency, the heat ray-shielding material 11 of the present invention is capable of selectively soundproofing sound in a certain frequency bandwidth in which the shielding peak frequency is present in the center.

In the present invention, firstly, it is possible to enhance the shielding of sound and control the peaks of shielding; however, additionally, the absorption of sound (the energy of sound waves) appears on the low frequency side due to the effect of the penetrating opening holes 24.

Here, one or more opening holes 24 may be punched in the film 18 covering the opening 12 in the shielding cell 22a as illustrated in FIG. 12. In addition, the punching location of the opening hole 24 may be the center in the film 18, that is, the shielding cell 22a as illustrated in FIG. 12, but the present invention is not limited thereto, and the punching location does not need to be the center of the shielding cell 22a, and the opening hole may be punched in any location.

That is, a simple change of the punching location of the opening hole 24 does not change the sound isolation characteristics of the heat ray-shielding material 11 of the present embodiment.

However, in the present invention, the opening hole 24 is preferably punched in a region in a range more than 20% of the dimension of the surface of the film 18 away from the fixing end of the circumferential edge portion of the opening 12 and most preferably provided in the center of the film 18.

In addition, the number of the opening hole 24 in the shielding cell 22a may be one in one shielding cell 22a as illustrated in FIG. 12, but the present invention is not limited thereto, and the number thereof may be two or more (that is, plural).

Here, in the heat ray-shielding material 11 of the present embodiment, from the viewpoint of air permeability, the opening hole 24 in each shielding cell 22a is preferably constituted of a single opening hole 24 as illustrated in FIG. 12. This is because, in a case in which the opening ratio is constant, it is easier for the air as wind to pass through the shielding cell which is singly present and has a large size and a viscosity that does not significantly work in the boundary.

Meanwhile, when a plurality of opening holes 24 is present in one shielding cell 22a, the sound isolation characteristics of the heat ray-shielding material 11 of the present embodiment indicates sound isolation characteristics corresponding to the total area of the plurality of opening holes 24. Therefore, the total area of the plurality of opening holes 24 in one shielding cell 22a (or the film 18) is preferably equal to the area of the opening hole 24 that is singly present in another shielding cell 22a (or another film 18), but the present invention is not limited thereto.

Meanwhile, in a case in which the opening ratio of the opening holes 24 in the shielding cell 22a (the ratio of the total area of all of the opening holes 24 to the area of the film 18 covering the opening 12 (the fraction of the total area of all of the opening holes 24)) is constant, the same heat ray-shielding material 11 can be obtained regardless of the number of the opening holes 24, and thus it is possible to produce a variety of heat ray-shielding materials even in a case in which the sizes of opening holes 24 are fixed.

In the present embodiment, the opening ratio (area ratio) of the opening hole (all of the opening holes) 24 in the shielding cell 22a is not particularly limited and may be appropriately set depending on the sound isolation characteristics, but is preferably 0.000001% to 70%, more preferably 0.000005% to 50%, and still more preferably 0.00001% to 30%. In a case in which the opening ratio of all of the opening holes 24 is set in the above-described range, it is possible to appropriately adjust the sound isolation peak frequency which is the center of a sound isolation frequency bandwidth in which sound needs to be selectively isolated and the transmission loss of the sound isolation peak.

The heat ray-shielding material 11 of the present embodiment preferably has a plurality of opening holes 24 having the same size in one shielding cell 22a from the viewpoint of manufacturing suitability. That is, in each of the shielding cells 22a, a plurality of opening holes 24 having the same size is preferably punched.

Furthermore, in the heat ray-shielding material 11 of the present embodiment, the opening holes 24 in all of the shielding cells 22a are preferably set to be holes having the same size.

In the present invention, the opening hole 24 is preferably punched by a processing method that absorbs energy, for example, laser processing or preferably punched by a mechanical processing method by means of physical contact, for example, punching or needle processing.

Therefore, in a case in which a plurality of opening holes 24 in one shielding cell 22a or one or a plurality of opening holes 24 in all of the shielding cells 22a is provided with the same size, during the opening of the holes by laser processing, punching, or needle processing, it is possible to continuously open the opening holes without changing the set or processing strength of a processing apparatus.

In addition, in the heat ray-shielding material 11 of the present embodiment illustrated in FIG. 12, the sizes of the opening holes 24 in the shielding cells 22a (or the films 18) may not be constant throughout all of the shielding cells 22a (or the films 18). In a case in which all of the shielding cells 22a (or the films 18) do not have the opening holes 24 having a constant size, the heat ray-shielding material exhibits sound isolation characteristics corresponding to the average area obtained by averaging the areas of the opening holes 24.

In addition, 70% or more of the opening holes 24 in each of the shielding cells 22a in the heat ray-shielding material 11 of the present embodiment are preferably constituted of holes having the same size.

The sizes of the opening holes 24 may be any sizes as long as the opening holes can be appropriately punched by the above-described processing method and are not particularly limited.

However, the lower limit side of the size of the opening holes 24 is preferably 2 µm or more, more preferably 5 µm or more, and most preferably 10 µm or more from the viewpoint of the processing accuracy of laser processing such as the accuracy of laser focusing, processing accuracy of punching processing, needle processing, or the like, or manufacturing suitability such as ease of processing.

Meanwhile, the upper limit value of the size of the opening holes 24 needs to be smaller than the size of the frame 14, and thus, in a case in which the size of the opening hole 24 is set in a micrometer order, the upper limit value of the size of the opening hole 24 does not exceed the size of the frame 14 since the size of the frame 14 is in a millimeter order; however, in a case in which the upper limit value exceeds the size of the frame, the upper limit value of the size of the opening hole 24 may be set to be equal to or smaller than the size of the frame 14.

Meanwhile, in the soundproofing of the soundproof structure of the present invention, the fact that both the opening holes 24 through which sound can be transmitted not as vibration but as an acoustic wave and the films 18 that film-vibrate are present is important. Therefore, even in a case in which the opening hole 24 through which sound can be transmitted is in a state of being covered with a member through which sound is capable of passing as an acoustic wave, it is possible to obtain peaks of sound isolation in the same manner as when the opening hole is opened. The above-described member is generally an air-permeable member.

Typical members that are air-permeable as described above are screen nets. Examples thereof include AMI-DOROJI 30 mesh products manufactured by NBC Meshtec Inc., and the present inventors confirm that, even in a case in which the opening hole 24 is blocked with the above-described screen net, the spectrum does not change.

The net may have a lattice shape or a triangular lattice shape, and particularly, the shape thereof does not matter and is not limited. The size of the entire net may be larger or smaller than the size of the frame body 16 of the present invention. In addition, the size of the net may be a size large enough to cover the opening hole 24 in the film 18 one by one. In addition, regarding the mesh of the net, the net may be a net having a size intended for so-called insect repellent or a net that prevents the entering of finer sand. Regarding the material, the net may be a net made of a synthetic resin or a wire for crime prevention or radio wave shielding.

In addition, the above-described air-permeable member is not limited to screen nets, and examples thereof include, in addition to nets, non-woven materials, urethane materials, THINSULATE (manufactured by 3M), BREATHARI (manufactured by Toyobo Co., Ltd.), DOTAIR (manufactured by Toray Industries, Inc.), and the like. In the present invention, the opening holes are covered with the above-described air-permeable material, and thus it is possible to prevent the intrusion of insects or sand through the holes, protect privacy by preventing the inside from becoming visible through the opening holes 24, and impart concealment.

Meanwhile, in the heat ray-shielding material 11 of the present invention, the first intrinsic vibration frequency is specified by the structure made up of the frames 14 and the films 18, and the shielding peak frequency at which the transmission loss forms a peak is dependent on opening portions formed by the opening holes 24 punched in the films 18 in the structure made up of the frames 14 and the films 18.

Figure 23:
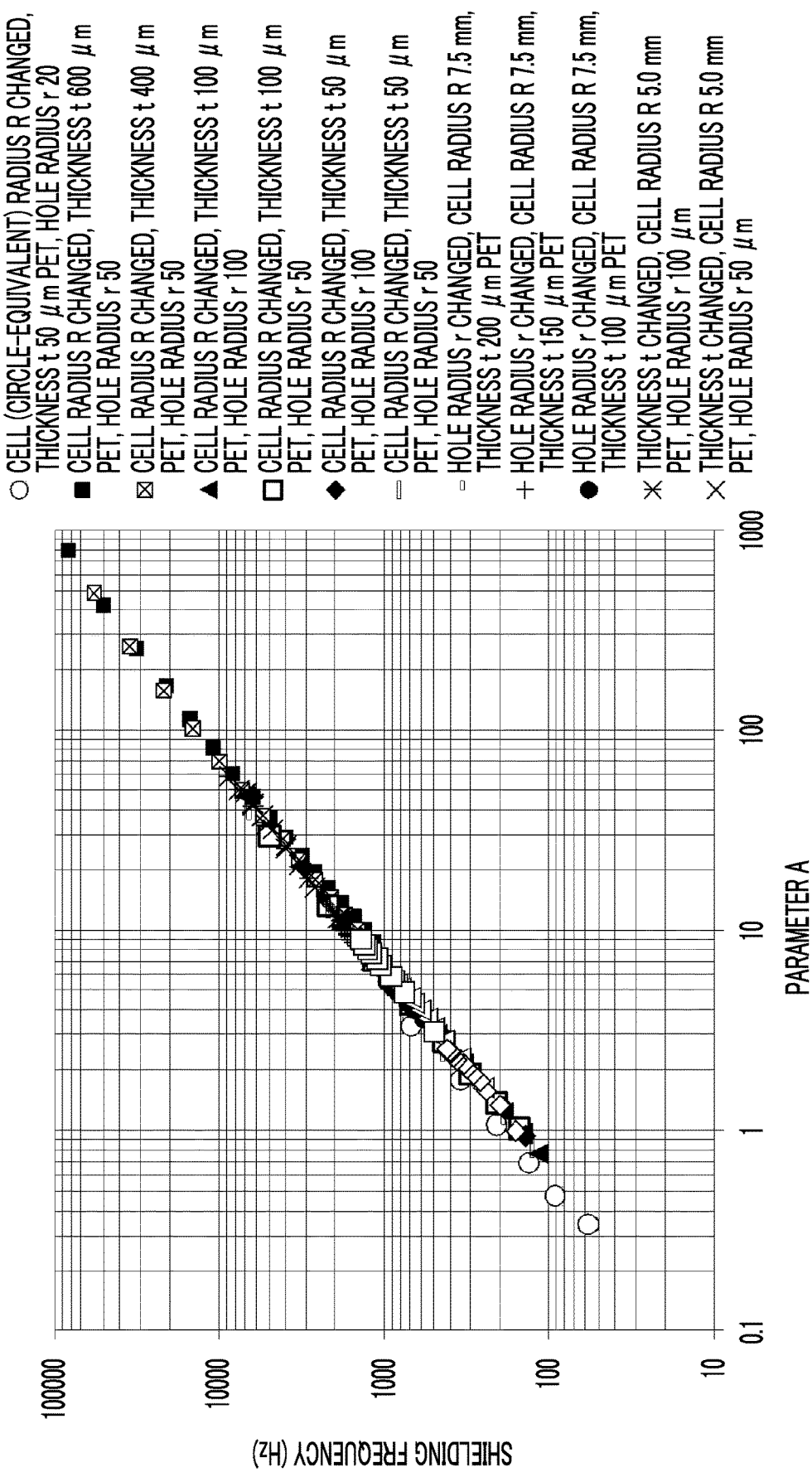
FIG. 23 is a graph illustrating shielding frequencies with respect to an acoustic parameter A as a soundproof structure of the heat ray-shielding material of the present invention.

Here, the present inventors found that, in the heat ray-shielding material 11 of the present invention, when the circle-equivalent radius of the shielding cell 22a, that is, the frame 14 is represented by R1 (mm), the thickness of the film 18 is represented by t1 (m), the Young's modulus of the film 18 is represented by E1 (GPa), and the circle-equivalent radius of the opening hole 24 is represented by r (µm), a parameter A represented by Expression (3) and the shielding peak vibration frequency (Hz) of the heat ray-shielding material 11 has a substantially linear relationship as illustrated in FIG. 23 even when the circle-equivalent radius R1 (mm) of the shielding cell 22, the thickness t1 (µm) of the film 18, the Young's modulus E1 (GPa) of the film 18, and the circle-equivalent radius r (µm) of the opening hole 24 are changed, are expressed as a substantial linear expression, and are present on substantially the same straight line in a two-dimensional coordinate. Meanwhile, it was also found that the acoustic parameter A is rarely dependent on the density or Poission ratio of the film.

$$A = \sqrt{(E1)*(t^{1.2})*(\ln(r)-e)/(R1^{2.8})} \quad (3)$$

Here, e represents the Napier's constant, and ln(x) is a logarithm of x to base e.

Here, when a plurality of opening holes 24 is present in the shielding cell 22a, the circle-equivalent radius r is obtained from the total area of a plurality of opening portions.

Meanwhile, FIG. 23 is obtained from the results of simulation carried out in a designing stage before an experiment in examples described below.

In the heat ray-shielding material 11 of the present invention, when the first intrinsic vibration frequency is set to 10 Hz to 100,000 Hz, the shielding peak vibration frequency becomes a frequency that is equal to or lower than the first intrinsic vibration frequency, and thus Table 1 shows the values of the acoustic parameter A corresponding to a plurality of values of the shielding peak vibration frequency from 10 Hz to 100,000 Hz.

TABLE 1

| Frequency (Hz) | A parameter |
|---|---|
| 10 | 0.07000 |
| 20 | 0.1410 |
| 40 | 0.2820 |
| 100 | 0.7050 |
| 12000 | 91.09 |
| 16000 | 121.5 |
| 20000 | 151.8 |
| 100000 | 759.1 |

As is clear from Table 1, the acoustic parameter A corresponds to the first intrinsic vibration frequency, and thus, in the present invention, is preferably 0.07000 or more and 759.1 or less, more preferably 0.1410 to 151.82, still more preferably 0.2820 to 121.5, and most preferably 0.7050 to 91.09.

In a case in which the acoustic parameter A standardized as described above is used, in the heat ray-shielding material of the present embodiment, it is possible to determine the shielding peak frequency and selectively isolate sound in a certain frequency bandwidth in which the shielding peak frequency is in the center. In addition, conversely, the use of the acoustic parameter A enables the setting of the heat ray-shielding material of the present invention having a shielding peak frequency that becomes the center of a frequency bandwidth in which sound needs to be selectively isolated.

Figure 24:
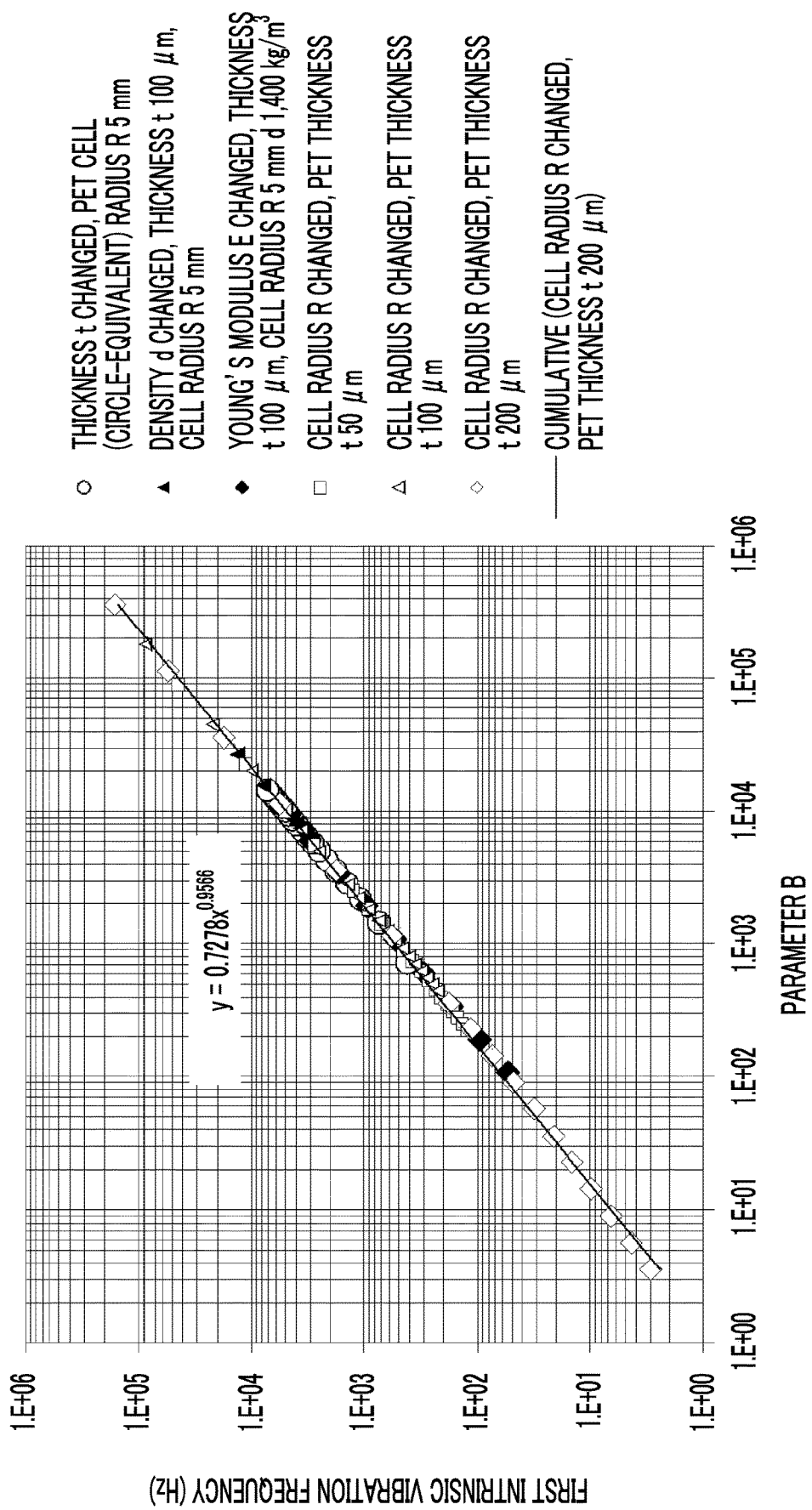
FIG. 24 is a graph illustrating first resonance frequencies with respect to an acoustic parameter B as the soundproof structure of the heat ray-shielding material of the present invention.

In addition, the present inventors found that, in the heat ray-shielding material 11 of the present embodiment, when the circle-equivalent radius of the shielding cell 22a, that is, the frame 14 is represented by R2 (m), the thickness of the film 18 is represented by t2 (m), the Young's modulus of the film 18 is represented by E2 (Pa), and the density of the film 18 is represented by d2 (kg/m$^3$), an acoustic parameter B (√m) represented by Expression (4) and the first intrinsic vibration frequency (Hz) of the structure made up of the frames 14 and the films 18 in the heat ray-shielding material 11 has a substantially linear relationship even when the circle-equivalent radius R2 (m) of the shielding cell 22a, the thickness t2 (m) of the film 18, the Young's modulus E2 (Pa) of the film 18, and the density d2 (kg/m$^3$) of the film 18 are changed and are, as illustrated in FIG. 24, expressed by an expression represented by Expression (5).

$$B = t2/R2^{2} * \sqrt{(E2/d2)} \quad (4)$$

$$y = 0.7278 x^{0.9566} \quad (5)$$

Here, y is the first intrinsic vibration frequency (Hz), and x is the acoustic parameter B.

Meanwhile, FIG. 24 is obtained from the results of simulation carried out in the designing stage before the experiment in the examples described below.

From the above-described facts, it is found that, in the heat ray-shielding material 11 of the present embodiment, in a case in which the circle-equivalent radius R2 (m) of the shielding cell 22a, the thickness t2 (m) of the film 18, the Young's modulus E2 (Pa) of the film 18, and the density d2 (kg/m$^3$) of the film 18 are standardized by the acoustic parameter B (√m), on a two-dimensional (xy) coordinate, points indicating the relationship between the acoustic parameter B and the first intrinsic vibration frequency (Hz) of the heat ray-shielding material 11 are represented by Expression (5) that is considered as a substantial linear expression, and all of the points are on substantially the same straight line. Meanwhile, R2 and R1 both represent the circle-equivalent radius of the shielding cell 22a, but satisfy a relationship of R2=10$^3$×R1. In addition, t2 and t1 both represent the thickness of the film 18, but satisfy a relationship of t2=10$^6$×t1. In addition, E2 and E1 both satisfy the Young's modulus of the film 18, but satisfy a relationship of E1=10$^9$×E2.

Table 2 shows the values of the acoustic parameter B with respect to a plurality of values of the first intrinsic vibration frequency from 10 Hz to 100,000 Hz.

TABLE 2

| Frequency (Hz) | B parameter |
|---|---|
| 10 | 1.547 × 10 |
| 20 | 3.194 × 10 |
| 40 | 6.592 × 10 |
| 100 | 1.718 × 10$^2$ |
| 12000 | 2.562 × 10$^4$ |
| 16000 | 3.460 × 10$^4$ |
| 20000 | 4.369 × 10$^4$ |
| 100000 | 2.350 × 10$^5$ |

As is clear from Table 2, the acoustic parameter B corresponds to the first intrinsic vibration frequency, and thus, in the present invention, is preferably 1.547×10 (=15.47) or more and 2.350×10$^5$ (23,500) or less, more preferably 3.194×10 (=31.94) to 4.369×10$^4$ (43,960), more preferably 6.592×10 (=65.92) to 3.460×10$^4$ (34,600), and most preferably 1.718×10$^2$ (=171.8) to 2.562×10$^4$ (25,620).

In a case in which the acoustic parameter B standardized as described above is used, it is possible to determine the first intrinsic vibration frequency that becomes the high frequency-side upper limit of the shielding peak frequency in the heat ray-shielding material of the present invention and determine the shielding peak frequency that becomes the center of a frequency bandwidth in which sound needs to be selectively isolated. In addition, conversely, the use of the acoustic parameter B enables the setting of the heat ray-shielding material of the present invention having the first intrinsic vibration frequency at which the heat ray-shielding material may have the shielding peak frequency that becomes the center of a frequency bandwidth in which sound needs to be selectively isolated.

Figure 13:
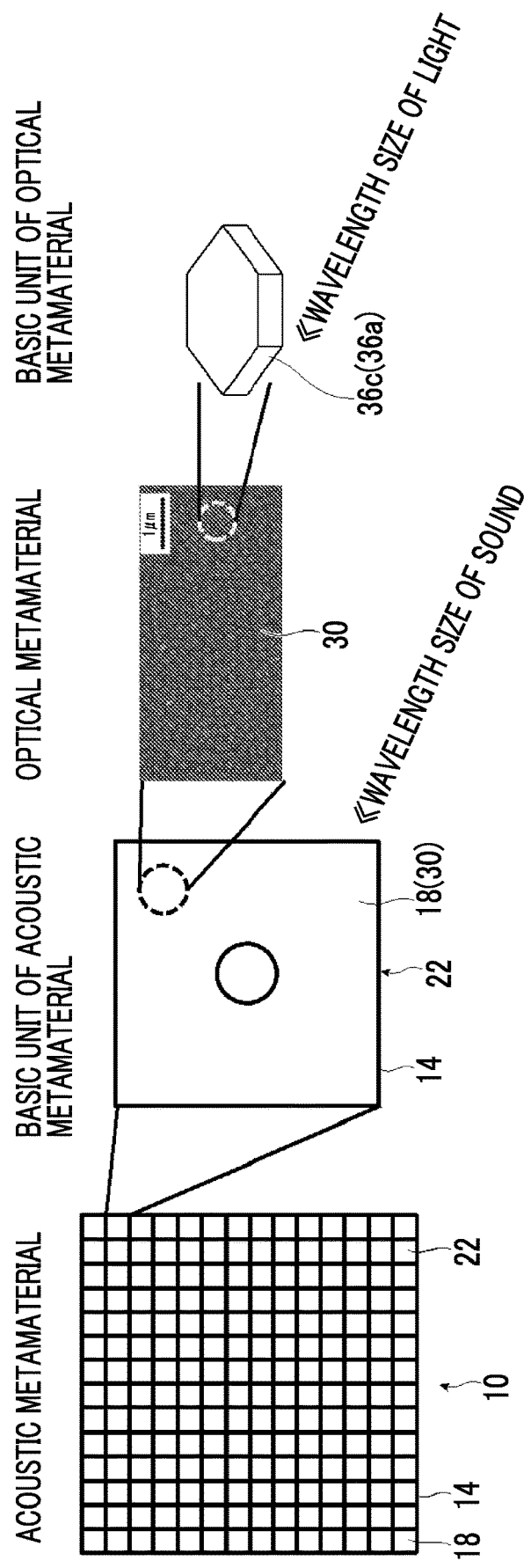
FIG. 13 is a view describing a relationship in sizes between an acoustic metamaterial and an optical metamaterial of the heat ray-shielding material according to the present invention.

As illustrated in FIG. 13, the heat ray-shielding material of the present invention which is constituted as described above has both an acoustic metamaterial aspect having predetermined acoustic characteristics (soundproof characteristics) and an optical material aspect having predetermined optical characteristics (heat ray-shielding property, visible light-transmitting properties, and radio wave-transmitting properties).

Here, the metamaterial refers to a structure having a basic structure that is sufficiently smaller than the wavelength size of the wave thereof with respect to certain wave phenomena as the functional unit. For the metamaterial, a wave phenomenon is a unit structure that is smaller than the wavelength size, and thus scattering or diffraction phenomena from the respective unit structures mutually vanish in a wave manner, and phenomena of reflection, transmission, absorption, refraction, and the like occur in the same manner as in bulk substances.

The acoustic metamaterial is the heat ray-shielding material 10 illustrated in FIG. 1, the basic unit of the acoustic metamaterial is one shielding cell 22 made up of one frame 14 and one film 18, and the size of the basic unit is significantly smaller than the size of the wavelength of sound.

In addition, the optical material is the heat-shielding film 30 or 40 illustrated in FIG. 3 or FIG. 8 which constitutes the film 18 in the shielding cell 22, and the basic unit of the optical metamaterial is one metal particle 36 (metal flat particle 36c) as illustrated in FIG. 4B, and the size of the basic unit is significantly smaller than the size of the wavelength of light.

That is, when the average cell size of the frames 14 is represented by R, the average size of the metal particles 36 is represented by d1, a first optical wavelength that is the wavelength of light including near-infrared light that is shielded by the localized surface plasmon effect of the metal particles is represented by λ1, a second incidence light wavelength that is the wavelength of incidence light reflection of which is prevented by the dielectric layer 44 in the heat-shielding film 40 is represented by λ2, and the acoustic wavelength of the resonance frequency of the frame-film structure made up of the frame 14 and the film 18 is represented by λ3, the heat ray-shielding material of the present invention preferably has a scale relationship represented by Inequality Expression (1).

$$d1<\lambda 2<\lambda 1<R<\lambda 3 \quad (1)$$

In addition, when the acoustic wavelength of the peak frequency of the frame-film-hole structure made up of the frame 14, the film 18, and the opening hole 24 which shows the maximum value of soundproofing on the lower frequency side of the resonance frequency of the frame-film structure is represented by λ4, the heat ray-shielding material of the present invention preferably has a scale relationship represented by Inequality Expression (2).

$$d1<\lambda 2<\lambda 1<R<\lambda 3<\lambda 4 \quad (2)$$

Here, the heat ray-shielding material of the present invention preferably has, as optical functions, a function of shielding light around 1 and a function of preventing reflection around λ2 and, as an acoustic function, a function of shielding sound on the low frequency side around λ4.

In a heat-shielding structure for which heat-shielding films of the related art are used, the weight is almost the mass of a glass sheet or an acryl sheet that serves as a support, which limits the use of the shielding structure. In contrast, in the heat-shielding structure of the heat ray-shielding material of the present invention, it is possible to significantly decrease the weight while maintaining the stiffness by attaching frames having a lattice-shaped cell structure. At this time, in a case in which the heat-shielding structure is formed in the film in a roll-to-roll manner, it is possible to utilize the advantage of heat-shielding films of the related art which is favorable production suitability.

Furthermore, in the heat-shielding structure of the heat ray-shielding material of the present invention, compared with those of the related art, the weight is lighter, handling is easier, and furthermore, a soundproofing effect that shielding structures of the related art do not have can be obtained, and, in a case in which films having a heat-shielding property, for example, heat-shielding films are attached to the frames in the cell structure, not only the heat-shielding effect but also both stiffness and the soundproofing effect can be obtained from the frame-film structure.

As described above, in the heat ray-shielding material of the present invention, in a case in which heat-shielding films are attached to the frames, a soundproofing effect appears on the low frequency side and the high frequency side of the audible region. Particularly, on the low frequency side, the soundproofing property is more favorable compared with that in a case in which continuous heavy supports of the related art are attached. In addition, in a case in which opening holes for allowing wind to pass through are provided, the frequency characteristics of soundproofing change on the low frequency side, and particularly strong soundproofing having a specific frequency is possible.

In the heat ray-shielding material of the present invention, particularly, when the opening holes are present in the heat-shielding films, there is no effect of causing light to gather and pass through the opening holes in the air, and, due to the sizes of the opening holes that are sufficiently larger than the wavelength of light, the behavior of light follows geometric optics, and the weakening of the optical effect is determined by the area ratio of the opening holes (for example, in a case in which holes are opened in AgND heat-shielding films, the shielding ratio of near-infrared light decreases by the area ratio of the holes). In contrast, in the heat ray-shielding material of the present invention, when there are small opening holes, there is an effect of causing wind to gather from the peripheral and pass through the opening holes, and thus an effect of allowing wind to pass through more than the area ratio can be obtained in spite of the small holes. In addition, regarding sound, sound transferring film vibration and sound passing through the opening holes interfere with each other behind the device, and particularly, the effect of causing sound to gather from the peripheral, not the simple opening area ratio, is exerted on the sound passing through the opening holes, and it is possible to effectively carry out sound isolation through interference in spite of the small holes.

The heat-shielding structure of the heat ray-shielding material of the present invention improves the strength of the heat-shielding structure by attaching the lattice-shaped frames onto the heat-shielding thin films that serve as the films and, furthermore, as acoustic characteristics, is also capable of obtaining a stronger soundproofing effect than the films in the original state. Particularly, when the films in the heat-shielding structure of the present invention have the opening holes, it is needless to say that the heat-shielding structure is air-permeable, and it is possible to shield specific sound, particularly, sound in the low frequency side. In addition, in the heat ray-shielding material of the present invention, as a near-infrared reflection structure, the specific wavelength resonance reflection by flat nanoparticles of silver is used, however, in a case in which the dielectric layer is added to the structure, and the thickness thereof is set to a specific thickness by means of studies, it is also possible to impart a reflection prevention effect of preventing the reflection of incidence light. What has been described above exhibits an extremely excellent effect since it is possible to impart extremely clear visibility to architectural members such as screens and cage members such as pet cages.

Therefore, the heat ray-shielding material of the present invention is transparent and lightweight, is also capable of adjusting external visibility, furthermore, is capable of shielding heat rays (near-infrared rays) and audio, and is also capable of allowing wind to pass through in the case of including the opening holes in the films.

As is clear from what has been described above, the heat ray-shielding material of the present invention having the heat-shielding structure that is lightweight and small and is easy to handle is an important technique for environment and, furthermore, when provided with an soundproofing effect, is applicable in an extremely broad range such as window members having optical, acoustic, and dynamic complex functions, architectural members such as screen members, blinds, curtains, and dividers, cage members as pet cages, side surface walls that are installed on side surfaces of roads or railroads.

The heat ray-shielding material of the present invention can also be used as a soundproof member having a soundproof structure including a soundproofing function. Hereinafter, the physical properties and characteristics of structural members that can be combined into the heat ray-shielding material of the present invention having a soundproofing function, particularly, the physical properties or characteristics as a soundproof member that is used in soundproof structures will be described.

[Flame Resistance]

In the case of being used as an architectural material or a device interior member, the heat ray-shielding material of the present invention needs to be flame-resistant.

Therefore, the films are preferably flame-resistant. As the films, for example, LUMIRROR (registered trademark) non-halogen flame-resistant ZV series (manufactured by Toray Industries, Inc.) which is a flame-resistant PET film, TEIJIN TETORON (registered trademark) UF (manufactured by Teijin Limited.), and/or DIALAMY (registered trademark) (manufactured by Mitsubishi Plastics, Inc.) which is a flame-resistant polyester-based film, and the like may be used.

In addition, the frames are also preferably flame-resistant materials, and examples thereof include metal such as aluminum, inorganic materials such as ceramic, glass materials, flame-resistant plastics such as flame-resistant polycarbonate (for example, PCMUPY610 (manufactured by C.I. Takiron Corporation)) and/or flame-resistant acryl (for example, ACRYLITE (registered trademark) FR1 (manufactured by Mitsubishi Rayon Co., Ltd.)), and the like.

Furthermore, the method for fixing the films to the frames is also preferably an adhesion method in which a flame-resistant adhesive (THREEBOND 1537 series (manufactured by ThreeBond Co., Ltd.)) or soldering is used or a mechanical fixation method in which the film is sandwiched by and fixed to two frames.

[Heat Resistance]

Since there is a concern that the soundproofing characteristics may change due to the expansion and shrinkage of the structural member of the heat ray-shielding material of the present invention caused by changes in the ambient temperature, the material constituting the structural member is preferably a heat-resistant material, particularly, a poorly heat-shrinkable material.

As the films, for example, TEIJIN TETORON (registered trademark) film SLA (manufactured by Teijin Limited.), PEN film TEONEX (registered trademark) (manufactured by Teijin Limited.), and/or LUMIRROR (registered trademark) off-annealed poorly shrinkable model (manufactured by Toray Industries, Inc.), and the like are preferably used. In addition, generally, metal films such as aluminum having a smaller coefficient of thermal expansion than plastic materials are also preferably used.

In addition, for the frames, it is preferable to use heat-resistant plastics such as polyimide resins (TECASINT4111 (manufactured by Ensinger Japan Co., Ltd.)) and/or glass fiber-reinforced resins (TECAPEEKGF30 (manufactured by Ensinger Japan Co., Ltd.)), and/or use metal such as aluminum, inorganic materials such as ceramic, and glass materials.

Furthermore, as the adhesive, it is preferable to use a heat-resistant adhesive (TB3732 (manufactured by ThreeBond Co., Ltd.), an ultra-heat-resistant one-component shrinkable RTV silicone adhesion seal material (manufactured by Momentive Performance Materials Inc.), and/or a heat-resistant inorganic adhesive ARON CERAMIC (registered trademark) (manufactured by Toagosei Co., Ltd.)). In a case in which this adhesive is applied to the films or the frames, it is preferable that the expansion and shrinkage amount can be decreased by setting the thickness to 1 μm or less.

[Weather Fastness and Light-Resistance]

In a case in which the heat ray-shielding material of the present invention is disposed outdoors or places shined by light, the weather fastness of the structural member becomes a problem.

Therefore, for the films, weather-fast films such as special polyolefin films (ARTPLY (registered trademark) (manufactured by Mitsubishi Plastics, Inc.)), acrylic resin films (ACRYPLEN (manufactured by Mitsubishi Rayon Co., Ltd.)), and/or SCOTCHCAL film (trademark) (manufactured by 3M) are preferably used.

In addition, for the frame materials, highly weather-fast plastics such as polyvinyl chloride and polymethyl methacrylate (acryl), metal such as aluminum, inorganic materials such as ceramic, and/or glass materials are preferably used.

Furthermore, as the adhesive, highly weather-fast adhesives such as epoxy resin-based adhesives and/or DRY FLEX (manufactured by Repair Care International) are preferably used.

Regarding the moisture resistance, highly moisture-resistant films, frames, and adhesives are preferably selected. Regarding the water-absorbing property and chemical resistance as well, appropriate films, frames, and adhesives are preferably approximately selected.

[Trash]

During the long-term use, there is a possibility that trash may be attached to film surfaces and the heat ray-shielding characteristics and/or soundproofing characteristics of the heat ray-shielding material of the present invention including the soundproofing function may be affected. Therefore, it is preferable to prevent the attachment of trash and remove attached trash.

As the method for preventing trash, it is preferable to use films made of a material to which trash is not easily attached. For example, in a case in which a conductive film (FLECLEAR (registered trademark) (manufactured by TDK Corporation) and/or NCF (manufactured by Nagaoka Sangyou Co., Ltd.)) or the like is used, the films are not charged, whereby the attachment of trash due to charging can be prevented. In addition, even in a case in which fluororesin films (DI-NOC film (trademark) (manufactured by 3M)) and/or hydrophilic films (MIRROR CLEAN (manufactured by Lifeguard Co., Ltd.), RIVEX (manufactured by Riken Technos Corp.), and/or SH2CLHF (manufactured by 3M)) are used, the attachment of trash can be suppressed. Furthermore, even in a case in which photocatalytic films (RA-CLEAN (manufactured by Kimoto Tech, Inc.)) are used, the contamination of the films can be prevented. The same effect can be obtained by applying spray having electric conductivity, hydrophilicity, and/or a photocatalytic property and/or spray including a fluorine compound to the films.

In addition to the use of special films as described above, contamination can be prevented by providing a cover on the films. As the cover, it is possible to use thin film materials (SARAN WRAP (registered trademark) and the like), meshes having a mesh small enough to prevent trash from passing through, non-woven fabrics, urethane, aerogel, porous films, and the like.

Figure 25:
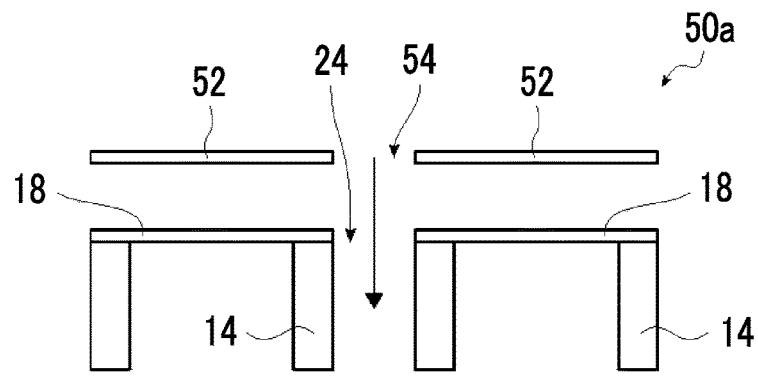
FIG. 25 is a schematic cross-sectional view of an example of the heat ray-shielding material of the present invention.
Figure 26:
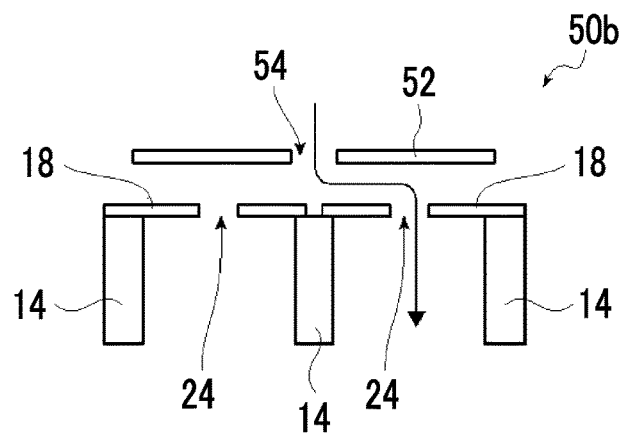
FIG. 26 is a schematic cross-sectional view of another example of the heat ray-shielding material of the present invention.

In addition, in the case of the heat ray-shielding material 11 having the air-permeable opening holes 24 in the films 18 as illustrated in FIG. 12, it is preferable to open and dispose a hole 54 in a cover 52 provided on the film 18 so as to prevent wind or trash from being brought into direct contact with the film 18 like heat ray-shielding materials 50a and 50b respectively illustrated in FIG. 25 and FIG. 26.

As the method for removing attached trash, it is possible to remove trash by radiating sound having the resonance frequency of the films and strongly vibrating the films. In addition, the same effect can be obtained using a blower or a sweeper.

[Wind Pressure]

There is a possibility that the films may be hit by strong wind and suppressed and the resonance frequency may change. Therefore, it is possible to suppress the influence of wind by covering the films with a non-woven fabric, urethane, and/or a film. In the case of the heat ray-shielding material 11 having the opening holes 24 in the films 18 as illustrated in FIG. 12, similar to the case of the trash, it is preferable to open and dispose the hole 54 in the cover 52 provided on the film 18 so as to prevent wind from being brought into direct contact with the film 18 like the heat ray-shielding materials 50a and 50b respectively illustrated in FIG. 25 and FIG. 26.

[Combination of Unit Cells]

The heat ray-shielding materials 10 and 11 of the present invention illustrated in FIG. 1, FIG. 2, and FIG. 12 are constituted of one frame body 16 in which the plurality of frames 14 continues, but the present invention is not limited thereto, and the heat ray-shielding material may be a shielding cell as a unit cell having one frame and one film attached thereto or having one frame, one film, and a through-hole formed in the film. That is, the heat ray-shielding material of the present invention does not always need to be constituted of one continuous frame body, may be a shielding cell having a frame structure and a film structure attached thereto or having one frame structure, one film structure, and a hole structure formed in the film structure as the unit cell. The above-described unit cell can be independently used or a plurality of unit cells can also be coupled together and used.

As the method for coupling the plurality of unit cell, although described below, the plurality of unit cells may be coupled together by attaching MAGIC TAPE (registered trademark), a magnet, a button, a sucking disc, and/or a protrusion and recess portion to the frame body portion or using tape or the like.

[Disposition]

Figure 27:
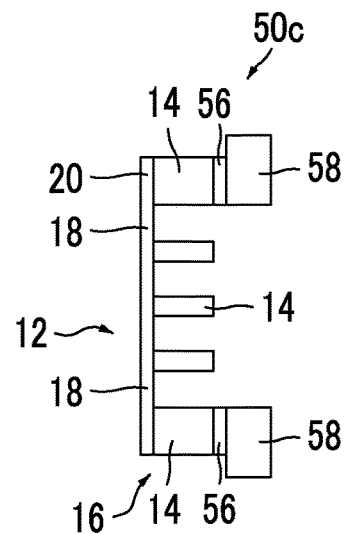
FIG. 27 is a schematic cross-sectional view illustrating an example of an attachment state of the heat ray-shielding material of the present invention to a wall.
Figure 28:
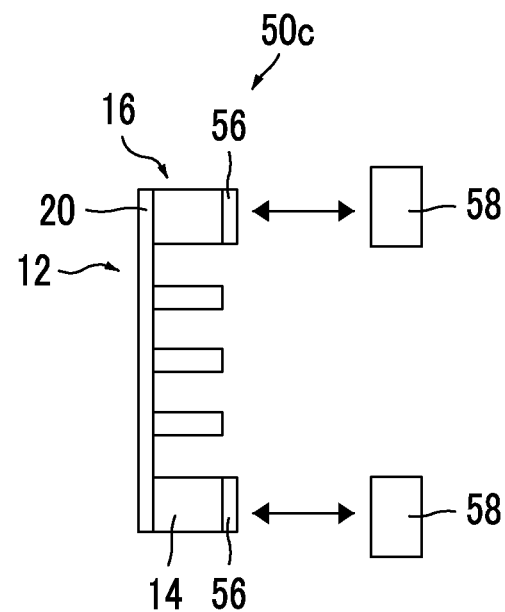
FIG. 28 is a schematic cross-sectional view of an example of a separation state of the heat ray-shielding material illustrated in FIG. 27 from the wall.

In order to enable the easy attachment or removal of the heat ray-shielding material of the present invention to and from a wall or the like, it is preferable to attach a desorption mechanism made up of a magnetic body, MAGIC TAPE (registered trademark), a button, a sucking disc, or the like to the heat ray-shielding material. For example, as illustrated in FIG. 27, a heat ray-shielding material 50c may be made to be attachable to a wall 58 by attaching and disposing a desorption mechanism 56 to the bottom surface of the frame 14 outside the frame body 16 in the heat ray-shielding material 50c and attaching the desorption mechanism 56 attached to the heat ray-shielding material 50c to the wall 58, or, as illustrated in FIG. 28, the heat ray-shielding material 50c may be separated from the wall 58 by removing the desorption mechanism 56 attached to the heat ray-shielding material 50c from the wall 58.

Figure 29:
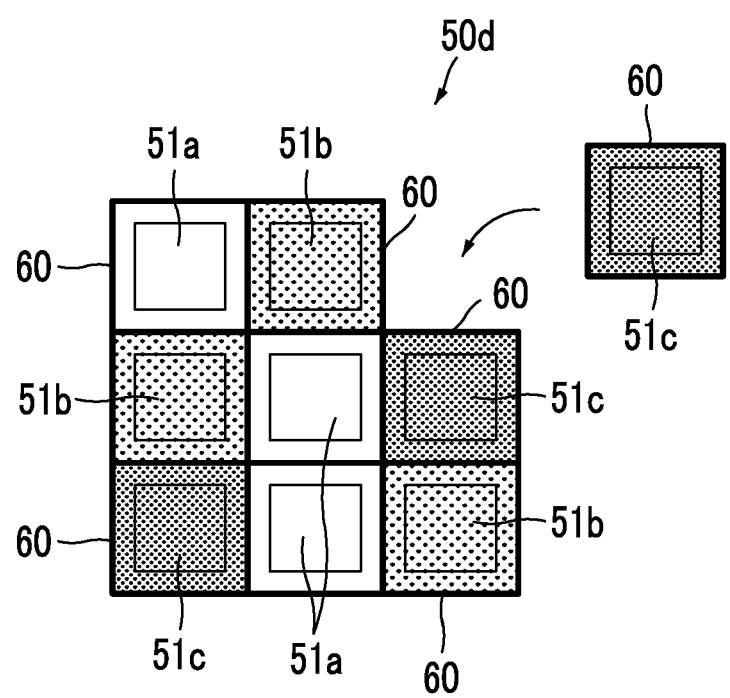
FIG. 29 is a plan view illustrating adsorption and desorption of a unit cell in another example of the heat ray-shielding material of the present invention.

In addition, in a case in which individual shielding cells having different resonance frequencies, for example, as illustrated in FIG. 29, shielding cells 51a, 51b, and 51c are combined together so as to adjust the heat ray-shielding characteristics and/or soundproofing characteristics of a heat ray-shielding material 50d, it is preferable to attach a desorption mechanism 60 such as a magnetic body, MAGIC TAPE (registered trademark), a button, or a sucking disc to the respective shielding cells 51a, 51b, and 51c so that the respective shielding cells 51a, 51b, and 51c are easily combined together.

Figure 30:
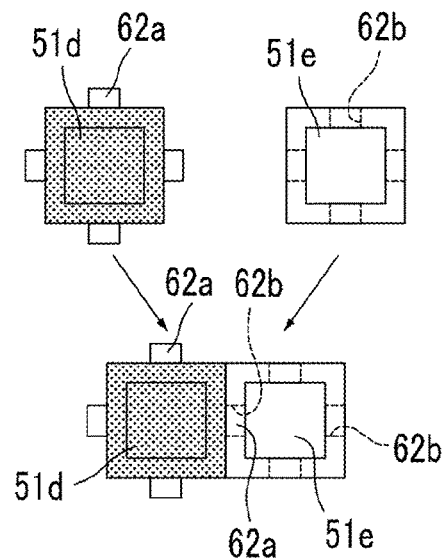
FIG. 30 is a plan view illustrating the adsorption and desorption of the unit cell in another example of the heat ray-shielding material of the present invention.

In addition, a shielding cell 51d and a shielding cell 51e may be adsorbed or desorbed by providing protrusion and recess portions to the shielding cells, for example, as illustrated in FIG. 30, providing a protrusion portion 62a to the shielding cell 51d, providing a recess portion 62b to the shielding cell 51e, and engaging the protrusion portion 62a and the recess portion 62b. In a case in which it is possible to combine a plurality of shielding cells, both a protrusion portion and a recess portion may be provided in one shielding cell.

Furthermore, the shielding cells may be adsorbed or desorbed by combining the desorption mechanism 60 illustrated in FIG. 29, the protrusion and recess portions illustrated in FIG. 30, the protrusion portion 62a, and the recess portion 62b.

[Mechanical Strength of Frames]

As the size of the heat ray-shielding material of the present invention increases, the frames are more likely to vibrate, and the function as fixation ends against film vibration degrades. Therefore, it is preferable to increase the frame stiffness by increasing the thickness of the frames. However, an increase in the thickness of the frames increases the mass of the heat ray-shielding material, and the advantage of the present lightweight heat ray-shielding material degrades.

Figure 31:
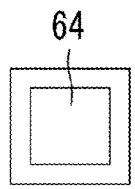
FIG. 31 is a plan view of an example of a shielding cell of the heat ray-shielding material of the present invention.
Figure 32:
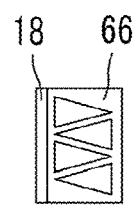
FIG. 32 is a side view of the shielding cell illustrated in FIG. 31.
Figure 33:
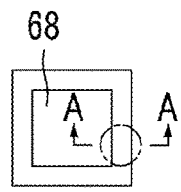
FIG. 33 is a plan view of an example of the shielding cell of the heat ray-shielding material of the present invention.
Figure 34:
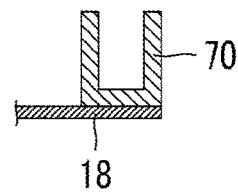
FIG. 34 is a schematic cross-sectional view of the shielding cell illustrated in FIG. 33 in a direction of an A-A arrow.

Therefore, in order to decrease the increase in the mass while maintaining the high stiffness, a hole or a groove is preferably formed in the frame. For example, in a case in which a truss structure as illustrated in FIG. 32 as a side view is used for a frame 66 in a shielding cell 64 illustrated in FIG. 31 or a Rahmen structure as illustrated in FIG. 34 as a cross-sectional view in a direction of the A-A line in FIG. 33 is used for a frame 70 in a shielding cell 68 illustrated in FIG. 33, it is possible to satisfy both high stiffness and lightweight.

Figure 35:
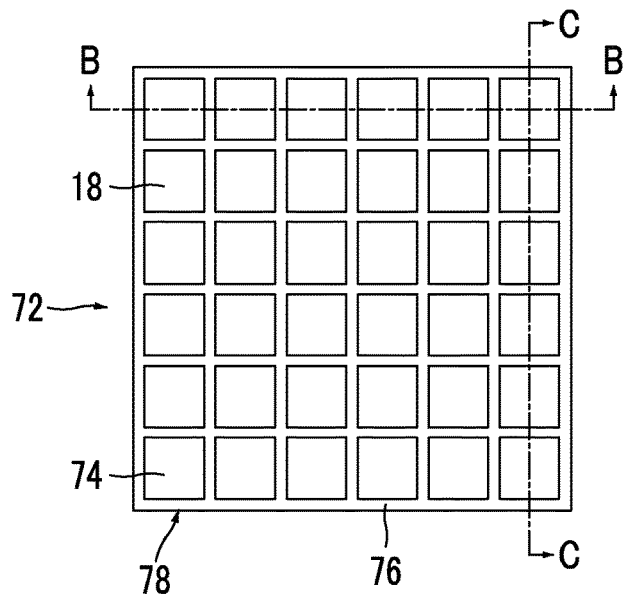
FIG. 35 is a plan view of another example of the heat ray-shielding material of the present invention.
Figure 36:
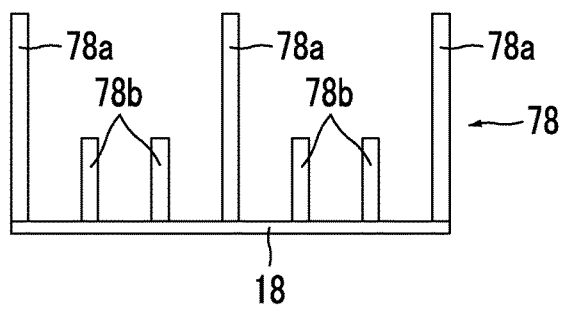
FIG. 36 is a schematic cross-sectional view of the heat ray-shielding material illustrated in FIG. 35 in a direction of a B-B arrow.
Figure 37:
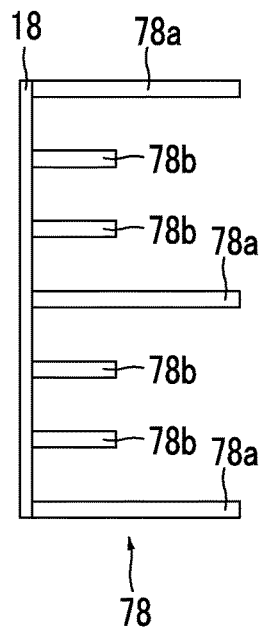
FIG. 37 is a schematic cross-sectional view of the heat ray-shielding material illustrated in FIG. 35 in a direction of a C-C arrow.

In addition, for example, it is also possible to ensure high stiffness and reduce the weight by changing or combining the thicknesses of the frames in the plane as illustrated in FIG. 35 to FIG. 37. Like a heat ray-shielding material 72 of the present invention illustrated in FIG. 32, the thicknesses of frame materials 78a on both outsides and in the center of a frame body 78 made up of a plurality of frames 76 in 36 shielding cells 74 are set to be thicker than those of frame materials 78b in the other portions, in the illustrated example, set to be twice or more as illustrated in FIG. 36 which is a schematic cross-sectional view of a heat ray-shielding material 72 illustrated in FIG. 35 in a direction of a B-B line. Even in a direction perpendicular thereto as illustrated in FIG. 37 which is a schematic cross-sectional view in a direction of a C-C line that is perpendicular to the B-B line, similarly, the thicknesses of frame materials 78a on both outsides and in the center of the frame body 78 are set to be thicker than those of frame materials 78b in the other portions, in the illustrated example, set to be twice or more.

In such a case, it is possible to satisfy both an increase in the stiffness and a decrease in the weight.

Meanwhile, in the films 18 in the respective shielding cells illustrated in FIG. 27 to FIG. 37, no opening holes are punched, but the present invention is not limited thereto, and it is needless to say that the films may have the opening holes 24 like the shielding cells 22*a* of the examples illustrated in FIG. 12.

The method for manufacturing the heat ray-shielding material of the present invention having the above-described constitution will be described below.

The heat ray-shielding material 10 of the present invention illustrated in FIG. 1 is manufactured in the following manner.

First, the frame body 16 having a plurality of, for example, 225 frames 14 and the heat-shieldable sheet-like film body 20 that covers all of the openings 12 in all of the frames 14 in the frame body 16, for example, the sheet-like heat-shielding film 30, 40, or 41 illustrated in FIG. 3, FIG. 7, FIG. 8, or FIG. 11 are prepared.

Next, the sheet-like film body 20 is fixed to all of the frames 14 in the frame body 16 using an adhesive, and the films 18 that respectively cover the openings 12 in all of the frames 14 are formed, thereby constituting a plurality of shielding cells 22 having a frame-film structure made up of the frame 14 and the film 18.

The heat ray-shielding material 10 of the present invention can be manufactured in the above-described manner.

In addition, the heat ray-shielding material 11 of the present invention illustrated in FIG. 12 is manufactured as described below.

After a plurality of shielding cells 22 having a frame-film structure made up of the frame 14 and the film 18 is constituted in the same manner as in the above-described heat ray-shielding material 10 of the present invention illustrated in FIG. 1, furthermore, one or more opening holes 24 is punched in each of the films 18 in the plurality of shielding cells using a processing method that absorbs energy such as laser processing or a mechanical processing method by means of physical contact such as punching or needle processing, thereby forming the opening hole 24 in the shielding cell 22*a*.

The heat ray-shielding material 11 of the present invention can be manufactured in the above-described manner.

The method for manufacturing the heat ray-shielding material of the present invention is the method described above.

The heat ray-shielding material of the present invention having the above-described constitution has a variety of characteristics described above and is thus suitable for a variety of uses. For example, the heat ray-shielding material of the present invention can be used as architectural members that are used in indoor and outdoor boundaries, cage members that are used as pet cages, and side surface walls that are installed on side surfaces of roads or railroads.

As the architectural members, the heat ray-shielding material of the present invention can be used as movable members or removable members. In the case of the above-described architectural members, in architectural structures for which the architectural members are used or spaces, it is preferable that the plurality of films of the heat ray-shielding material is disposed outside and the frame body made up of the frames is disposed inside.

Examples of the architectural members that are used as movable members or removable members include window members in which the heat ray-shielding material is used as movable or removable windows, particularly, transparent portions of external windows with respect to internal windows of double-pane windows and screen members for which the heat ray-shielding material is used as transparent portions of movable or removable screens and further include blinds, curtains, dividers, and the like for which the heat ray-shielding material is used as a structure in which the frame body is collapsible.

Furthermore, as the cage members, it is possible to form cage members having a cuboid shape in which at least one surface of the cuboid is formed using the heat ray-shielding material. At this time, all of the six surfaces of the cuboid of the cage members may be formed using the heat ray-shielding material or cage members having cracks on several surfaces of all of the six surfaces of the cuboid may be configured by forming only the remaining surface using the heat ray-shielding material.

Meanwhile, the above-described window members, screen members, and cage members are preferably formed using the heat ray-shielding material of the present invention which has the opening holes punched in the films, is air-permeable, and is capable of soundproofing specific low-frequency sound.

In addition, in a case in which the heat ray-shielding material of the present invention is used for the side surface walls that are installed on the side surfaces of roads or railroads, the side surface walls may be constituted of the heat ray-shielding material, but may be constituted so that side surface walls that are separately provided are jointly used.

The heat ray-shielding material of the present invention and the architectural members, the cage members, and the side surface walls of roads or railroads, for all of which the heat ray-shielding material is used, are basically constituted as described above.

The heat ray-shielding material of the present invention has a soundproofing function and thus can also be used for uses as soundproof members as described below.

Examples of the uses as soundproof members of the heat ray-shielding material of the present invention having a soundproofing function include soundproof members for architectural materials: soundproof members that are used as architectural materials, soundproof members for air-conditioning facilities: soundproof members which are installed in ventilation openings, air-conditioning ducts, or the like and prevent external noise, soundproof members for external opening portions: soundproof members which are installed in room windows and prevent indoor or outdoor noise, soundproof members for ceilings: soundproof members which are installed in room ceilings and control indoor or outdoor audio, soundproof members for floors: soundproof members which are installed in floors and control indoor audio, soundproof members for internal opening portions: soundproof members which are installed in portions of indoor doors or sliding doors and prevent noise from individual rooms, soundproof members for toilets: soundproof members which are installed in toilets or (indoor or outdoor) door portions and prevent noise from the toilets, soundproof members for balconies: soundproof members which are installed in balconies and prevent noise from the balconies or neighborhood balconies, soundproof members for indoor intonation: soundproof members for controlling the audio of rooms, simplified soundproof members: soundproof members which can be simply assembled and simply moved, soundproof room members for pets: soundproof members which surround pet rooms and prevent noise, amusement facilities: soundproof members which are installed in game centers, sports centers, concert halls, and movie theaters, soundproof members for construction site temporary enclosure: soundproof members that prevent the leakage of noise to peripheries of construction sites, and soundproof members for tunnels: soundproof members which are installed in tunnels and prevent noise leaking to the inside or outside of the tunnels.

EXAMPLES

The heat ray-shielding material of the present invention will be specifically described on the basis of examples.

First, as an example, a heat-shielding film having a constitution in which nano flat particles of silver were applied onto the flat surface of a PET film was used as a "film", and a constitution obtained by attaching an acrylic "frame" to the film was used as the basic of a sample of a heat ray-shielding material.

The design of a heat-shielding and soundproofing structure will be described before manufacturing an example of the heat ray-shielding material of the present invention and carrying out tests.

Regarding optics, the optical spectra of particle shapes and randomly-disposed particle groups were calculated using FDTD simulation which was developed by Fujifilm Corporation using a finite-difference time-domain method (FDTD method). This simulation results were reproduced using, for example, optical electromagnetic analysis software "Poynting for Optics" manufactured by Fujitsu Limited or, in the calculation of a finite element method (FEM), a radio frequency (RF) module of COMSOL Ver. 5.0 (manufactured by COMSOL AB (Sweden)) which is FEM-based versatile physical simulation software. Optimal particle sizes or densities were designed by means of this calculation. In addition, regarding an antireflection function as well, similarly, the optimal thickness of a dielectric layer was determined by means of FDTD simulation.

In addition, the soundproofing property was also designed using an acoustic module of FEM calculation COMSOL Ver. 5.0.

Meanwhile, the shapes or materials of samples were determined on the basis of these designs. The optical characteristics and acoustic characteristics in the test results coincided well with the prediction from the simulation.

First, the preparation and evaluation of a variety of coating liquids used to produce heat-shielding films that were used as films in heat ray-shielding materials of individual examples and comparative examples will be described.

—Preparation of Silver Flat Particle Dispersion Liquid A1—

Ion exchange water (13 L) was weighed in a reaction container made of NTKR-4 (manufactured by Nippon Metal Industry Co., Ltd.), an aqueous solution (1.0 L) of 10 g/L of trisodium citrate (anhydride) was added thereto under stirring using a chamber including an AJITER in which four NTKR-4 propellers and four NTKR-4 paddles were attached to an SUS316L shaft, and the temperature was maintained at 35° C. An aqueous solution (0.68 L) of 8.0 g/L of polystyrene sulfonate was added thereto, and furthermore, an aqueous solution (0.041 L) of sodium boron hydride prepared to 23 g/L using an aqueous solution of 0.04 N of sodium hydroxide. An aqueous solution (13 L) of 0.10 g/L of silver nitrate was added at 5.0 L/min.

An aqueous solution (1.0 L) of 10 g/L of trisodium citrate (anhydride) and ion exchange water (11 L) were added thereto, and furthermore, an aqueous solution (0.68 L) of 80 g/L of potassium hydroquinonesulfonate was added thereto. The components were stirred at an increased rate of 800 rpm, an aqueous solution (8.1 L) of 0.10 g/L of silver nitrate was added thereto at 0.95 L/min, and the temperature was lowered to 30° C.

An aqueous solution (8.0 L) of 44 g/L of methyl hydroquinone was added thereto, and then the full amount of an aqueous solution of gelatin (40° C.) described below was added thereto. The components were stirred at an increased rate of 1,200 rpm, and the full amount of a liquid mixture of the white precipitate of silver sulfite described below was added thereto.

In a state at which the pH change of the prepared liquid increased, an aqueous solution (5.0 L) of 1 N or NaOH was added thereto at 0.33 L/min. After that, an aqueous solution (0.18 L) of 2.0 g/L of sodium 1-(m-sulfophenyl)-5-mercaptotetrasol tetrazole (dissolved using NaOH and citric acid (anhydride) by adjusting the pH in a range of 7.0±1.0) was added thereto, and furthermore, an aqueous solution (0.078 L) of 70 g/L of 1,2-benzisothiazol-3-one (dissolved using NaOH by adjusting an aqueous solution to be alkaline) was added thereto. A silver flat particle dispersion liquid A1 was prepared in the above-described manner.

—Preparation of Aqueous Solution of Gelatin—

Ion exchange water (16.7 L) was weighed in a SUS316L solution tank. Alkali-treated beef bone gelatin on which a deionization treatment had been carried out (GPC weight-average molecular weight: 200,000) (1.4 kg) was added thereto under low-speed stirring using a SUS316L AJITER. Furthermore, alkali-treated beef bone gelatin on which a deionization treatment, a protein-degrading enzyme treatment, and an oxidation treatment using hydrogen peroxide had been carried out (GPC weight-average molecular weight: 21,000) (0.91 kg) was added thereto. After that, the temperature was increased to 40° C., and the gelatins were swollen and dissolved at the same time so as to be fully dissolved.

—Preparation of Liquid Mixture of White Precipitate of Silver Sulfite—

Ion exchange water (8.2 L) was weighed in a SUS316L solution tank, and an aqueous solution (8.2 L) of 100 g/L of silver nitrate was added thereto. An aqueous solution (2.7 L) of 140 g/L of sodium sulfite was added thereto within a short period of time under high-speed stirring using the SUS316L AJITER, thereby preparing a liquid mixture including the white precipitate of silver sulfite. This liquid mixture was prepared immediately before being used.

—Preparation of Silver Flat Particle Dispersion Liquid B1—

The above-described silver flat particle dispersion liquid A1 (800 g) was sampled into a centrifuge tube and was adjusted to a pH of 9.2±0.2 at 25° C. using 1 N of NaOH and/or 1 N of sulfuric acid. After a centrifugal separation operation was carried out at 35° C. and 9,000 rpm for 60 minutes using a centrifugal separator (himac CR22GIII manufactured by Hitachi Koki Co., Ltd., Angle Rotor R9A), the supernatant liquid (784 g) was thrown away. An aqueous solution of 0.2 mM of NaOH was added to the precipitated silver flat particles so as to obtain a total amount of 400 g, and the components were manually stirred using a stirring rod, thereby producing a coarse dispersion liquid. Twenty four coarse dispersion liquids were prepared in the same manner so as to obtain a total amount of 9,600 g, were added to a SUS316L tank and mixed together. Furthermore, a solution (10 cc) of 10 g/L of Pluronic 31R1 (manufactured by BASF) (diluted with a liquid mixture of methanol and ion exchange water in a volume ratio of 1:1) was added thereto. A batch-type dispersion treatment was carried out at 9,000 rpm for 120 minutes on the coarse dispersion liquid mixture in the tank using an AUTO MIXER Model 20 manufactured by Primix Corporation (the stirring portion was HOMO MIXER MARK II). The liquid temperature during the dispersion was maintained at 50° C. After the dispersion, single path filtration was carried out using a PROFILE II filter (manufactured by Nihon Pall Ltd., Serial No. MCY1001Y030H13) while lowering the temperature to 25° C.

A desalination treatment and a re-dispersion treatment were carried out on the dispersion liquid A1 in the above-described manner, thereby preparing a silver flat particle dispersion liquid B1.

—Evaluation of Metal Plate Particles—

It was confirmed that, in the silver flat particle dispersion liquid A1, hexagonal, circular, and triangular flat particles were generated. Meanwhile, in the dispersion liquid A1, all of the fine metal particles were metal plate particles. An image of the silver flat particle dispersion liquid A obtained by TEM observation was imported to image processing software ImageJ and was processed. Image analyses were carried out on 500 particles arbitrarily extracted from TEM images of several views, and circle-equivalent diameters of the same area were computed. As a result of statistical processing carried out on the basis of these parent populations, the average diameter was 120 nm.

As a result of measuring the silver flat particle dispersion liquid B1 in the same manner, a result of the shape of the particle size distribution being also almost the same as that of the silver flat particle dispersion liquid A1 was obtained.

The silver flat particle dispersion liquid B1 was added dropwise and dried on a silicon substrate, and the thicknesses of the respective silver flat particles were measured using a FIB-TEM method. Ten silver flat particles in the silver flat particle dispersion liquid B1 were measured, and the average thickness was 8 nm.

Therefore, the aspect ratio was 15.0.

—Preparation of Coating Liquid for Metal Particle-Containing Layer and Coating Liquid for Dielectric Layer—

Coating liquids C1A and D1 were prepared in compositional ratios of materials shown in Table 3.

TABLE 3

| | C1A | D1 |
|---|---|---|
| Aqueous solution of polyurethane: HYDRAN HW-350 (manufactured by DIC Corporation, solid content concentration: 30% by mass) | 0.27 | 1.83 |
| Surfactant A: F LIPAL 8780P (manufactured by Lion Corporation, solid content: 1% by mass) | 0.96 | 0 |
| Surfactant B: NAROCTY CL-95 (manufactured by Sanyo Chemical Industries, Ltd., solid content: 1% by mass) | 1.19 | 1.18 |
| Silver flat particle dispersion liquid B1 | 25 | 0 |
| 1-(5-Methylureidophenyl)-5-mercaptotetrazole (manufactured by Wako Pure Chemical Industries, Ltd., solid content: 2% by mass) | 0.61 | 0 |

TABLE 3-continued

| | C1A | D1 |
|---|---|---|
| Water | 41.97 | 64.63 |
| Methanol | 30 | 0 |
| Silica particle IPA dispersion liquid: THRULYA 4110 Manufactured by JGC C&C., solid content concentration: 20.5% | 0 | 4.06 |
| IPA | 0 | 25.94 |

Meanwhile, in Table 3, the units of the respective values are parts by mass.

Heat-shielding films that served as films used in individual examples and Comparative Example 2 (refer to the heat-shielding film 40 having a reflection prevention effect illustrated in FIG. 8) were produced using the coating liquids C1A and D1 prepared and obtained as described above.

Example 1

On both surfaces of a TAC film (FUJITAC, 120 µm, refractive index: 1.5) as the transparent base material 42, the coating liquid C1A for the metal particle-containing layer was applied using a wire bar so that the average thicknesses of the dried films on the respective surfaces reached 20 nm respectively. After that, the films were heated at 130° C. for one minute, dried, and solidified so as to form the metal particle-containing layers 34.

The coating liquid D1 for the dielectric layer was applied on the formed metal particle-containing layers 34 using a wire bar so that the average thickness of the dried films reached 60 nm. After that, the films were heated at 130° C. for one minute, dried, and solidified so as to form the dielectric layers 44, thereby obtaining a heat-shielding film having a reflection prevention effect of Example 1.

Meanwhile, the heat-shielding film used in Example 1 included laminates of the metal particle-containing layer 34 and the dielectric layer 44 on both surfaces respectively unlike the heat-shielding film 40 illustrated in FIG. 8 which includes the laminate only one surface of the transparent base material 42.

The heat-shielding film produced in the above-described manner was used as the "film" 18 in the heat ray-shielding material 10 of the present invention illustrated in FIG. 1.

The Young's modulus of the film was measured using AUTOGRAPH manufactured by Shimadzu Corporation and found out to be 3 GPa. The Young's modulus of the TAC film onto which the coating liquid for the metal particle-containing layer 34 was not yet applied was measured and found out to be 3 GPa, which confirmed that the Young's modulus did not change. This was considered to be because the thicknesses of the applied layers (the metal particle-containing layers 34) were extremely thin compared with the TAC film which served as the transparent base material 42 and thus rarely affected the dynamic characteristics.

As the "frame" 14, an acryl material having a thickness of 3 mm and a width of 2 mm was used, the shape of the frame 14 was set to a square shape, and the sides of the square opening 12 were processed to be 20 mm. A total of 36 (6×6) openings 12 having a frame structure (a cell structure of the frame 14 in the frame body 16) were provided.

At this time, the weight of the frame body 16 made up of 36 frames 14 reached approximately 12 g. Meanwhile, in a case in which a 3 mm-thick acryl sheet was prepared in the same external area as that of the frame body 16, the weight thereof reached approximately 64 g, and thus it was possible to reduce the weight to approximately 20% of the weight of the acryl sheet by producing the frame body 16 including 36 frames 14.

If the frame body 16 including a total of 10,000 frames 14 having a square opening 12 is produced in the same thickness and the same width, the weight thereof reaches approximately 3 kg; however, in the case of an acryl sheet having the same thickness, the weight reaches 17 kg. At this time, a square shape having 2 m 20 cm-long sides is formed, and thus it is found that, when a frame structure is formed, it becomes significantly easier to use the frame body compared with heavy acryl sheets.

To the frame structure of the frame body 16, the films 18 were fixed using an adhesive. As the adhesive, an epoxy/modified silicone resin-based adhesive EP001 manufactured by Cemedine Co., Ltd. was used.

The adhesive was applied to the surface portions of the respective frames 14 in the frame body 16, and the films 18 were attached thereto. At this time, attention was paid so as to prevent the heat-shielding film that served as the films 18 from being wrinkled, whereby the appearance of the films became clear and transparent, and the stiffness or the soundproofing property became uniform.

In order to measure the strength of a structure of the frame-film structure, a digital focus gauge ZP-5N manufactured by Imada Inc. was vertically pressed onto the frame-film structure so as to be capable of vertically moving in the XYZ stage, and the migration distance in the perpendicular direction of the film and the force of the film pressing the tension meter were measured. At this time, the migration distance in the perpendicular direction and the force has a quadratic curve relationship. When the force to be measured is represented by F (mN), and the pressed distance in the perpendicular direction is represented by Z (mm), a relationship of $F=a*Z^2$ is satisfied. Here, a represents a constant.

This coefficient a relates to the tensile force of the film, an increase in a indicates that the repulsive force of the film against being pressed is strong and the tensile force is large.

The measured parameter a was 1,570 (mN/mm$^2$). It was found that the strength of the frame-film structure became significantly stronger than the strength of the heat-shielding film which was the films and was capable of independently moving.

Figure 14:
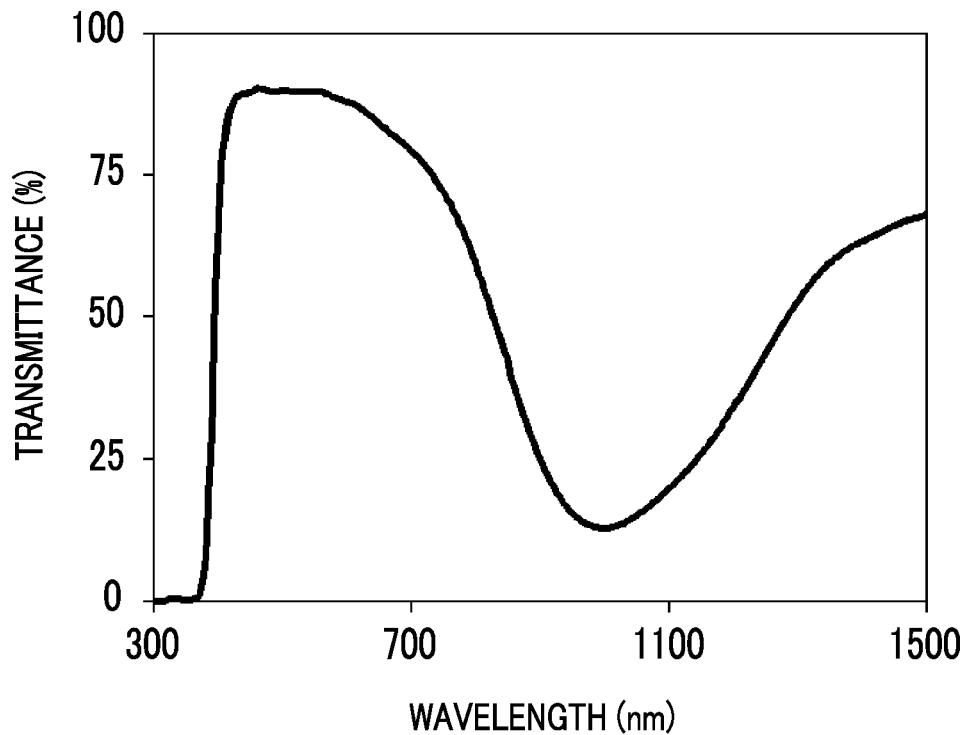
FIG. 14 is a graph illustrating light transmission characteristics of a heat ray-shielding material of Example 1 of the present invention.

Regarding the optical characteristics of the heat ray-shielding material of Example 1, the transmittance and reflectivity of the film 18 in the frame-film structure against light wavelengths of 300 nm to 1,500 nm were measured using U4000 manufactured by Hitachi, Ltd. The incidence angle was 5°. In addition, the size of the measurement spot was 1 cm×1 cm, and it was possible to sufficiently measure the film surface in the shielding cell 22 of this time. The results are illustrated in FIG. 14 regarding the transmittance and in FIG. 15 regarding the reflectivity.

Figure 15:
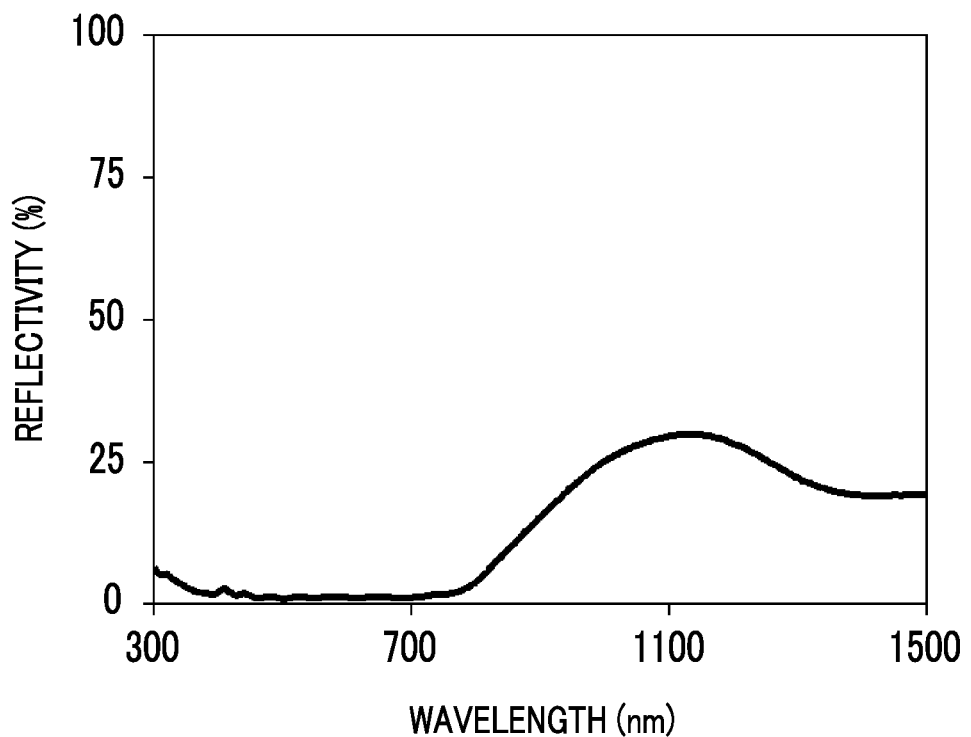
FIG. 15 is a graph illustrating light reflection characteristics of the heat ray-shielding material of Example 1 of the present invention.

For the heat ray-shielding material of Example 1, as illustrated in FIG. 15, the reflectivity was suppressed in the visible light range (380 nm to 780 nm), but the reflectivity of approximately 30% appeared at near 1,100 nm which is the near-infrared range. In addition, as illustrated in FIG. 14, the transmittance was also equal to or lower than 50% in the range of 800 nm to 1,300 nm and significantly shielded in the near-infrared range. As described above, it was found that, even with the frame-film structure, it is possible to impart optical functions including both the reflection prevention of visible light and the shielding of near-infrared light.

Since the soundproofing effect was confirmed as the effect of the heat ray-shielding material of Example 1, the soundproofing effect was measured. In order to measure the soundproofing effect, the acoustic characteristics were measured using a self-produced aluminum acoustic tube, four microphones, and the transfer function method. This method was based on "ASTM E 2611-09: Standard Test Method for Measurement of Normal Incidence Sound Transmission of Acoustical Materials Based on the Transfer Matrix Method".

In the acoustic tube, for example, the same measurement principle as for WinZac manufactured by Nihon Onkyo Engineering Co., Ltd. was applied. With this method, it is possible to measure acoustic transmission losses in wide spectrum bandwidths.

The heat ray-shielding material having the frame-film structure of Example 1 was disposed at the measurement portion in the acoustic tube, and the acoustic transmission loss was measured in a range of 100 Hz to 2,000 Hz.

The measurement results of the transmission loss are illustrated in FIG. 16.

In addition, the transmittance and the reflectivity were obtained using the above-described acoustic tube, and the frequency reliance of the absorbance was obtained from the transmittance and the reflectivity. The results are illustrated in FIG. 17.

As illustrated in FIG. 16, it was found that, since the heat ray-shielding material of Example 1 had the frame-film structure, the vibration of the films had a drum shape, and the first resonance frequency was present at near 800 Hz. It was found that heat rays were strongly shielded according to the stiff rule on the lower frequency side of the first resonance frequency and according to the mass rule on the higher frequency side.

In addition, as illustrated in FIG. 16, the absorption of sound became significant at the first resonance frequency.

For the heat ray-shielding material of Example 1, the surface resistivity was measured using LORESTA GPMCP-T600 manufactured by Mitsubishi Chemical Analytech Co., Ltd. and the four-point method. As a result, it was confirmed that the surface resistivity was $9.9\times10^{12}$ ($\Omega/\square$), and thus the heat ray-shielding material was an electric insulator and was radio wave-transmissible.

As described above, in a case in which a member for external windows is produced using a structure in which the heat-shieldable film 18 is attached to one surface of the frame 14, it is desirable to dispose the heat-shieldable film 18 on the outside of houses and the frame 14 on the inside of the houses. In such a case, regarding the shielding of external solar radiation, the front surfaces of the films 18 are capable of selectively reflecting near-infrared light without being affected by the frames 14, and, in a case in which the heat ray-shielding material is used as sliding door-type screens or external windows, the frames 14 attached to the heat ray-shielding material facilitates the movement of the heat ray-shielding material with fingers in houses. Generally, in many cases, screens are opened and closed in houses, and thus a structure in which the films 18 are disposed outside and the frames 14 are disposed inside is more desirable.

Comparative Example 1

A frame-film structure was produced in the same manner using an original TAC film instead of the heat-shielding film made up of the TAC film and the metal particle-containing layers applied on both surfaces in Example 1. For this structure, the optical characteristics, acoustic characteristics, and electric characteristics were measured using the same method as in Example 1. Regarding the optical characteristics, the reflectivity of ordinary TAC films, approximately 8%, was exhibited on both surfaces, and both the anomalous shielding of near-infrared light and the reflection of visible light were impossible. Meanwhile, regarding the acoustic characteristics, sound isolation according to the mass rule and the stiffness rule was obtained in the same manner as in Example 1. Regarding the electric characteristics, it was confirmed that, similar to Example 1, the heat ray-shielding material was an electric insulator and was radio wave-transmissible.

Comparative Example 2

Figure 22:
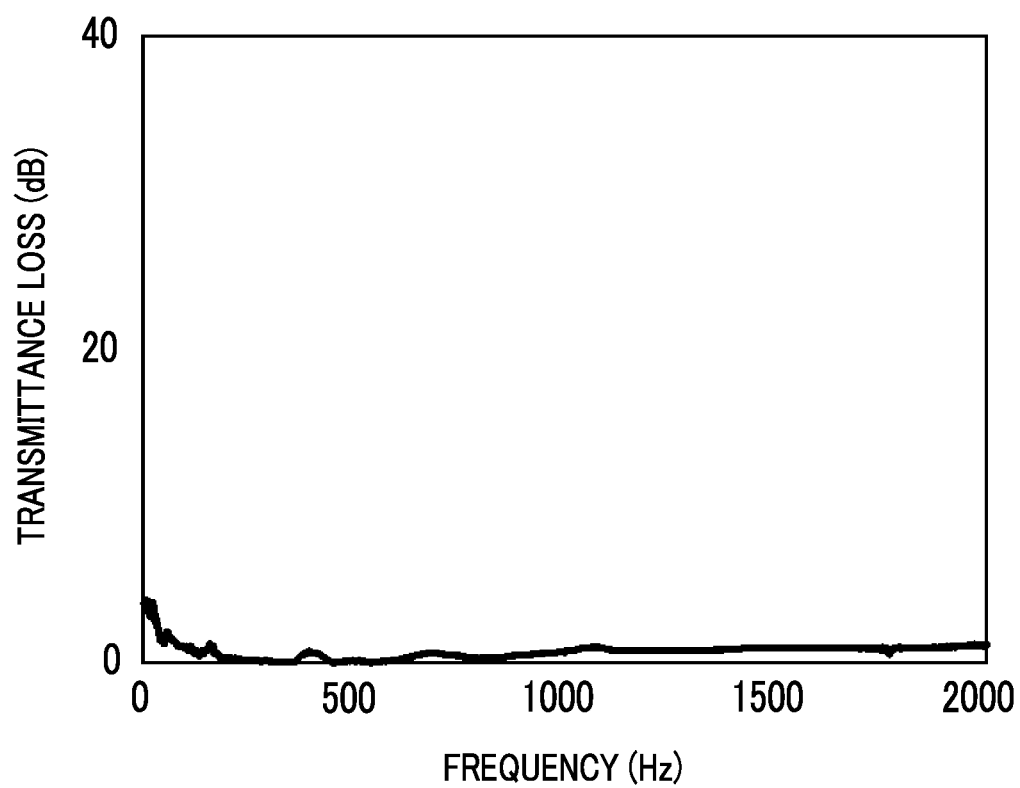
FIG. 22 is a graph illustrating sound isolation characteristics of a heat ray-shielding material of Comparative Example 1.

The films 18 in the heat ray-shielding material were not fixed to the frames 14 in Example 1, and only the film was evaluated in the same manner as in Example 1. Regarding the optical characteristics, the same characteristics as in Example 1 were obtained. In the measurement of audio, the film end portions were not strongly fixed, but loosely supported in the acoustic tube, whereby the influence of the acoustic tube was prevented, and the acoustic characteristics of the film were measured. The measured equivalent losses are illustrated in FIG. 22. Since the frames 14 were absent, sound was not isolated by specific vibration or stiffness, and a sound isolation effect of less than 5 dB was obtained. In addition, there was no clear first resonance frequency. Regarding the electric characteristics, the same results as in Example 1 were obtained.

In addition, in order to measure the strength of the film, tensile force vertically applied to the film 18 was measured in the same manner as in Example 1. Since it is extremely difficult to measure tensile force using the degree of the film being pressed in the vertical direction, the tensile force was measured in a state in which the film was slightly fixed to a circular frame having a diameter of 8 cm using tape. The measured parameter a was 0.009 (mN/mm$^2$). It was found that the film was not capable of standing for itself with the tensile force of the film and thus a support was required.

Example 2

The heat ray-shielding material 11 illustrated in FIG. 12 was produced by punching the opening hole 24 having a diameter of 1 mm in each of the shielding cells 22 in the heat ray-shielding material 10 (refer to FIG. 1) of Example 1. Regarding the punching method, the opening holes 24 were dynamically formed by means of punching.

The optical characteristics, acoustic characteristics, and electric characteristics of the heat ray-shielding material of Example 2 obtained as described above were measured in the same manner as in Example 1.

Figure 18:
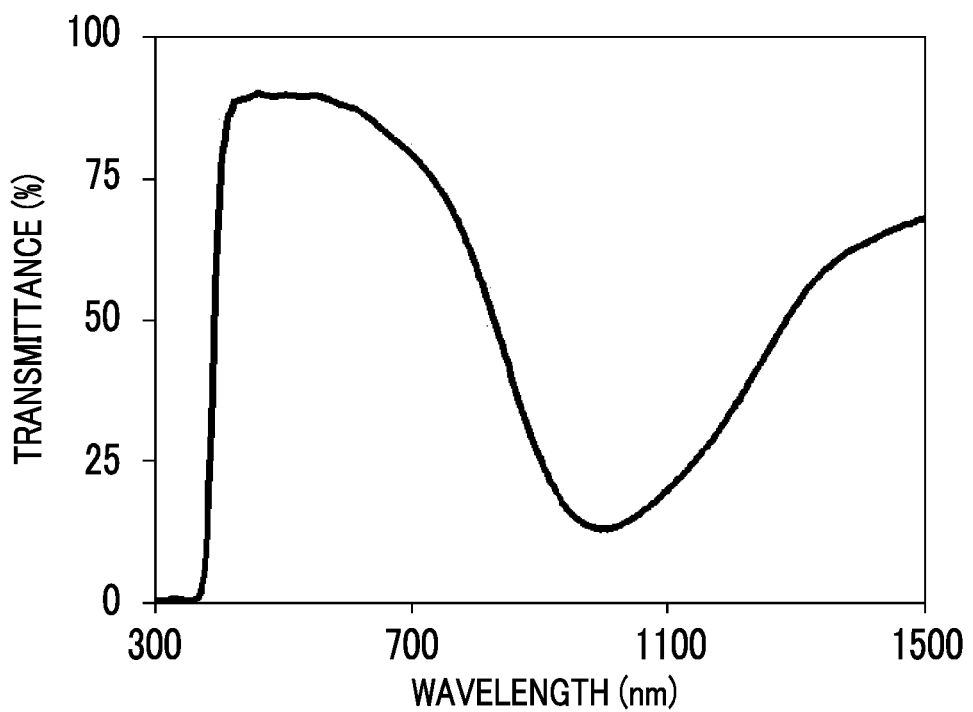
FIG. 18 is a graph illustrating light transmission characteristics of a heat ray-shielding material of Example 2 of the present invention.
Figure 19:
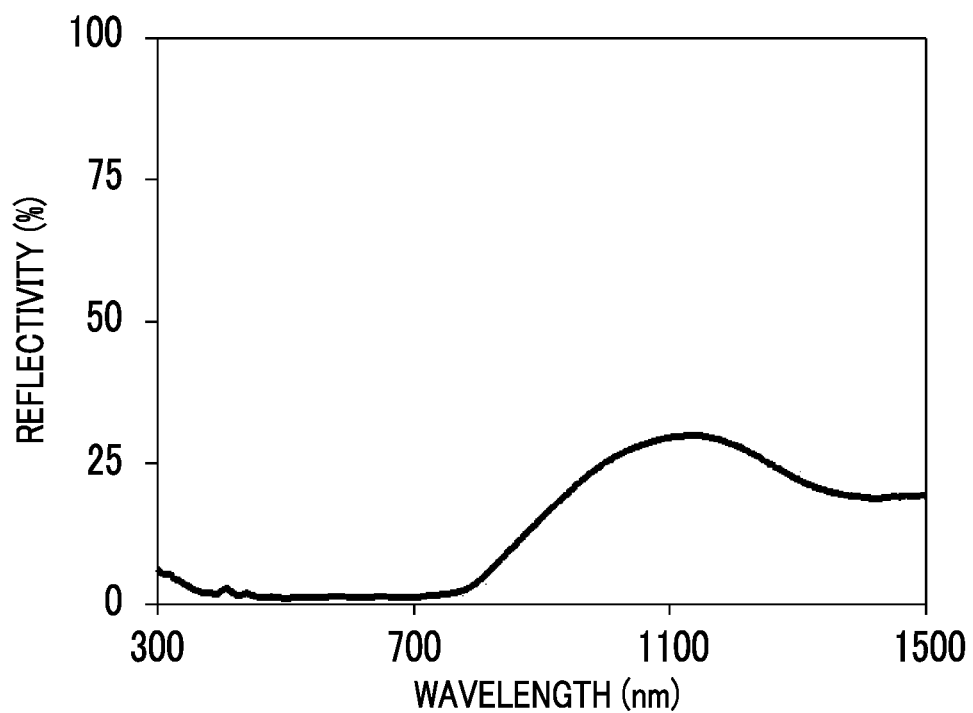
FIG. 19 is a graph illustrating light reflection characteristics of the heat ray-shielding material of Example 2 of the present invention.

The optical measurement results of the frame-film-hole structure of the heat ray-shielding material of Example 2 are illustrated in FIG. 18 and FIG. 19.

The results illustrated in FIG. 18 and FIG. 19 became identical to the results of Example 1 illustrated in FIG. 14 and FIG. 15, respectively. Since the area ratio of the opening holes 24 was 0.25% or less, the optical characteristics of the entire heat ray-shielding material of Example 2 remained almost unchanged.

Figure 21:
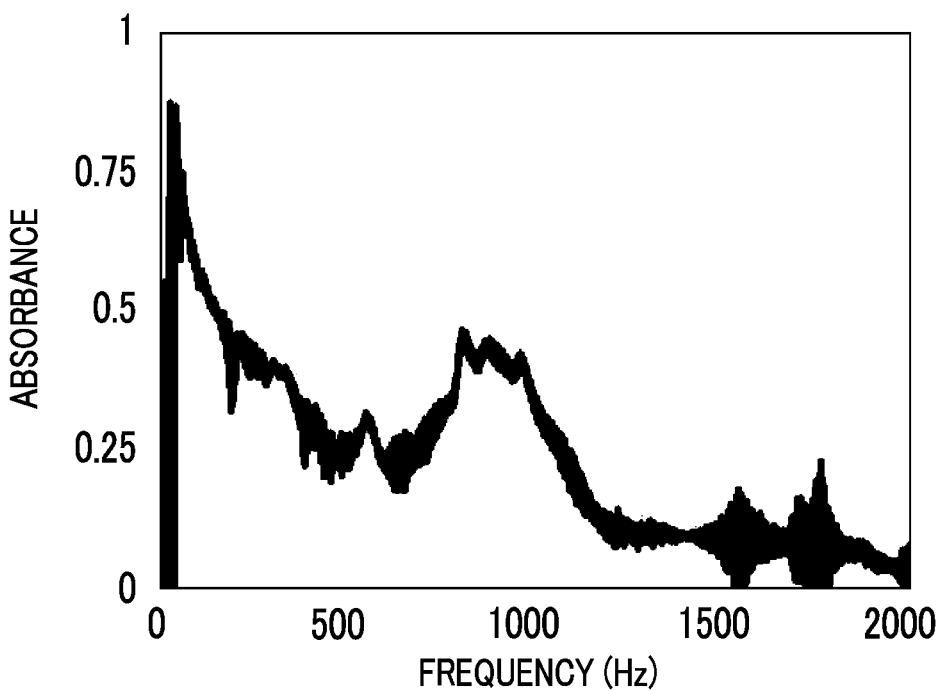
FIG. 21 is a graph illustrating absorption characteristics of sound of the heat ray-shielding material of Example 2 of the present invention.

Regarding the acoustic characteristics, the equivalent loss and the absorbance of sound were respectively illustrated in FIG. 20 and FIG. 21. In the case of being compared with Example 1 in which no opening holes 24 were punched, the equivalent loss illustrated in FIG. 20 had the maximum peak (peak of shielding) at near 500 Hz which was on the low frequency side near 800 Hz which was the first resonance frequency, and the absorbance of sound also increased at 500 Hz or less compared with Example 1.

Meanwhile, the electric characteristics were the same as in Example 1.

In addition, a fan was installed on the rear surface of the frame-film-hole structure of the heat ray-shielding material of Example 2, and it was confirmed that wind passed through the holes and reached the front surface.

As described above, in the heat ray-shielding material of Example 2, the optical characteristics remains almost unchanged, but the acoustic characteristics showed significant changes such as the increase in the shielding peak or the absorption of sound even with the hole sizes of the opening holes 24.

It was found that what has been described was the effect of hierarchical metamaterials in which the hole sizes of the opening holes 24 were sufficiently larger than optical wavelengths and were sufficiently smaller than acoustic wavelengths and was capable of exerting significant effects on audio.

Example 3

In Example 1, the films 18 were fixed to the frames 14 using a dynamic method instead of the adhesive. The thickness of the frame body 16 made of acrylic resin frames 14 was set to not 3 mm, but 1.5 mm, and two frame bodies were prepared. Screw holes were opened in the frames 14 in one frame body 16, and holes through which screws were inserted were opened in the frames 14 in the other frame body 16.

In addition, opening holes 24 were formed in a square lattice array having a pitch of 22 mm in a sheet-like film body 20 made of the films 18. Regarding the method, black dots were formed using an ink jet method, and then the opening holes 24 were formed using a laser. One frame body 16, the film body 20, and the other frame body 16 were overlaid together in this order so that the frames 14 in the two frame bodies 16 and the holes in the frames 14 were overlaid with each other and the opening holes 24 in the film body 20 were located in the center of the openings 12 in the frames 14 and were fixed using nut-attached transparent polycarbonate screws (manufactured by Nippon Chemical Screw & Co., Ltd.). A heat ray-shielding material of Example 3 was produced in the above-described manner.

In the heat ray-shielding material of Example 3, the screw portions served as dynamic fixation portions, and the film 18 was sandwiched by the frames 14 from both surfaces in the structure, and thus the films 18 were fixed along the frames 14. The use of this method enables the fixation of different kinds of materials which are not easily fixed to each other using adhesives.

The optical characteristics, acoustic characteristics, and electric characteristics of the heat ray-shielding material of Example 3 were measured in the same manner as in Example 1, and it was confirmed that the results did not change.

As described above, it is found that the heat ray-shielding material of the present invention including Examples 1 to 3, unlike Comparative Examples 1 and 2, has a strength high enough to stand for itself, is excellent in terms of the near-infrared shielding property and the visible light-transmitting properties, and furthermore, is excellent in terms of all of the visible light reflection-preventing property, the soundproofing property including the reflection and absorption of sound, and the radio wave-transmitting properties.

Furthermore, it is found that the heat ray-shielding material of Example 2 has, in addition to the excellent air permeability, sound isolation characteristics excellent enough to extremely strongly shield intended specific frequency components and, furthermore, is capable of increasing the absorption of low frequency-side components.

From what has been described above, the effects of the heat ray-shielding material of the present invention are clear.

Hitherto, detailed description has been made using a variety of embodiments and examples of the heat ray-shielding material of the present invention, the architectural member, the cage member, and the side surface wall for which the heat ray-shielding material is used, but the present invention is not limited to these embodiments and examples and can be improved or modified in a variety of manners within the scope of the gist of the present invention.

EXPLANATION OF REFERENCES 10, 11, 50a, 50b, 50c, 50d, 72: heat ray-shielding material
12: opening
14, 66, 70, 76: frame
15, 78a, 78b: frame material
16, 78: frame body
18: film
20: film body
22, 22a, 51a, 51b, 51c, 51d, 51e, 64, 68, 74: shielding cell
24: opening hole
30, 40, 41: heat-shielding film
32: base material
34, 34A, 34B: metal particle-containing layer
36: metal particle
36a, 36b, 36c: metal flat particle
38: binder
42: transparent base material
44: dielectric layer
52: cover
54: hole
56, 60: desorption mechanism
58: wall
62a: protrusion portion
62b: recess portion

What is claimed is:

1. A heat ray-shielding material comprising:
a frame body including a plurality of frames having a cell structure; and
a plurality of films attached to some or all of the plurality of frames in the frame body,
wherein the plurality of films is fixed only to one side of the frame body,
at least some of the plurality of films shields near-infrared light,
cell sizes in the plurality of frames are larger than visible light optical wavelengths, and
at least some of the plurality of frames are transparent to visible light.

2. The heat ray-shielding material according to claim 1, wherein at least some of the plurality of films selectively shield near-infrared light and transmit visible light.

3. The heat ray-shielding material according to claim 1, wherein at least some of the plurality of films have anti-reflection properties for visible light.

4. The heat ray-shielding material according to claim 1, wherein at least some of the plurality of films are transparent to visible light.

5. The heat ray-shielding material according to claim 1, wherein at least some of the plurality of films have at least a metal particle-containing layer containing a plurality of metal particles,
the metal particle-containing layer includes at least metal plate particles as the metal particles and functions so as to shield light having a first optical wavelength including wavelengths of the near-infrared light due to a localized surface plasmon effect of the metal particles, and
an average size of the plurality of metal particles is a size that is smaller than the first optical wavelength.

6. The heat ray-shielding material according to claim 5, wherein 60% or more of the total number of the plurality of metal particles is the metal plate particles in which a ratio of a diameter of the metal particle to a thickness of the metal particle is 3 or more,
principal flat surfaces of the metal plate particles are plane-oriented in a range of 0° to 30° with respect to a surface of the metal particle-containing layer, and
in the metal particle-containing layer, the plurality of metal particles is disposed without forming conduction paths.

7. The heat ray-shielding material according to claim 5, wherein the metal particles include silver.

8. The heat ray-shielding material according to claim 5, wherein 60% or more of the total number of the metal particles have a basic wavelength of the localized surface plasmon in a range of 780 nm to 2,500 nm.

9. The heat ray-shielding material according to claim 1, wherein at least some of the plurality of films have
a base material serving as a base having a first refractive index,
a metal particle-containing layer containing a plurality of metal particles, and
a dielectric layer having a second refractive index,
the base material, the metal particle-containing layer, and the dielectric layer constitute a laminate structure in which the base material, the metal particle-containing layer, and the dielectric layer are sequentially laminated in this order,
a thickness of the dielectric layer is a thickness at which reflected light on a surface of the dielectric layer in a case in which an incidence light enters the laminate structure from a surface side of the dielectric layer interferes with reflected light from an interface between the dielectric layer and the metal particle-containing layer and thus vanishes, and thus the dielectric layer has an optical function of preventing reflection of incidence light having a second incidence light wavelength.

10. The heat ray-shielding material according to claim 9, wherein, regarding the thickness of the dielectric layer, an optical path length is equal to or smaller than ¼ of the second incidence light wavelength.

11. The heat ray-shielding material according to claim 9, further comprising:
a high-refractive index layer having a third refractive index that is higher than the first refractive index between the base material and the metal particle-containing layer.

12. The heat ray-shielding material according to claim 9, wherein the second incidence light wavelength is 380 nm to 780 nm.

13. The heat ray-shielding material according to claim 1, wherein the heat ray-shielding material is radio wave-transmissible.

14. The heat ray-shielding material according to claim 1, further comprising:
one or more opening holes.

15. The heat ray-shielding material according to claim 1, wherein at least some of the plurality of films have one or more opening holes.

16. The heat ray-shielding material according to claim 1, wherein a structure made up of the plurality of frames and the plurality of films soundproofs sound of 5 dB or more at a first frequency in a range of 10 to 100,000 Hz.

17. The heat ray-shielding material according to claim 1, wherein the plurality of films are fixed to only one side of the frame body, and a structure made up of the plurality of frames and the plurality of films soundproofs sound of 5 dB or more at a first frequency in a range of 10 to 100,000 Hz.

18. The heat ray-shielding material according to claim 1, wherein the plurality of films are constituted of a single film, the single film is fixed to only one side of the frame body and attached to some or all of the plurality of frames in the frame body, and a structure made up of the plurality of frames and the plurality of films soundproofs sound of 5 dB or more at a first frequency in a range of 10 to 100,000 Hz.

19. The heat ray-shielding material according to claim 1, wherein at least some of the plurality of films have a base material serving as the base having a first refractive index, a metal particle-containing layer containing a plurality of metal particles, and a dielectric layer having a second refractive index, the base material, the metal particle-containing layer, and the dielectric layer constitute a laminate structure in which the base material, the metal particle-containing layer, and the dielectric layer are sequentially laminated in this order, the metal particle-containing layer includes at least metal plate particles as the metal particles and functions so as to shield light having a first optical wavelength $\lambda 1$ including the wavelengths of the near-infrared light due to the localized surface plasmon effect of the metal particles, the thickness of the dielectric layer is the thickness at which reflected light on the surface of the dielectric layer in a case in which an incidence light enters the laminate structure from the surface side of the dielectric layer interferes with reflected light on the interface between the dielectric layer and the metal particle-containing layer and thus vanishes, and thus the dielectric layer prevents reflection of incidence light having a second incidence light wavelength $\lambda 2$, and when an average cell size of the plurality of frames is represented by R, an average size of the plurality of metal particles is represented by d1, the first optical wavelength is represented by $\lambda 1$, the second incidence light wavelength is represented by $\lambda 2$, and an acoustic wavelength of a resonance frequency of the structure made up of the plurality of frames and the plurality of films is represented by $\lambda 3$, the heat ray-shielding material has a scale relationship represented by Inequality Expression (1) and has, as optical functions, a function of shielding light around $\lambda 1$ and a function of preventing reflection around $\lambda 2$ $$d1<\lambda 2<\lambda 1<R<\lambda 3 \qquad (1).$$

20. The heat ray-shielding material according to claim 19, wherein at least some of the plurality of films have one or more opening holes, a structure made up of the plurality of frames, the plurality of films, and one or more of the opening holes has a peak frequency indicating a maximum value of soundproofing on a lower frequency side of the resonance frequency, and when an acoustic wavelength of the peak frequency is represented by $\lambda 4$, the heat ray-shielding material has a scale relationship represented by Inequality Expression (2), has, as optical functions, the function of shielding light around $\lambda 1$ and the function of preventing reflection around $\lambda 2$, and has, as an acoustic function, a function of shielding sound on a low frequency side around $\lambda 4$ $$d1<\lambda 2<\lambda 1<R<\lambda 3<\lambda 4 \qquad (2).$$

21. An architectural member, wherein the heat ray-shielding material according to claim 1 is used as a movable member or a removable member.

22. The architectural member according to claim 21, wherein, in an architectural structure for which the architectural member is used or a space, the plurality of films is disposed outside, and the frame body is disposed inside.

23. The architectural member according to claim 21, wherein the architectural member is a window member for which the heat ray-shielding material is used as a transparent portion of an external window.

24. The architectural member according to claim 21, wherein the architectural member is a screen member for which the heat ray-shielding material is used as a transparent portion of a screen.

25. The architectural member according to claim 21, wherein the architectural member is a blind, a curtain, or a divider for which the heat ray-shielding material is used as a structure in which the frame body is collapsible.

26. A cage member having a cuboid shape, wherein at least one surface of the cuboid is formed using the heat ray-shielding material according to claim 1.

27. A side surface wall installed on a side surface of a road or a railroad, wherein the heat ray-shielding material according to claim 1 is used for at least some of the side surface wall.

* * * * *